Figure 1:
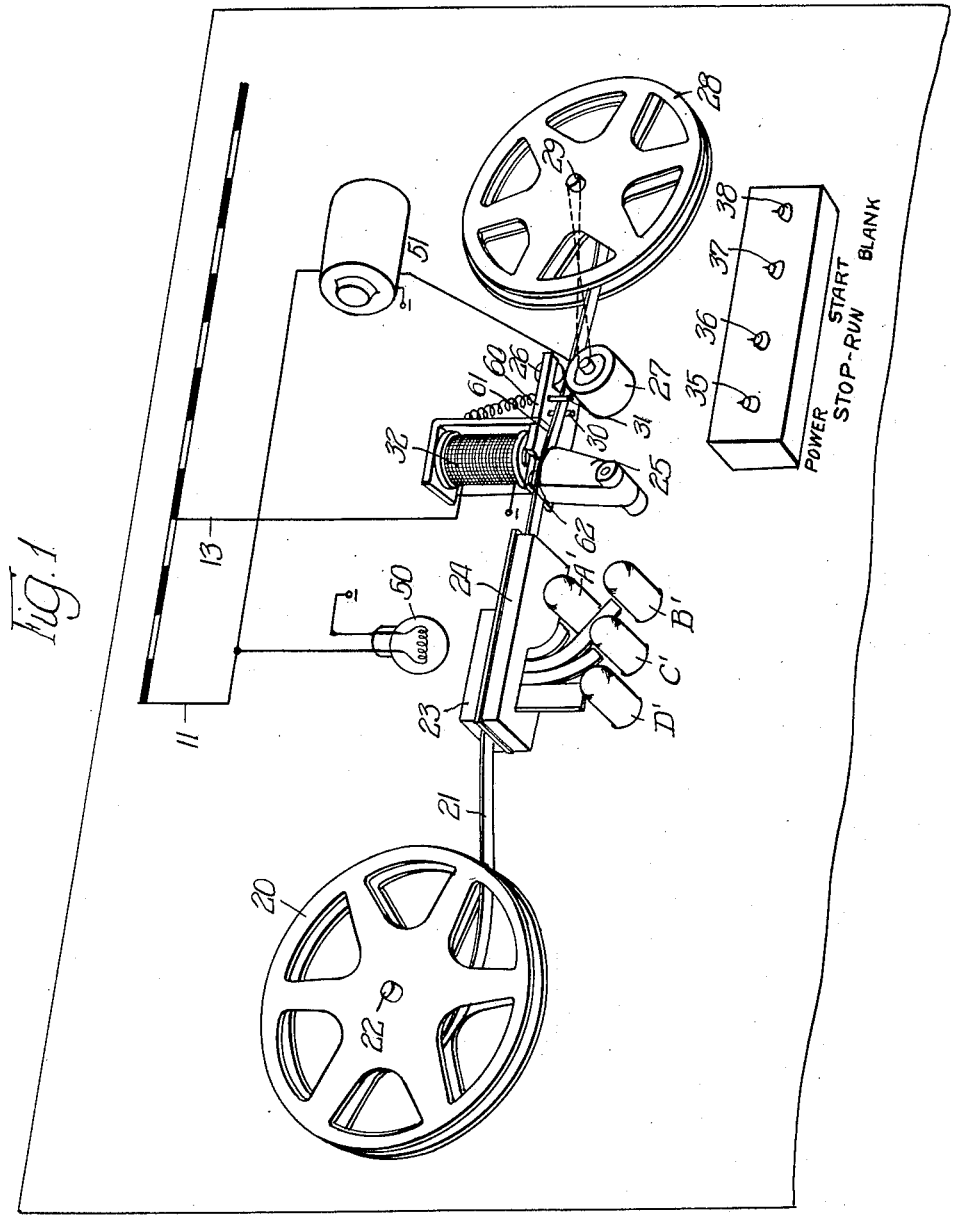

Jan. 14, 1958 W. H. BLASHFIELD 2,819,841
ANALYZER FOR TICKETING SYSTEM
Filed Oct. 11, 1952 10 Sheets-Sheet 1

INVENTOR.
William H Blashfield,
BY
Brown, Jackson, Boettcher & Dienner
Attys.

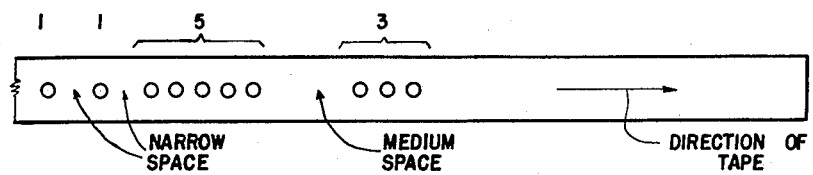
FIG. IIa
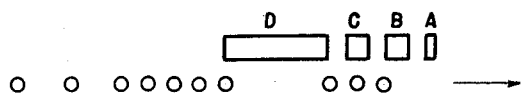
FIG. IIb
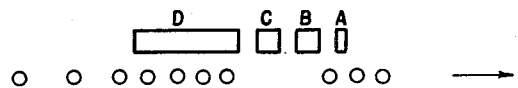
FIG. IIc
FIG. IId
FIG. IIe
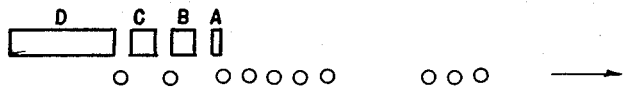
FIG. IIf
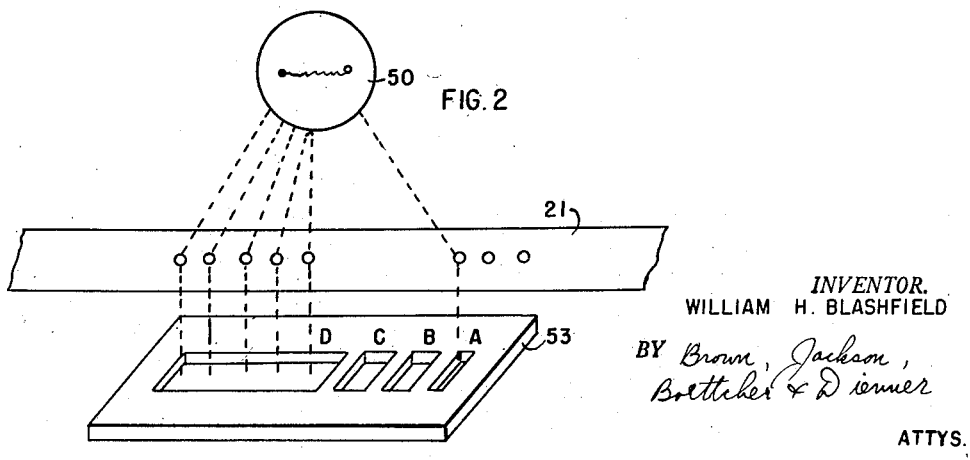
FIG. 2
INVENTOR.
WILLIAM H. BLASHFIELD
BY Brown, Jackson,
Boettcher & Dienner
ATTYS.

Jan. 14, 1958 W. H. BLASHFIELD 2,819,841
ANALYZER FOR TICKETING SYSTEM
Filed Oct. 11, 1952 10 Sheets-Sheet 7

INVENTOR.
WILLIAM H. BLASHFIELD
BY
Brown, Jackson, Boettcher & Dienner
ATTYS.

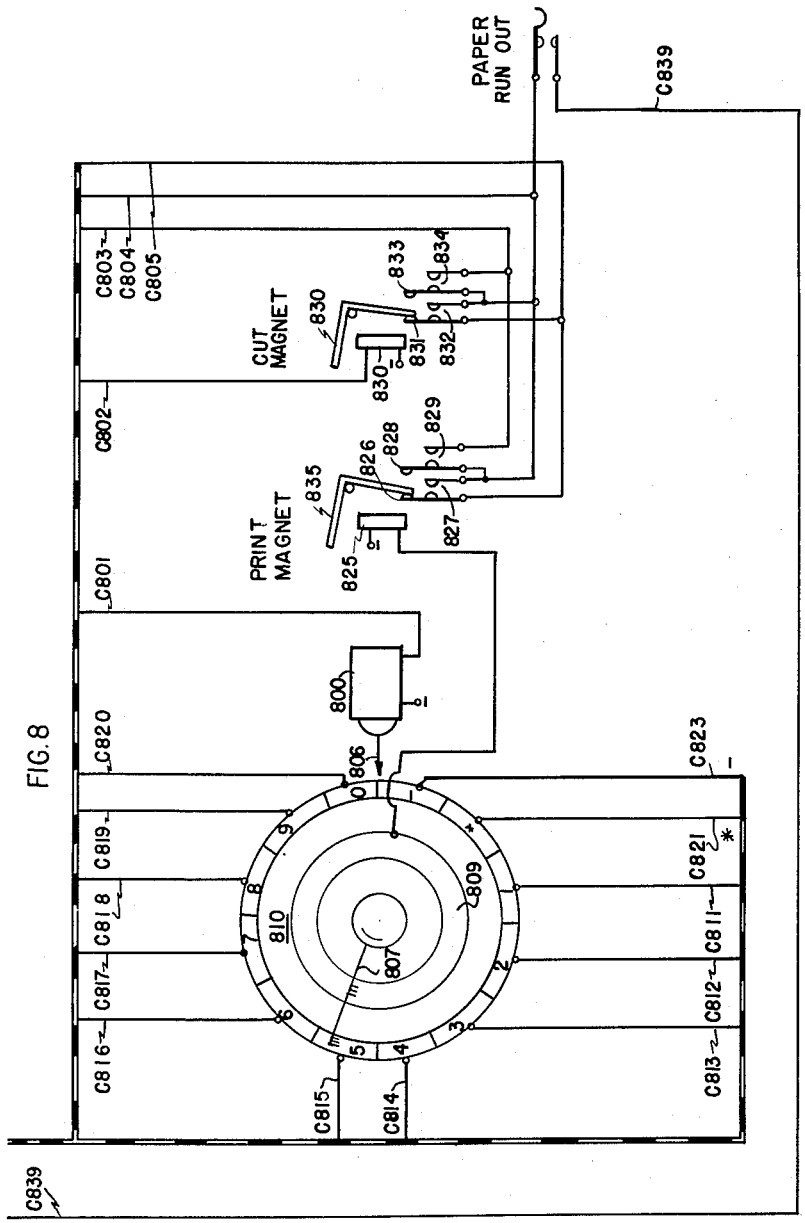

Jan. 14, 1958  W. H. BLASHFIELD  2,819,841
ANALYZER FOR TICKETING SYSTEM
Filed Oct. 11, 1952  10 Sheets-Sheet 9
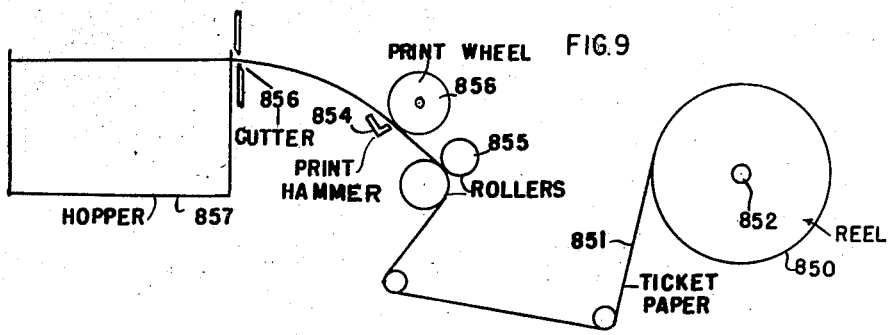
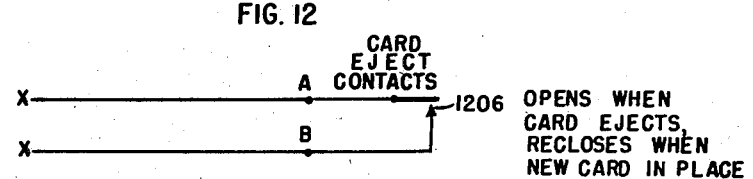
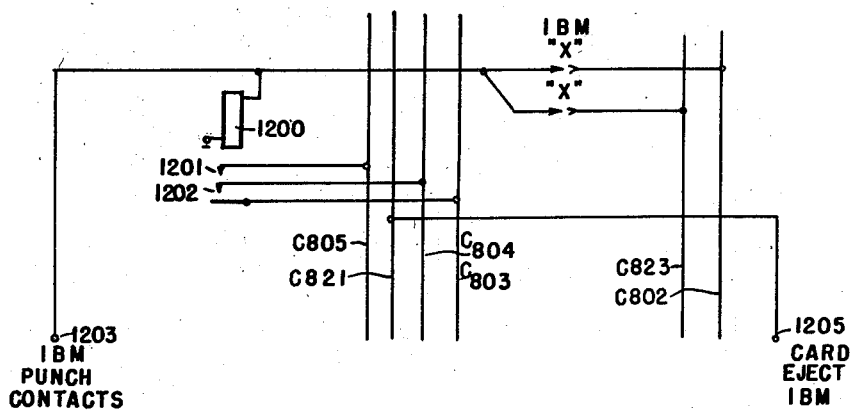
INVENTOR.
WILLIAM H. BLASHFIELD
BY
Brown, Jackson, Boettcher & Dienner
ATTYS.

Jan. 14, 1958 W. H. BLASHFIELD 2,819,841
ANALYZER FOR TICKETING SYSTEM
Filed Oct. 11, 1952 10 Sheets-Sheet 10

INVENTOR.
WILLIAM H. BLASHFIELD
BY
Brown, Jackson, Boettcher & Dienner
ATTYS.

2,819,841
ANALYZER FOR TICKETING SYSTEM

William H. Blashfield, Galion, Ohio, assignor to North Electric Company, a corporation of Ohio Application October 11, 1952, Serial No. 314,393

49 Claims. (Cl. 235—61.9)

The present invention relates in general to an analyzer unit, and in particular to an analyzer unit for use with toll ticketing equipment in a telephone exchange.

With the steadily increasing demand in the telephone field for completely automatic exchange equipment and the increased use thereof, there has arisen the problem of providing an equitable basis for allotting the charges for certain classes of calls, and particularly for calls of the short-haul type. Experience has shown that a preferred method of effecting an equitable allotment of the cost of such calls, includes the use of automatic recording equipment which is operative to provide a record for calls of the certain classes, which record preferably includes information as to the calling party number, the called party number, the duration of the call, and preferably the day and time thereof.

Earlier attempts to solve such problem resulted in the provision of extremely complex and expensive units which, because of their cost, were not feasible for use in exchanges of smaller and medium-size communities. There has been set forth in a copending application which was filed on July 23, 1951, by Blashfield et al., and which received Serial No. 238,092, now Patent No. 2,782,257, and which was assigned to the assignee of this invention, a novel ticket recorder unit which automatically records the above mentioned information in the form of a series of tandem punches on a tape member. The recording equipment for punching the tape basically comprises a simple punch and step arrangement connected in each trunk of the system, and a calendar unit which is common to all the trunks and their associated recorders. The punch magnet follows the impulses transmitted over the trunk to make a record thereof comprised of a series of punches or perforations registered on a tape member and the calendar punches the date and time information thereon in a like manner. Such arrangement eliminates the usual storage and translation equipment used in most known systems, whereby, in addition to the reduction in the initial expense of the equipment, the installation expense is also substantially reduced. Further, the extreme simplicity and flexibility of the unit renders such arrangement simple to maintain and especially desirable to operators of smaller type exchanges in the field.

With the introduction of this improved advanced equipment, there arose the problem of analyzing the call identification data as recorded on the tape in punch form. While it is apparent that the holes on the tape can be readily examined by clerical personnel, the amount of time consumed in such operation might well prove impractical and would, in any event, introduce a human factor of error. It is an object of the present invention therefore, to provide an economical and reliable analyzer unit which is operative to analyze the tandem representations on the tape media, and further to control associated apparatus such as automatic printers, card punching machines and the like, to provide individual printed tickets for each call recorded on the tape member.

A feature of the novel analyzer set forth hereinafter is the manner in which the tape media is passed over the analyzer without re-reeling, the analyzer being adapted to read the tape backwards, and to print the ticket backwards. That is, as the tape media is passed over the analyzer, the punches of a call on the tape which were recorded last by the recorder are the first to be read by the analyzer. The ticket for each call is printed in the same manner, i. e., from right to left in the ascending order of the digits. The provision of a reverse analyzer which is operative in this manner, in addition to eliminating the somewhat time-consuming operation of re-reeling the tape, enables the equipment to recognize without difficulty, the lowest order digit of the entry. The recognition of the lowest order digit is of particular importance in arrangements in which the analyzer is utilized with conventional card punching machines, and in which the number of digits in a particular group may vary from call to call. In such use the systems normally require that the holes for corresponding digits and groups of digits of various calls be located in predetermined positions on the card. However, if the tape were to be read in the manner in which it were printed, that is, the first digit of each call punched by the recorder being the first digit read by the analyzer, it would be difficult to ascertain the proper position of the first digit of each group encountered for there is no indication as to whether it is the hundreds, tens, units or party digit of the group. In the present arrangement the tape is scanned in a reverse order and the first digit of a group is always the party digit, the second is the unit, etc., and the positioning of the numbers in predetermined positions will therefore be readily accomplished regardless of the number of digits in each group.

The reverse analysis of the tape provides a further advantage in that incomplete calls are recognized prior to the useless examination of the data of that call which appears on the tape. That is, as the tape is read in most arrangements which re-reel prior to analyzation, the scanning member will encounter the calling party number, the called party number and possibly the calendar data prior to the representative indication that the attempted call was incomplete. Thus a certain amount of time is wasted in the analyzation of a call which is not to be recorded. It is apparent that with backward scanning, the indication will be encountered immediately, and according to a feature of the invention the equipment is operative with the encountering of such indication to jump over the remaining information for that call without printing same, and to initiate examination of the information for the next call on the tape.

The digital positioning as controlled by the present analyzer is further novel by reason of the manner in which space recognition is used in conjunction with punch positions on the tape to determine the digital positioning on the final ticket, such method being in contrast to the normal arrangements in which positive designations are used to indicate digital positioning on the final record. Briefly, the scanner comprises a first set which recognizes the information carried by the tape, and a second set which recognizes the spaces thereon, the two sets controlling in combination the positioning of the digits on the final ticket.

The manner in which space recognition is effected is also novel, a series of apertures on a scanning mask being arranged to recognize by measurement the widths of the various spaces between the holes. With the provision of such arrangement, the recognition is dependent upon an actual physical measurement of the spaces, and not upon the time required for the spaces to pass over the scanner, whereby the speed of the tape is entirely divorced from the recognition operation and a more reliable type arrangement is provided.

In addition to providing digital positioning by space recognition, whereby the inclusion of a positive identification designation is eliminated, the equipment is operative to effect space recognition prior to the complete analysis of the digit which precedes the space on the tape. Thus during the period the movement of the tape is arrested to effect the printing of the digit, an indication of the place of positioning of the following digit on the ticket is also provided. In such manner the speed of operation of the equipment is manifestly increased as contrasted to such arrangements in which a positive digit representation must be impressed upon the tape, and the reading thereof must be effected before a control operation can be effected in response thereto.

In this regard, a further feature is the manner in which the analyzer is operative to sense the position of each representation on the tape, and to effect the printing of the information conveyed by the representation prior to the complete analysis thereof. Such operation is effected by the inclusion of compensating means in the equipment which supplements each such signal portion as read with a predetermined value, which value is sufficient to cause the indication transmitted to the associated equipment to be the same value as that read upon the tape. Such arrangement, of course, renders feasible a more rapid analyzation of the tape and permits the simultaneous control of the equipment by the space recognition and the information recognition scanner means.

Of particular novelty is the minimum amount of equipment which is utilized in the analyzation of the tape media, the analysis equipment basically comprising three counting chain sets, one of which is operative to count the minute punches, the second of which is arranged to count the number of characters printed upon the final ticket, and the third of which is arranged to count the number of information bearing punches on the tape. The chain for counting the forty representations printed on each of the tickets, for example, includes only eleven relays and is additionally operative to control the associated equipment to position the digital representations at given positions and to effect movement of the completed record from the associated equipment following the registration thereon of the analyzed data.

Another feature is the manner in which the punch counting chain and the minute counting chain are utilized in combination to translate the minute punches to a billing charge.

Figure 3:
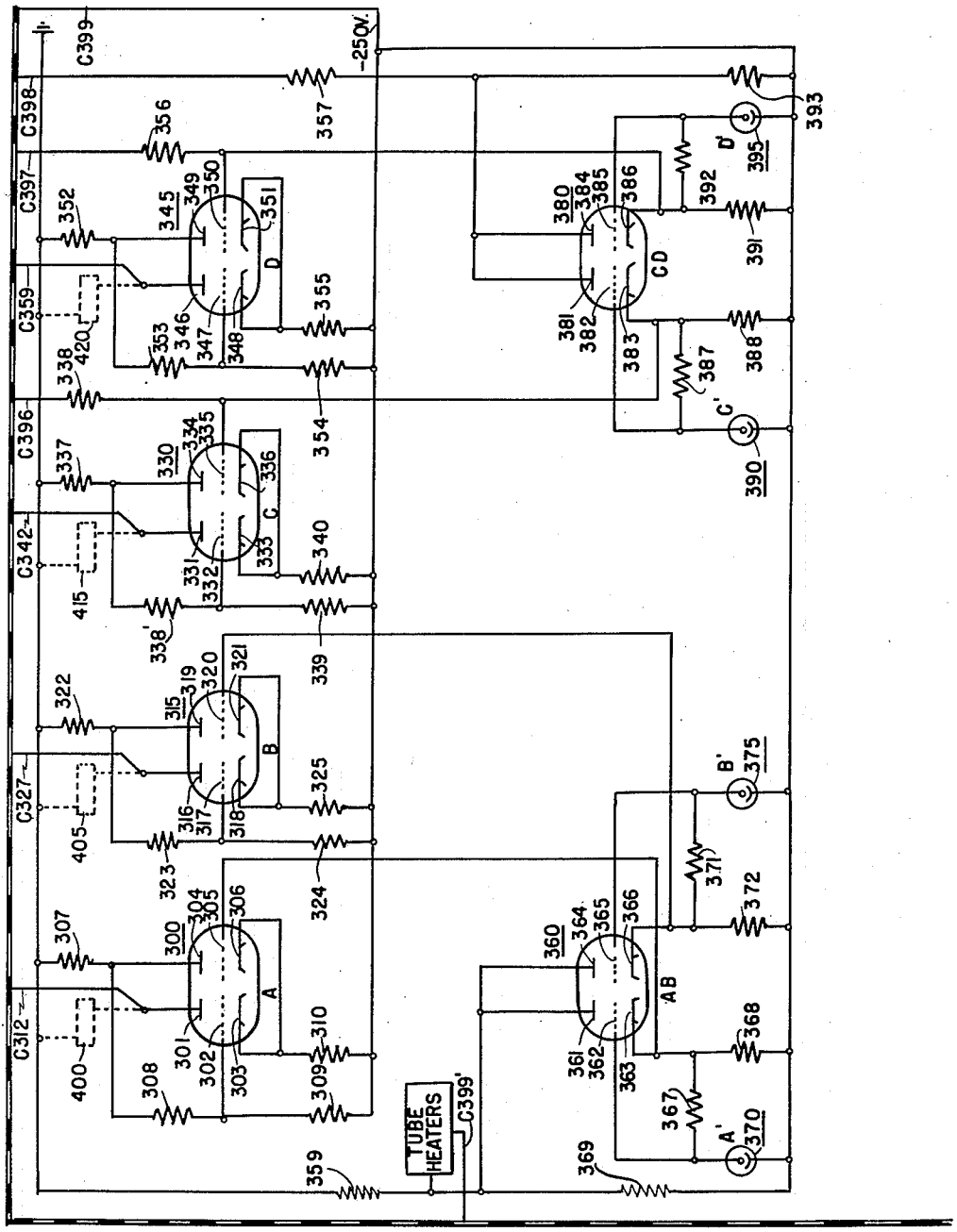
Figure 4:
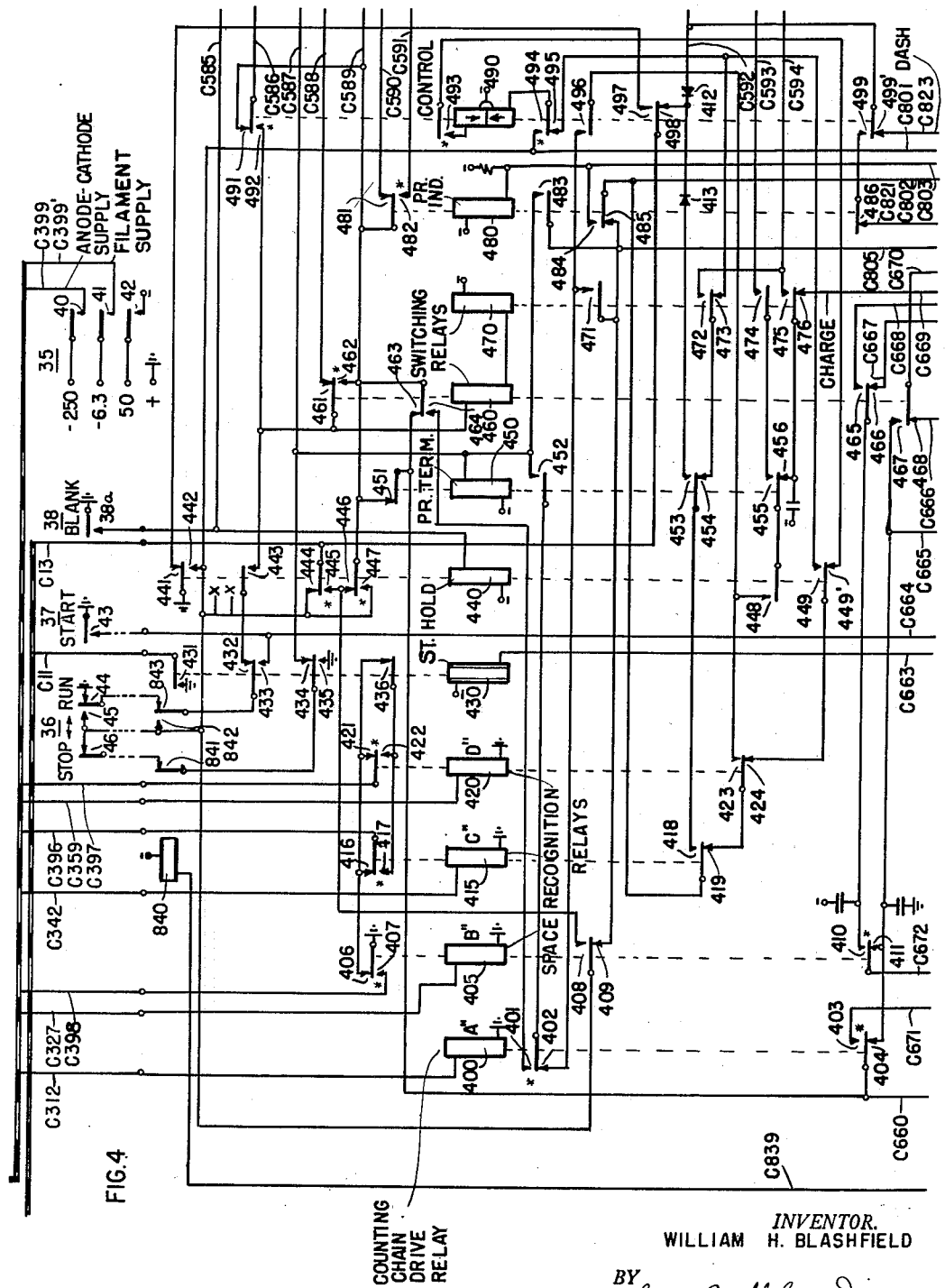
Figure 5:
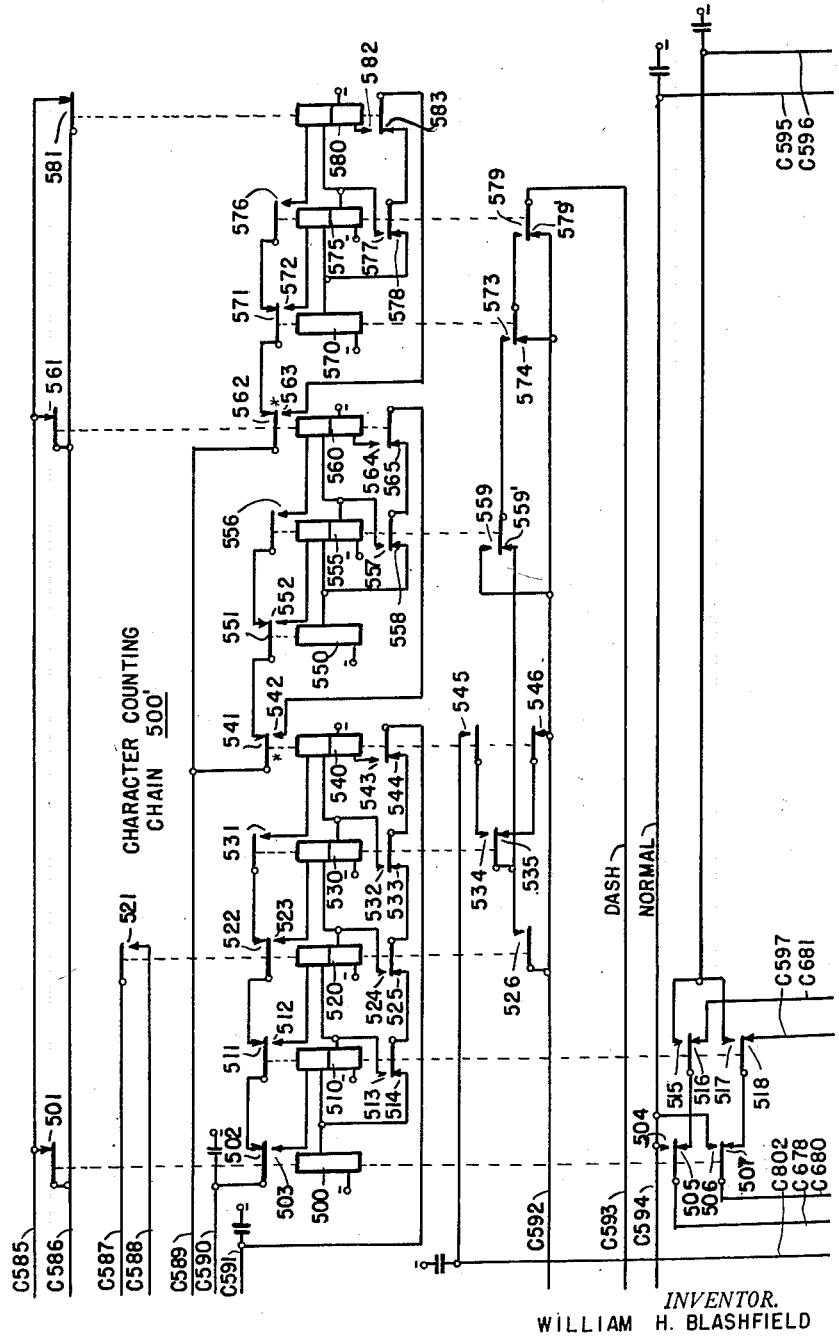
Figure 6:
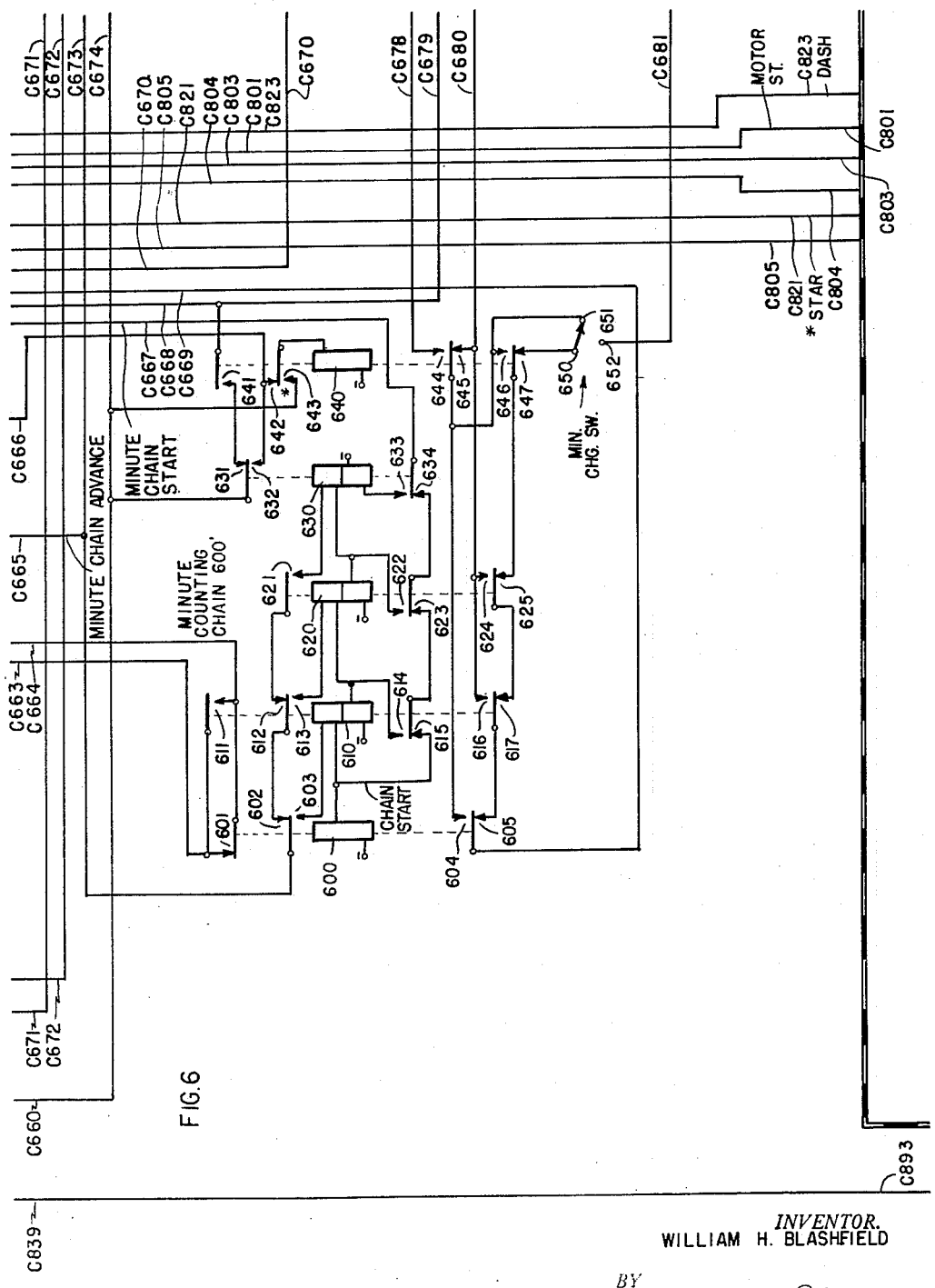
Figure 7:
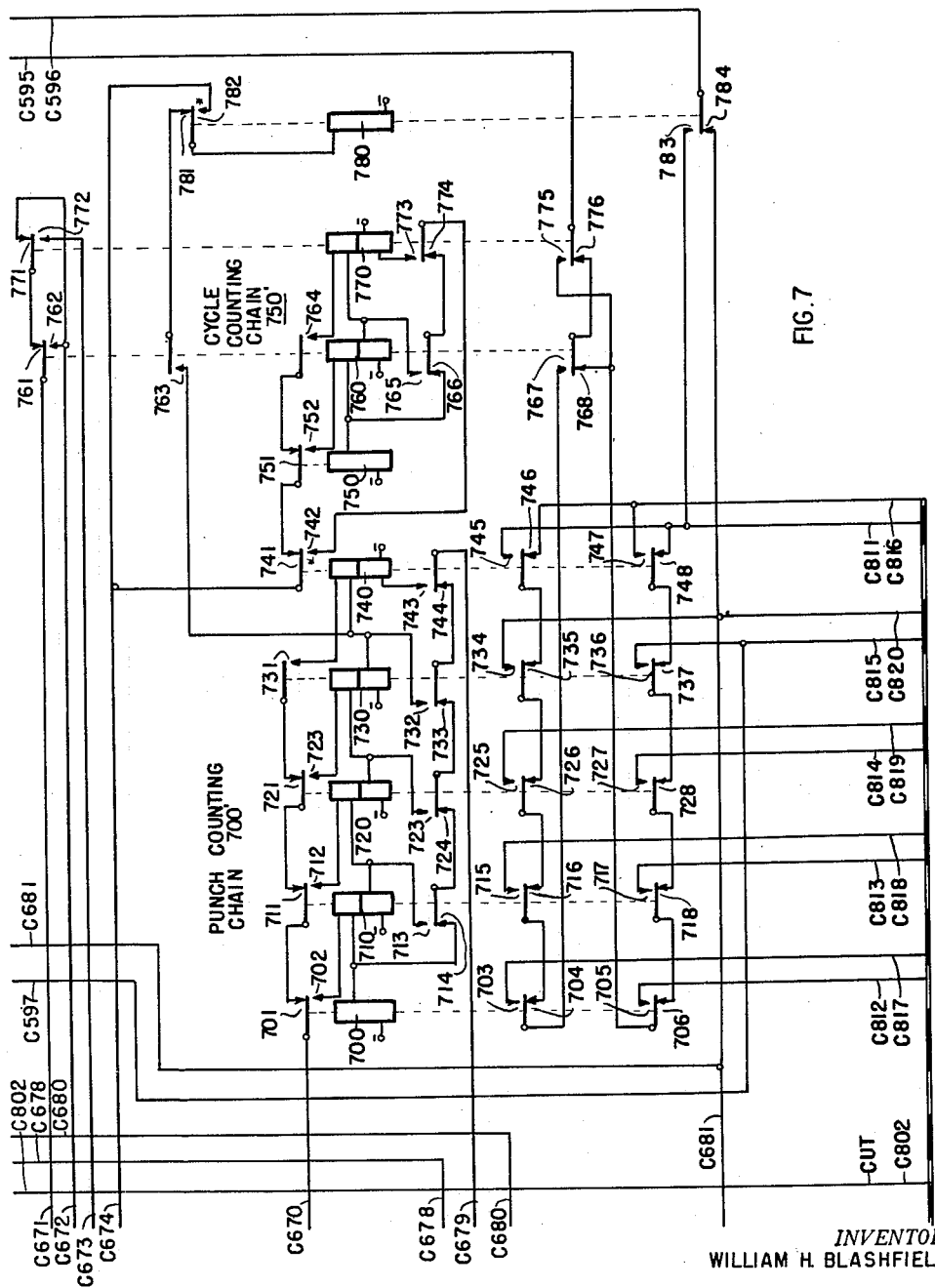
Figure 10:
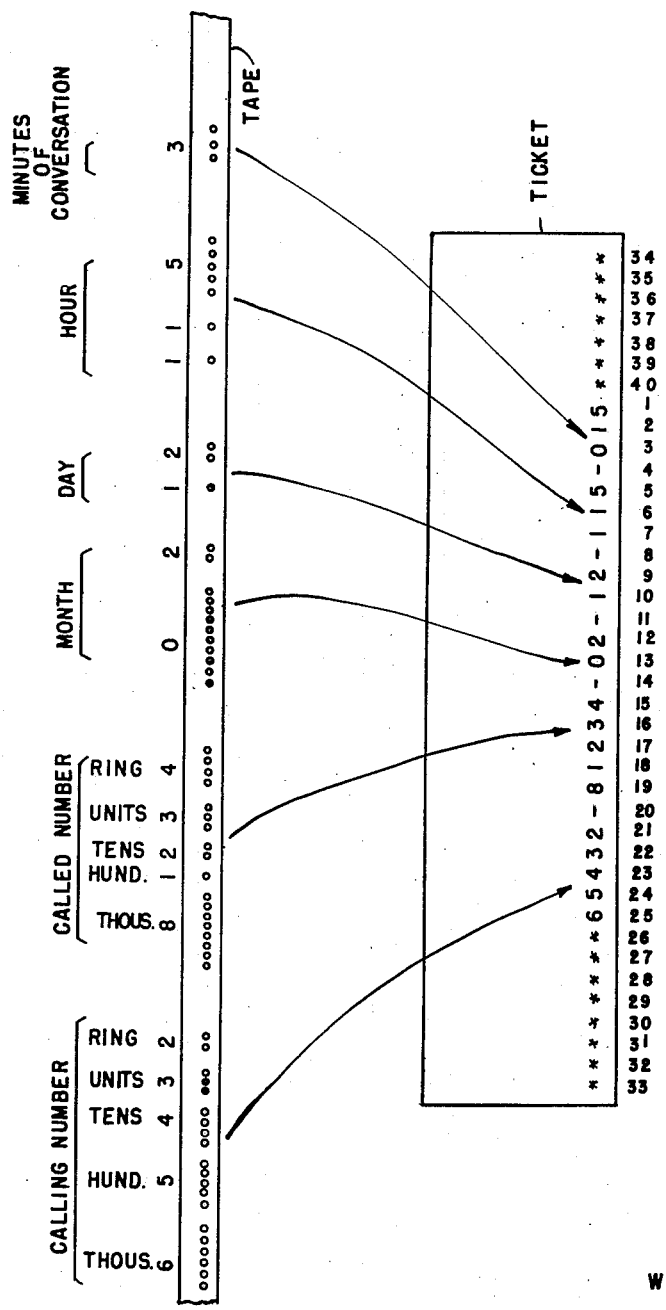

Other novel features, such as the manner in which the equipment is automatically stopped when the tape runs out, the manner in which the analyzer will complete the analyzation of the current call in the event the analyzer is stopped for examination purposes, the manner in which the analyzer is stopped in the event that a printing operation does not occur in its proper sequence, and the manner in which the analyzer is stopped in the event that the ticketing paper runs out, will be set forth more clearly hereinafter, which features will become more apparent with reference to the following specification and drawings, in which Figure 1 is a perspective sketch of the tape, the scanner equipment and the driving means for moving the tape thereacross, Figure 2 is a perspective sketch of the scanning mask and its manner of cooperation with the tape, Figure 3 is a schematic sketch of the photocell circuit which is operated by the scanner, Figures 4, 5, 6 and 7 are schematic sketches of the components of the analyzer and their manner of interconnection, Figure 8 is the schematic representation of a printer unit for use with the analyzer, Figure 9 is a schematic representation of the manner in which the tickets are printed upon a roll of tape, cut into ticket form and fed into a hopper member, Figure 10 is illustrative of the manner in which the data on the tape media is converted into a ticket member, Figure 11a–11f sets forth the manner in which the scanning mask senses a series of punches and spaces on the tape media, and Figure 12 sets forth the manner in which the equipment is modified for operation with a conventional card punching machine.

GENERAL DESCRIPTION

The analyzer unit, according to one preferred arrangement, is housed in a small black container approximately 14" x 14" x 20" in size and having suitable carrying means thereon for rendering the unit portable. Associated cord means permit the connection of the equipment to any convenient 110 volt, 60 cycle outlet, the components of the analyzer being adapted for operation with such supply. Circuitry components are arranged in convenient layout form inside the housing and are interconnected for control by a scanner mechanism which is located on an outward face of the housing.

With reference to Figure 1, the members shown thereat are mounted on the face of the housing, these members including a reel 20 upon which the tape is mounted, a scanner box 24 consisting basically of a scanner head with four apertures A, B, C and D thereon, and a photocell A', B', C' and D' for each aperture, drive means 27 and 51 to drive the tape past the scanner head, and a magnetic clutch, or tape advancing relay, 32 which stops the tape at any point.

A switch panel appearing on the front face of the housing locates a power switch 35, a run-stop switch 36, a start switch 37, and a "blank" switch 38. Operation of power switch 35 effects energization of the equipment preparatory to the use thereof; the start switch 37 initiates operation of the analyzer and movement of the tape across the scanner; the run-stop switch 36 provides a means for interrupting the analyzation at any time; and the blank switch 38 provides a means for running off an extra ticket having a series of stars printed thereon.

With movement of the tape across the photocell scanner head, impulses representing the holes and spaces on the tape are transmitted to associated relay circuitry located in the housing control associated recording equipment. A conventional printer mechanism (Fig. 9) may be used, and in such event may be located beneath the scanner unit of the analyzer, the printer including a printer which is controlled by the analyzer, a roll of paper upon which the information is printed, and associated knife equipment for cutting each of the groups of information printed on the tape into separate tickets. The printer unit need not be included, of course, when the analyzer is connected to control conventional card punching equipment.

With reference to Figure 10 there is shown thereat a representative section of the tape and the scanner on which the information for a call has been punched. A ticket printed by the analyzer responsive to the passage of such tape section across the scanner unit is illustrated thereunder for comparison purposes. The perforated tape and the ticket as shown thereat illustrate a call in which the calling party, identified as 65432, placed a call to a subscriber, identified as 81234, on Feb. 12, 11:30 a. m. and talked for a period of three minutes, whereby (in the present example) a charge of 15 cents is automatically printed on the final ticket. It is apparent, therefore, that the analyzer effects the printing of information in the same form as it appears on the tape with the exception of the number of minutes of conversation which are read by the analyzer and converted into a monetary charge.

The digits on the tape appear as a series of punched holes with spaces placed between the holes to separate the digits, numbers, and calls from each other on the tape. For this purpose three widths of spaces are employed, the first being identified as a "narrow" space which occurs between digits, the second being a "medium" space which occurs between groups, and the third being a "wide" space which occurs between calls. With reference to Figure 10, the narrow space is of a length equivalent to the space resulting from the omission of a single punch and appears between each digit of a group. The medium space which separates the digits groups, as for example, the day group and the hour group occupies a space which is the equivalent to the space resulting from the omission of three to six punches; and the wide space which separates one call from the next call on the tape occupies a space which would normally be occupied by eight or more punches.

The tape is moved across the scanner of the analyzer in the backward or reverse direction whereby it is possible to use tape as it comes from the recorder without involving the time consuming task of re-reeling the tape prior to examination. As the tape goes through the scanner, therefore, the minutes of conversation which was the last information recorded on the tape will be the first to be examined by the scanner, and as a result, the ticket will be printed in reverse from the manner recorded on the tape, each of the digits being printed in the ascending order of their digital positions. For example, the printing of the ticket in Figure 10 will comprise the printing of digit 5 first, followed by digit 1 and digit 0 of the charges, a dash, the digit 5, digit 1, digit 1 of the hour representation, etc. The order of printing is clearly brought out by the identifying numerals 1–40 appearing below the characters on the representative ticket in Figure 10.

The analyzer is also operative to recognize the spaces on the tape which follow each digit to effect corresponding control operations, the recognition being effected prior to the printing of the digit. The sensing of the information represented by the punches and the succeeding spaces is thus effected at practically a simultaneous period, and the operations dictated by the space on the tape and the information preceding same may be effected in the analyzer during the single arrestment of the tape movement. Briefly, if the space following the digit is narrow, the analyzer effects the printing of the digit and immediately reinitiates tape movement; if the space is of a medium width, the analyzer effects the printing of the digit and a dash; and if the space is wide, the analyzer prints the digits and then prints enough stars to fill out the ticket to the length of a standard toll ticket.

The recognition of the spaces and the digits in this manner is effected by a scanner member which consists basically of a pick-up head with four apertures and four photocells, each of which is individual to each of the apertures. One of the four apertures is used to count the punches in the tape, whereas the other three apertures recognize the three different widths of spaces between the punches as they occur.

Figure 2 illustrates the apertures in the pick-up head and their relation to the punches in the tape. The four apertures are identified as A, B, C, and D, a corresponding photocell A', B', C' and D' being positioned beneath the correspondingly identified aperture. An illuminating lamp is positioned for operation with the photocells, whereby an opaque section of the tape passing over the scanner will cut the rays of the lamp from the associated photocell, and the passage of punches over the apertures will permit the light to pass through the aperture to the associated photocell. Each photocell is connected through associated equipment to control associated relay members in such a manner that with the passage of light through the associated aperture, the associated photocell will effect energization of its associated relay.

The narrow aperture A recognizes each punch in the tape and is used to count the punches as they pass thereover. Apertures B, C and D are arranged to recognize the following spaces, aperture B being covered when a narrow space is encountered, apertures B and C being covered by a medium space, and apertures B, C and D being covered by a wide space. As will appear hereinafter, the spaces are recognized by the space recognition apertures B, C and D prior to the time that the aperture A has counted the entire number of punches in the group preceding the space, and accordingly the analyzer is operative to supplement the count as registered by aperture A by a predetermined amount to obtain the actual number of holes in each digit on the tape. Further, as the movement of the tape is again initiated following printing of a digit, and as the remaining punch of the previous digit passes over aperture A, the analyzer is operative to prevent response of the equipment to such punched hole.

The analyzer circuitry controlled by the impulses which are transmitted by the photocell and scanner equipment as the tape moves thereacross comprises Relay 400—counting chain drive relay, counts punches on the tape.
Relays 405, 415, 420—space recognition relays, recognize and discriminate between spaces following the punches.
Relay 430—start relay, operates when analyzer is started; remains operated continuously throughout the full length of the tape.
Relay 440—hold relay, operates at the beginning of call scanned, releases at the end of the call, reoperates as next call starts.
Relay 450—print termination relay, controls termination of certain printing operations.
Relays 460 and 470—switching relays, operate after the charge has been printed, switch various circuits from the charge computing condition to straight counting and printing condition.
Relay 480—print indication relay, advances chain to count characters printed.
Relay 490—control relay, operates under two conditions, (a) at the end of scanning a completed call, (b) as soon as an incomplete call is recognized.
Relays 500—580—character counting relays, count number of characters printed on ticket.
Relays 700—780—punch counting relays, count number of punches on tape; cooperate with minute punch relays in computing charge.
Relays 600—640—minute punch counting relays used for counting minute punches and for translating number of minutes of conversation to charge.

The character counting chain is actually divided into several chains, the first five relays 500—540 counting up to five and then repeating with the next three relays 550—560 counting each round of the first group of five relays, and the second cycle chain 570—580 counting each round of the second group of relays 550—560. Thus, with the use of 11 relays, 45 characters may be counted.

The character counting chain comprising relays 500 to 580 is operated each time that a printing operation occurs and counts the operations so that dashes and stars may be printed at the appropriate time, and so that the printed ticket may be cut at the right point to give a physical length equal to a standard toll ticket of 40 characters. As shown in Figure 10, after the actual information is printed the printer prints stars until 40 characters have been placed on the ticket. The contacts of these relays are also arranged so that as the chain has counted to 41 (40 printed characters and 1 cut) the end of the ticket is indicated.

The minute counting chain 600' used in the counting of the minute pulses is driven by the counting chain drive relay 400 and counts the number of pulses in the minute representation, which is the first group of punches of each call on the tape as encountered by the analyzer. Relays 600—630 count each group of 4 minute punches, the punch counting chain 700' being interconnected therewith to count the number of cycles of the minute counting chain 600', and the counting chain 750' being interconnected therewith to count the number of cycles of chain 700'. In the particular arrangement set forth herein the charge is to be effected at the rate of 15 cents for the first 4 minutes, and 5 cents for each additional two minutes. The charge rate therefore is as follows:

| Minutes | Charge |
|---|---|
| 1 | 0.15 |
| 2 | 0.15 |
| 3 | 0.15 |
| 4 | 0.15 |
| 5 | 0.20 |
| 6 | 0.20 |
| 7 | 0.25 |
| 8 | 0.25 |
| 9 | 0.30 |
| 10 | 0.30 |
| 11 | 0.35 |
| 12 | 0.35 |
| 13 | 0.40 |
| 36 | 0.95 |
| 37 | 1.00 |

It will be seen that except for the first four minutes, the units digit of the charge will change from 5 to 0 and from 0 to 5 each two minutes. The tens digit of the charge increases one every 4 minutes.

The minutes of conversation as represented by the punches on the tape are counted on chains 600′, 700′, and 750′ and the units digit of the charge is determined by the interconnection of the contacts of the relays. That is, with each passage for four minute punches, relays 600—630 are cycled and one of the punch counting chain relays 700—740 is operated, these relays at their contacts determining the tens digit of the charge and thereby increasing the tens digit once each four minutes. Each cycle of the punch counting chain relays 700—740 is counted by the cycle counting chain relays 750—770, so that as 37 minutes have been counted, the relay 780 will operate to switch the hundreds digit from 0 to 1.

In the present embodiment any conversation longer than an hour receives only the charge for one hour by reason of the manner in which the chain is connected. It is apparent that by extending the chain control over relays 750—770, the time charges could be increased accordingly.

Relay 640 associated with the minute counting chain 600′ remains non-operated until the four minute punch is accomplished to insure the provision of a 15 cent charge for four minutes or less. After the passage of four minutes, the printing of the charges is effected as before described. A minimum charge switch 650 is connected so that with the operation thereof to effect the closure of contacts 652, a call of only one minute will cause 000 to be printed instead of 015, (as would be the case with contacts 651 closed), thereby making it possible to recognize calls of less than one minute on the ticket.

The charge indications and the digit indications are extended over conductors C811—C820 to interconnected equipment to control same in the provision of individual charge records. The printer shown in Figures 8 and 9 which may be connected for control by conductors C811—C821 and conductor C823 comprises a type wheel carrying 12 characters including the ten numerals 1 to 0, and two additional characters, a star (*) and a dash (—); the printer is mounted on the end of a shaft which also carries an index wheel, a friction clutch and a pair of interconnected brushes, one brush riding on a contact ring and the other over a set of twelve stationary segments. Each segment corresponds to a character on the type wheel so that when the brushes are on a particular segment, the corresponding character is in position for printing. As voltage is applied to the segment, the print magnet is energized to lift the print hammer to force the paper against the character, the stabber holding the type wheel stationary while the impression of the character is being made. As the print magnet releases, a ratchet mechanism steps the paper ahead.

The voltages are applied to the segments over conductors C811—C821 and C823 in accordance with the particular registrations which have been made on the counting chains 600′, 700′ and 750′, and also in accordance with the particular operated conditions of the space recognition relays 405—420. The printer also includes a cut magnet which effects cutting of the ticket at a time subsequent to the completion of the printing thereof.

When the last digit on the tape (actually the first digit of the calling number) has been scanned, a wide space is encountered and the space recognition relays 405—420 release in a combination which effects the operation of control relay 490 to control the printing of a series of stars.

The star printing is effected through the pumping arrangement consisting of print indication relay 480 and the print magnet 825.

If the circuit is idle and the blank button is operated the circuit runs off one ticket of stars and then stops.

If the stop-run switch is thrown to the stop position during the analyzation of the tape the printer will finish the particular call it is printing and then stop. Reoperation of the equipment may again be effected by moving the switch to the run position and momentarily depressing the start button.

Brief consideration will be given to the printing of a call at this time. As the start button 37 is operated, the printer motor 800, the tape motor 51, and the clutch member 62 are operated to initiate advancement of the tape 21 across the scanner member. The light source lamp 50 is also illuminated and as the first punch passes over aperture B, the associated relay is operated. Holding ground is applied to the analyzer equipment to insure complete analyzation of the call now started.

Counting chain drive relay 400 operates and releases as each hole passes the aperture A, apertures B, C and D being of sufficient width to maintain their associated relays operated with the passing thereover of successive punches which represent each digit.

In the examination of the first three punches on the tape which represent the minutes of the call, the counting chain drive relay 400 drives the minute counting chain 600′ to register the number of punches thereon. As the medium space following the three punches is moved into position above aperture B, relays B″ and C″ responsively release, the clutch magnet 32 is released and the tape is stopped, a charge printing circuit is closed to the circuits as prepared by the minutes counting chain 600′ (015 in the present example) to print the first (cents) digit (5) thereof (with the minute charge switch contacts 651 closed), which extends to conductor C815.

The print relay 825 operates to effect the printing of the digit "5" on the tape and also operates print indication relay 480 to register on the character counting chain 500′ the printing of the first character. Following the registration of the character the print circuit for the second (dimes) digit of the charge is completed (in the present example 1) which extends to conductor C811. Print relay 825 operates to print digit "1" and to again operate print indication relay 480 to advance the character counting chain 500′ one more step.

With the further advancement of the character counting chain 500′, an operating circuit is completed for the third (dollars) digit of the charge (0 in the present example) to effect the printing thereof by print relay 825, following which a circuit is completed to effect the operation of the switching relays 460 and 470 to shift the drive circuit extending from the counting chain relay 400 to the punch counting relay 700′.

Following the printing of the dollars digit of the charge, a circuit as controlled by the space recognition relays and the position of character counting chain 500′ is completed to print a dash character on the ticket. After printing, the movement of the tape is again initiated and the medium space following the minute punches is moved past aperture B to bring the first hole of the next digit (the hours tenths digit) thereabove.

The counting chain drive relay 400 now responds to the punches representing the hours tenths digit and drives the punch counting chain 700' to advance same to the stage which corresponds to the number of digit representing punches on the tape. Following passage of the holes representing the hours tenths digit across the aperture B and the movement of the narrow space immediately thereafter on the tape into position above aperture B, the clutch is dropped to stop the tape and the print circuit is completed to effect printing of the digit corresponding to the number of punches in the digit analyzed. Following printing of the digit, the punch counting chain is cleared, movement of the tape is again initiated, and the next series of holes operates drive relay 400 to advance the punch counting chain 700'.

Subsequent digits are counted and printed in the manner described, the holes in the tape separated by a narrow space effecting only the printing of the digit, and those separated by medium spaces effecting the printing of the digit and a dash (—).

As the wide space separating the calls on the tape is detected by the space recognition relays, the print relay is operated to print a series of stars to fill out the ticket and initiate the printing of a new ticket with a series of stars preparatory to examination of the next call on the tape.

The analyzer continues to read the tape in this manner until the tape runs out or the machine is stopped.

GENERAL OPERATION

Preparation

The reel 20 upon which the punched tape 21 is wound is positioned on the spindle 22 on the left hand side of the analyzer with the tape 21 feeding off the bottom of the reel to appropriate guide mechanism 23 which is arranged to feed the tape across the detecting equipment of the analyzer. At least two feet of blank tape is left on the outside of the roll to provide a leading length of unpunched tape which conditions the analyzer as the start switches are thrown and the blank end is moved over the detecting apparatus.

The lead end of the tape 21 is fed through the guide mechanism 23 whereby it passes over the scanning box 24, the top edge of the clutch arm 25, between a pair of dry rolls 26 and 27, through a slot in the hub of an empty reel 28 which is mounted on a spindle 29 located on the right hand side of the analyzer. The spindle 29 upon which take-up reel 28 is mounted rotates in a counter-clockwise direction.

Prior to operation of the equipment, the take-up reel 28 is moved one or two turns in a counter-clockwise direction to start the gathering of the tape thereon. Clutch arm 25 is now moved all the way to the left, and the tape is checked for proper positioning between the two pins 30 and 31 of the tape advancing relay 32. The first punch holes following the blank lead end must not as yet enter the guide apparatus 23 which feeds the tape across the scanning box 24.

As schematically shown in Figure 9, the final billing information as determined by the automatic analyzer equipment is printed in ticket form by printer mechanism 858, which is controlled by the analyzer in its operation. Prior to energization of the analyzer, a reel 850 holding a roll of blank paper 851 is loaded on the holding spindle 852 and the tape leading edge is threaded between the guide rolls 855, between the printing wheel 858 and the print hammer 854, and across the cutter 856. A hopper 857 is disposed relative to the tape 851 and cutting bar 856, so that as the billing information as determined by the automatic analyzer equipment is printed on the ticket by the printer mechanism, the cutting bar 856 is actuated to cut the previous ticket from the roll and cause same to be disposed in the hopper 857. It is noted that the showing in Figure 9 is a schematic representation of the apparatus which is more fully disclosed in the W. J. Zehner Patent 2,309,688, which issued February 2, 1943. The apparatus of Figures 8 and 9 is similar in nature to the equipment shown thereat with the exception that the print wheel 858 in the present embodiment has been reversed, that is, has been removed from the shaft, turned over, and remounted on the shaft 858.

Inasmuch as the tape 21 (upon which the billing information is recorded) comprises an outside tape feed which has been placed on the analyzer without rewinding, the output of the analyzer is in reverse order, and the print wheel must be reversed in order to obtain printing of the digits in the ascending order.

The analyzer is now prepared for operation.

Energization and control

The power switch 35 and the stop-run switch 36, Figure 1, are moved to the "on" position to energize the heaters in the electronic tubes in the equipment. It is apparent that the switches may be turned on before the tape is loaded so that as the reel loading operations are completed, the analyzer may be operated. A warmup period of approximately one minute is required after which the analyzer may be started by pushing the start button 37. Once the start button 37 has been operated, the analyzer will require no further attention until the tape 21 has been removed from reel 20 and examined by the analyzer unit.

Following examination of the entire roll, the reels are automatically stopped and the operator turns the power switch 35 to the "off" position. If another reel is to be run immediately, the power switch 35 may be left on and after a new roll of tape has been inserted, the start button 37 is again momentarily operated.

In the event that it is desired to stop the analyzer at any point during the run, the run-stop switch 36 may be moved to the "stop" position. The analyzer will automatically complete the analyzation of the particular call which was underway at the time that the run-stop switch 36 was moved to its "stop" position, the equipment being automatically moved to rest thereafter. Reoperation of the equipment after it has been stopped at a point in this manner is effected by throwing the run switch 36 to the "run" position, and pushing the start button 37.

In the event that the equipment is brought to rest prior to the accomplishment of a complete reading of the tape, and it is desired to examine the last ticket printed, a "blank" switch 38, Fig. 1, is operated to cause the printer to automatically run off a "blank" ticket (one on which only a series of stars are printed), and to cut off the ticket last printed so as to drop same into the collecting bin.

In the event of failure of commercial power, the analyzer will stop, and it will be necessary to operate the start button 37 when the power is returned to effect re-energization of the equipment.

Circuit response with analyzer energization

As the power switch 35 is operated, it is effective at its contacts 40 (Figure 4) to connect negative battery (250 volts) to conductor 399 and the cathodes of the electronic tubes in the analyzer; and at its contacts 41 effects connection of 6.3 volt potential to the filaments thereof, the potential in the present example being of a negative value in that the ground side of the equipment is tied to the positive side of the potential supply. With the operation of power switch 35, negative 250 volt potential is connected to the cathodes of the tubes in the photocell circuit. Since the scanning apertures A, B, C and D are covered by the lead end of the tape, the illuminating lamp 50 is cut off from the photocell tubes 370, 375, 390 and 395 and the tubes are ineffective from a conducting standpoint at this time.

Tube 360 (AB), a two section triode, is connected to respond to variations in the conductivity of phototubes 370 (A') and 375 (B') and to in turn control a pair of twin section triode tubes A and B, the latter tubes having relay members 400 and 405 connected in their plate circuits for control purposes as will be shown. Whenever the apertures A, B, C and D in mask 53 (Figure 2), are blanked by a solid tape portion, associated left sections of their corresponding control tubes A, B, C and D are biased to cut-off whereby the associated control relays A", B", C" and D" are maintained in the restored condition. More specifically, with aperture A blanked by a solid tape portion, the conductivity of the corresponding photocell tube 370 (A') is reduced to drive the grid 362 of the A section (left hand section in Fig. 3) of tube 360 (AB) positive to effect increased conductivity thereby. The A section of tube 360 conducts to impress a voltage on grid 305 of the right hand section of tube 300 to drive same positive with respect to cathode 306, whereby this section of the A tube conducts sufficiently to bias the grid 302 of its left hand section of tube 300 (A) negative with respect to its cathode 303. Relay 400 is therefore maintained in the restored condition.

In a similar manner, photocall 375 (B') renders the right hand section of tube 360 conductive, whereby the grid 320 of the right hand section of tube 315 (B) is driven positive with respect to its cathode 321 to bias the section to conductivity, and the left hand section of tube 315 (B) biased to cutoff thereby. Relay 405 (B") which is connected in the operating circuit of the left hand section of tube 315 (B) therefore remains in the restored condition.

A twin section triode 380 normally controls tubes 330 and 345 in a similar manner to control the corresponding energization and deenergization of relays 415 and 420 (C" and D"). However, the nature of the tape section above aperture B will also control the response of the relays C" and D" which are associated with apertures C and D. Specifically, if aperture B has a solid tape portion thereabove and its associated relay 405 (B") is restored thereby, the power supply to the plates 381 and 384 of tube 380 (CD) is interrupted and the photocell circuit associated with apertures C and D is disabled to prevent response thereof to the tape section passing thereover.

In such event, ground potential extends over contacts 406, 416, conductor 396 and resistor 338 to grid 335 to bias same positive with respect to cathode 336, whereby the right hand section of tube 330 conducts to bias the grid of the left hand section of tube 330 to cutoff. Relay 415 is thus maintained in its restored condition.

In a similar manner, ground potential is extended over contacts 406 and 421, conductor 397 and resistor 356 to grid 350 of tube 345 to cause the right hand section of tube 345 to conduct and in turn inhibit the tube's left hand conduction path, whereby relay 420 is maintained restored.

Summarily, then with operation of the power switch 35, the filaments and cathodes of the tubes in the photocell control circuit are energized, both sections of tube 360 (AB) and the right hand sections of tubes 300 (A) and 315 (B) are conducting whereby their left sections are biased to cutoff to maintain relays 400 and 405 (A" and B" respectively) in the restored condition. With relay 405 (B") restored, the right hand sections of tubes 330 and 345 are conductive, the left hand sections thereof are nonconductive and relays 415 and 420 (C" and D") are restored.

Following the brief delay pending tube heating, operation of the stop-run switch to the run position and momentary operation of the start button 37 is effected to initiate the automatic analyzation of tape 21 and the printing of the call tickets.

It will be assumed that the first telephone call on the roll will take the form shown in the upper part of Figure 10, each series of punches shown therein representing a digit (except the last series of punches which represents the duration in minutes of the call). The lower half of Figure 10 illustrates the resulting ticket which is printed by the equipment in response to the passage of the punched tape through the analyzing unit. The first series of six punches on the tape in Figure 10 represent the first digit of the calling party's number; the second series of five punches represents the second digit of the calling party's number, etc. Thus, the punches teach the following information:

65432—calling party number (in a universal type numbering system, the first digit will also be indicative of the office from which the call originated)
81234—called party number
02—the month of the year (February)
12—day of the month
115—time of day expressed in hours and tenths (115 will therefore be 11:30 p. m.)

The last series of punches, three in number in the present example, represent the minutes of conversation time, one punch being made for each minute (for twenty-five minutes there would be twenty-five punches).

It is noted that tape upon which the calls are recorded is fed through the analyzer without first effecting re-reeling of the tape. Accordingly, the analyzer will encounter the tape information in reverse order to that in which it was placed on the tape, i. e. the three punches representing the three minutes of conversation will pass through the analyzer first, the punches representing the hour will pass through secondly, etc. The digits on the final ticket are therefore printed in an ascending order, i. e. in the printing of the charge 015, the digit 5 is printed first, 1 is printed second and 0 is printed third. The manner of cooperation of the tape punches, the apertures A–D in mask 53, the photocells A'–D' inclusive and relays A"–D" inclusive will be apparent from the following disclosure with reference to Figure 2. Light from source 50 reaches photocell units A', B', C' and D' (370, 375, 390 and 395) whenever punches in the tape 21 are positioned over the corresponding apertures A, B, C and D in mask 53. In one embodiment eight millimeter tape was used for the recording of the call information with the tape holes .052 of an inch in diameter and the centers of adjacent holes .10 of an inch apart. The scanning apertures in mask 53 were approximately 3/8 inch wide, aperture A being .04 inch in length (longways of the taps) and having .06 inch intervening between its trailing edge and aperture B. Aperture B was .10 inch in length with .05 inch intervening between its trailing edge and aperture C. Aperture C was .10 inch in length with .05 inch intervening between its trailing edge and aperture D. Aperture D was .50 inch in length.

Aperture A recognizes each tape hole. Apertures B, C and D are for the purpose of recognizing and distinguishing between three types of spaces on the tape which are of different length and identified hereinafter as narrow, medium and wide spaces. Thus, aperture B recognizes a narrow space defined as the space encountered if one hole in the tape is skipped, as for example between digits of the calling number 65432. As shown in Figure 10, the calling number appears on the tape as six punches, a "narrow" space, five holes, another "narrow" space, etc. Aperture B recognizes these narrow spaces and effects the printing of the digit preceding same on the tape in the analyzation process as soon as the narrow space is positioned above aperture B.

Apertures B and C in conjunction recognize a medium space, that is a space on the tape which is equivalent in length to the space normally accommodating three, four, five or six punches. With reference to Figure 10, a medium space appears between blocks of information, as for example, between the calling number and the called number, the called number and month, etc.

Apertures B, C and D in conjunction recognize a wide space defined as a space which is equivalent in length to a space which will accommodate eight or more punches. A wide space will be encountered, for example, between successive calls on the tape.

With each passage of light through apertures A, B, C and D as a result of the positioning of a punch thereabove, the corresponding photocells A', B', C' and D' control operation of their associated relays 400 (A"), 405 (B"), 415 (C") and 420 (D"), with the following restrictions:

With relay 405 (B") released, relays 415 (C") and 420 (D") are prevented from changing position, either operating or releasing.

Furthermore, although slot A recognizes each tape hole, and relay 400 (A") operates whether relay 405 (B") is operated or non-operated, nevertheless during the periods that relay 405 (B") is non-operated, the functioning of relay 400 (A") is negated by relay B and the punch which passes over aperture A during this period is not registered. Thus, as the last hole of a digit passes over aperture B and brings the subsequent narrow space thereabove, the movement of the tape will be stopped and the last hole of the digit will not have had a chance to register via aperture A. The circuit, however, compensates for such condition by artificially recording on its register one more hole than has been counted, as will be observed in the following description.

*Circuit operation in analyzing a call*

ANALYZING CHARGES INDICATED FOR A CALL

With the operation of the start switch 37 (Figure 1), contacts 43 (Figure 4) are closed to complete an operating circuit for the start relay 430, the energizing circuit therefor extending from the negative battery over the winding of relay 430, C663, contacts 601, C664 and contacts 43 of the start switch 37 to ground.

Start relay 430 operates and starts the tape driving motor 51, the printer motor 800 and energizes the tape advancing relay 32 whereby the tape is started in its movement from reel 20 to reel 28 to move the punches representing the minutes of duration of the first call across apertures D, C, B and A. In detail, start relay 430 operates and at its contacts 431 completes an obvious energizing circuit over conductor 11 to the lamp 50 and the tape driving motor 51; at its contacts 433 completes a self-holding circuit which extends over contacts 601, 433, 843 and 44 of the "stop-run" switch to ground; at its contacts 435 completes an energizing circuit for the tape advancing relay 32, which circuit extends from negative battery over the winding of relay 32, C13, contacts 444, 46, 841 and 435 to ground; and at its contacts 435 completes an operating circuit for the printer motor 800, the circuit extending from negative battery over the operating coils of the printer motor 800, C801, contacts 46 and contacts 841 and 435 to ground. Thus, with operation of the start button 37, the lamp 50, the printer motor 800, the tape motor 51 and the tape advancing relay 32 are energized.

Tape motor 51 operates to rotate drive wheel 27 in a clockwise direction. As tape advancing relay 32 energizes to attract its armature 60 which rotates about a hinge 61, the clutch member 62 releases its grip on the portion of the tape 21 positioned between it and the clutch arm 25, whereby roller 26 presses the tape into engagement with the drive wheel 27, and the tape 21 is moved from reel 20 across the scanning box 24, between the two guide pins 30 and 31, and between the roller 26 and drive wheel 27. It should be observed at this point that a reverse spring drive connects a pulley on the shaft of drive wheel 27 with a pulley on the reel holding shaft 29 in such manner as to cause the reel 28 to turn in counter-clockwise movement, the reel 28 turning at such a speed as to keep the tape rolled up.

As the first punch in the tape which represents the first minute of timed conversation arrives at scanning box 24, the punch passes over slot D and then slot C on mask 53 (Fig. 2) and no operation of the equipment is effected, the portion of the photocell circuit associated with apertures C and D being disabled at this time by the restored control relay 405 (B") associated with aperture B.

As the first punch is now moved over aperture B, the light from illuminating lamp 50 is permitted to pass through the scanning aperture B to actuate the photocell B' associated therewith.

The conductivity of photocell 375 (B') is increased correspondingly and grid 365 of the right hand section of tube 360 (AB) is driven negative with respect to cathode 366 to decrease the conductivity of the right hand section of tube 360 (AB) sufficiently to bias grid 320 of the right hand section of tube 315 (B) negative with respect to its cathode 321, whereby the right hand section of tube 315 (B) becomes non-conductive. The resultant voltage change at plate 319 of the non-conductive section biases grid 317 of the left hand section positive with respect to its cathode 318, and the left hand section of tube 315 conducts.

As the left hand section of tube 315 conducts, an operating circuit is completed for relay 405 (B") which extends from ground over the winding of relay 405, conductor 327, the anode-cathode path of the left hand section of tube 315, and resistance 325 to 250 volt negative battery. It is noted that the two sections of tubes 315, 300, 330 and 345 are extinguished and rendered conductive in an extremely abrupt manner by reason of the above discussed arrangement, and also by reason of the connection of the cathodes of the two sections of each tube to 250 volt negative potential over a common resistor. Positive operation of the relay (A", B", C" or D") associated with each twin triode A, B, C and D in the flip-flop operation thereof is provided in this manner.

Space recognition relay 405 (B") operates at this time to enable the portion of the photocell circuit which is associated with apertures C and D, effects operation of the analyzer hold relay, and takes over control of the tape advancing relay 32.

In detail, relay 405 operates and is also effective at its contacts 406 to remove ground from conductors 396 and 397 which extend to the grids 335 and 350 of the right hand sections of tubes 330 (C) and 345 (D) respectively, whereby control of the tubes 330 (C) and 345 (D) is now completely transferred to the twin triode tube 380 (CD), at its contacts 408 completes an operating circuit for hold relay 440, the circuit extending from battery over the winding of relay 440, contacts 501, 491, contacts 446, contacts 408, contacts 46 to 435 to ground; and at its contacts 407 applies ground to conductor 398 to enable the twin section tube 380 (CD) for operation responsive to the passage of the tape above apertures C and D, it being remembered that operation of the sections of tube 380 (CD) by photocells 390 and 395 as the punches passed thereover has been prevented prior to this time by reason of the absence of potential on plates 381 and 384 respectively. As plate potential is now supplied to plates 381 and 384 of tube 380, both sections of the tube are conditioned for operation in response to activation of phototubes 390 (C') and 395 (D') by the passing tape 21.

With reference to Figure 11b, with the first punch of the minutes group positioned above aperture B, the second punch will be positioned above aperture C and the third punch as well as the first punch of the next group will be positioned above aperture D. Photocells 390 (C') and 395 (D') will accordingly be activated and the control grids 382 and 385 of the respective sections of control tube 380 (CD) will both be negatively biased with respect to their cathodes 383 and 386 respectively to effect reduced conductivity thereby. As a result of the reduced conductivity of both sections, the potential impressed upon grids 335 and 350 of the right hand section of tubes 330 (C) and 345 (D) respectively is reduced to bias same to cutoff whereby the grids 332 and 347 of the left hand sections of tubes 330 (C) and 345 (D) are driven positive with respect to their cathodes 333 and 348 and the left hand sections of tubes 330 and 345 conduct to energize the control relays 415 (C") and 420 (D") connected in circuit therewith.

At this time, the tape has advanced to the position shown in Figure 11b, and relays 405 (B"), 415 (C") and 420 (D") are operated.

*Registration of the first minute punch*

In that the operating circuit for the tape advancing relay 32 is maintained closed by the operated relay 405 (B"), the advancement of the tape is continued and the first punch on the tape 21 now passes over aperture A of the mask 53. As will be apparent hereinafter, aperture A recognizes each of the punches in the tape and effects registration of the number of punches in a group "n" responsive to the counting of n−1 punches.

As the first punch in the tape moves across aperture A, light from the illuminating lamp 50 passes through the punch and aperture A to the photocell 370 (A') to effect increased conductivity thereby and an increased negative potential is impressed upon grid 362 of tube 360 (AB). The resultant decrease in conductivity of the left hand section of tube 360 (AB) results in an increased negative potential in the cathode circuit which is extended to grid 305 in the right hand section of tube 300 (A) to effect a reduction in the conductivity thereof. With the reduction in conductivity of the right hand section of tube 300 (A), the voltage of the plate 304 becomes more positive and as the voltage appearing at the anode 304 increases in the positive direction, a positive biasing voltage is impressed upon grid 302 of the left hand section of tube 300 (A).

As the potential of cathode 306 increases in a negative direction, the negative potential appearing at cathode 303 is correspondingly increased to drive same more negative. Since this potential change occurs simultaneously with the application of an increasing positive potential to grid 302, it will be seen that a more positive snap action operation is effected in the flip flop operation of the tubes. The interconnection of the cathodes in the two-section tubes in this manner to provide such trigger-like action is important in that the normal operation of the tubes would tend to be hazy if operated in direct response to the photocells, which vary in conductivity as the tape punch is moved across the corresponding aperture in the scanning mask. It will be appreciated that a like arrangement is provided for each of the relay controlling tubes 300 (A), 315 (B), 330 (C) and 345 (D).

Counting chain drive relay 400 operates over the circuit prepared by the left hand section of tube 300 (A) in its operation, the circuit extending from ground over the winding of relay 400, conductor 312, the left hand section of tube 300, resistance 310 to negative battery as applied to conductor 399 over contacts 40 of the power switch 35. Counting chain drive relay 400 at its contacts 403 completes the initial operating circuit to the first relay 600 of the minute counting chain 600', the circuit extending from negative battery over the winding of relay 600, contacts 615, 623, 634, C667, contacts 466, 410, C672, contacts 771, 761, C671, contacts 403, 463, 447 and 442 to positive battery (see Table 1A). The first counting chain relay 600 operates to register the first minute punch and to prepare the minute counting chain 600' for energization in the event that the group includes further minute punches.

As the tape continues to advance, the first minute hole is moved from its position above aperture A, and the following tape portion blanks the rays of the illuminating lamp 50 from the photocell 370 to decrease the conductivity thereof, whereby the left hand grid 362 of tube 360 (AB) is made positive with respect to cathode 363 to effect increased conductivity of the left hand section of tube 360. As the conductivity of the left hand section of tube 360 increases, the voltage at grid 305 of the right hand section of tube 300 (A) becomes more positive, whereby increased conductivity of the right hand section of tube 300 is effected, and a more negative voltage is impressed on the interconnected grid 302 of the left hand section of tube 300 (A). The left hand section of tube 300 (A) is biased to cut off and counting chain drive relay 400 is restored with trigger-like action.

Counting chain drive relay 400 restores and at its contacts 403 interrupts the initial energizing circuit for the minute counting chain relay 600, and at its contacts 404 completes the minute chain advancing circuit which extends from negative battery over the winding of relay 600, the upper winding of relay 610, contacts 603, C665, contacts 404, 463, 447 and 442 to ground. (See Table 1A.)

As the tape is advanced by the clutch mechanism to bring the second minute punch above aperture A the counting chain drive relay 400 is operated in the manner above described and at its contacts 404 interrupts the advancing circuit for the first and second minute counting chain relays 600 and 610 to effect the release of the first relay 600; and at its contacts 403 completes the holding circuit for the minute chain relays, to hold the second minute counting chain relay 610 operated. The holding circuit extends from negative battery over the lower winding of relay 610, contacts 614, 623, 634, 466, 410, C672, 771, 761, C671, 403, 463, 447 and 442 to ground.

As the tape advances and moves the second punch from its position above aperture A, the solid portions of the tape between it and the third punch interrupt the rays of lamp 50 to render the photocell 370 (A') less conductive and to effect the restoration of the counting chain drive relay 400 in the manner described.

Counting chain drive relay 400 restores, and at its contacts 404 completes the chain advancing circuit for the second and third minute counting chain relays 610 and 620, the circuit extending from negative battery over the winding of relay 610, the upper winding of relay 620, contacts 613, 602, C665, contacts 404, 463, 447 and 442 to ground. The operated pair of relays (the second and third relays of the chain) indicates that two punches have passed over aperture A.

At the approximate time that the first punch leaves aperture A, the third hole leaves aperture C, and inasmuch as a medium space follows the three minute punches, relay 415 (C") will now be restored. It is again noted that relay 415 (C") is permitted to change positions in response to the passing tape punches only during the periods relay 405 (B") is operated.

As the tape advances, the third minute punch hole is moved from aperture B toward aperture A and the initial section of the medium space following the minute punches is moved over aperture B, the rays of the illumination lamp 50 are cut off to render photocell 375 (B') less conductive, whereby the first space recognition relay 405 (B") is restored, the control of relay B by its photocell tube 375 (B') and twin triodes 360 and 315 being similar to that set forth relative to the control of relay 400 (A") by its associated photocell 370 and control tubes 360 and 300.

With the release of space recognition relay 405 (B") as a result of the advancement of the initial portion of the medium space into position over the aperture B and the recognition of the medium space by relays B" and C" in their restored positions, the tape is stopped, the charge 015 is printed on the ticket 851 in ascending order, and the fact that three characters are registered on the ticket is registered on the character counting chain 500'. In detail, relay 405 at its contacts 408 interrupts the energizing circuit for the tape advancing relay 32 to release same and terminate the advancement of the tape; at its contacts 409 completes an energizing circuit to the printer mechanism to effect printing of the digit "5" on ticket paper 851 by applying marking ground to segment 5 of the print commutator 810. It will be appreciated that since there are three minute holes in the tape, and the present apparatus is to assess a charge of fifteen cents (15¢) for the first four minutes, the total charge for the call of the present example will be fifteen cents (15¢). The equipment is operative at this time therefore, to print the numeral 5, it being remember that the printing on the ticket paper 851 is being accomplished in an ascending order. It is also apparent that the value of the charge to be printed in each case as the medium space following the minute punches encounters aperture B is determined by the point of advancement to which the minute counting chain 600' (and its associated chains 700' and 750') have been operated in the counting of the minute punches. (See Table 13.)

It will be remembered that with the initial energization of the equipment, the printer motor 800 was energized and was effective through its driving mechanism 806 to drive a pair of interconnected brushes or arms 807 over a set of commutator segments 810, in search of marking ground. With reference to the aforementioned Zehner patent, it will be seen that with the application of ground to one of these segments and the engagement of such segment by the rotating brushes or arm 807, an operating circuit is completed to the print relay 825, which operates and presses a so-called stabber member between two teeth on an index wheel to render effective an associated slipping clutch. The drive shaft for the commutator member and the type wheel are maintained motionless thereby for printing purposes, the slipping clutch permitting continuous running of the motor during this period.

With the operation of the print relay 825, a printer hammer 854 is operated to force the paper against the character associated with the grounded segment and the printing of the desired number on the paper ticket is effected.

Thus, in this example, as the sequence recognition relay 405 (B") restores with the second and third minute counting chain relays 610 and 620 in the operated condition, a ground is placed on segment "five" of the print commutator to indicate the existence of three minute punches on the tape. The ground application circuit for segment "five" as shown in Table 13 extends from ground over contacts 442, 409, 485, 419, 423, 448, 456, 476, C669, contacts 605, 616, C680, contacts 507, 518, conductors C597 and C815, the fifth commutator segment, the brushes on arm 807, ring 809 and the operating coil of print relay 825 to negative battery. Print relay 825 operates, and in the manner heretofore described causes the print wheel 858 and commutator sweep arm 807 to be rendered motionless, whereby the print hammer 854 in its operation causes the impression of the selected numeral 5 on the printed ticket 851.

With the operation of the print relay 825 and the initial movement of its armature 835, the operating arm thereon is moved out of contact with the member 826 to permit the closing of contacts 827, and in its further movement engages contact lever 828 to control the closing of contacts 829, whereby an operating circuit is completed for the print indication relay 480, the circuit extending from negative battery over the winding of relay 480, C803, contacts 829, 827, C805, contacts 409 and 442 to ground.

Print indication relay 480 operates and at its contacts 484 completes a self holding circuit extending over conductor 804, contacts 827, C805 and contacts 409 and 442 to ground; at its contacts 482 completes the initial operating circuit to the character counting chain 500' to register thereon the completion of the printing of one character on the ticket member 851. The initial energizing circuit extends from negative battery over the winding of relay 500, contacts 514, 525, 533, 544, C591, contacts 482, 447 and 442 to ground. (See Table 3a.)

Print indication relay 480 is also effective at its contacts 483 to complete an operating circuit for the print termination relay 450, the circuit extending from negative battery over the winding of relay 450, contacts 483, 409 and 442 to ground.

The print termination relay 450 operates, and at its contacts 456 interrupts the energizing circuit for the print relay 825 which restores and at its contacts 829, opens a point in the original operating circuit for the print indication relay 480, which is maintained temporarily operated over the holding circuit which extends over contacts 827. As the armature 835 returns to its normally restored position to effect the opening of contacts 827 the locking circuit for the print indication relay 480 is interrupted to restore same. The return to normal position of armature 835 also operates a ratchet mechanism which advances the ticket paper in preparation for the printing of the next character. As will appear hereinafter, the utilization of the two contacts sets 827 and 829 for the successive control of the original energizing circuit and the holding circuit for the print indication relay 480 permits the print relay 825 to go through its complete cycle when used in a self interrupting circuit at a later point in the analyzer operation.

Print indication relay 480 restores, and at its contacts 482 also opens the initial energizing circuit 480 for the first relay 500, and at its contacts 481 completes the advancing circuit to energize in series the first and second character counting chain relays 500 and 510 respectively, the circuit extending from negative battery over the winding of relay 500, the upper winding of relay 510, contacts 503, C590, contacts 481, 447 and 442 to ground. Relay 480 at its contacts 483 also interrupts the energizing circuit for print termination relay 450 which restores and at its contacts 456 continues the printing operation by applying ground to segment "one" on the printer commutator 810, the groud application circuit being extended from ground over contacts 442, 409, 485, 419, 423, 448, 456, 476, C669, contacts 605, 616, C680, contacts 506, C594, C595, 776, 768, 706, 718, 728, 737, 748, conductor 811, segment "one" of the print commutator 810, the brushes on arm 807, ring 809 and the winding of the print relay 825 to negative battery. The print mechanism operates as before to effect the printing of the digit "1" on the ticket member 851.

Print relay 825 in its operation also controls its armature 835 to close contacts 827 and 829 to complete the operating circuit for the print indication relay 480 (Table 4), which operates and at its contacts 483 completes the energizing circuit for the print termination relay 450 (—, R450, 483, 409, 442, +), and at its contacts 481 interrupts the advancing circuit for the character counting chain 500' to release the first relay 500, the second character counting chain relay 510 being maintained operated over the chain holding circuit extending from negative battery over its lower winding, contacts 513, 525, 533, 544, C591, contacts 482, 447 and 442 to ground. (Table 3a).

Print termination relay 450 operates and at its contacts 456 interrupts the energizing circuit to print relay 825 which restores and at its contacts 827 and 829 interrupts the energizing circuit for the print indication relay 480.

Print indication relay 480 restores, and at its contacts 481 completes the advancing circuit for the second and third character counting chain relays 510 and 520, the circuit extending from negative battery over the lower winding of relay 510, the upper winding of relay 520, contacts 512, 503, C590, contacts 481, 447 and 442 to ground; and at its contacts 483 interrupts the energizing circuit for the print termination relay 450 to effect the restoration thereof.

As print termination relay 450 restores the printing of the digit "0" is effected, ground being applied to the tenth segment of the print commutator 810, thereby over a circuit extending from ground over contacts 442, 409, 485, 419, 423, 448, 456, 476, C669, contacts 605, 616, C680, contacts 507, 517, C596, contacts 784 and C820, the tenth segment of the commutator 810, the brushes on arm 807, ring 809, and the winding of print relay 825 to negative battery.

Print relay 825 operates in the manner of previously described printing operations to print the digit zero (0) on the ticket 851 and through its armature 835 effects the operation of contacts 827 and 829 to complete the operating circuit for the print indication relay 480 (Table 4).

Print indication relay 480 operates and at its contacts 483 completes the energizing circuit for the print termination relay 450 (−, R450, 483, 409, 442, +); at its contact 481 interrupts the advancing circuit for the character counting chain 500′ to effect the restoration of the second relay 510, the third relay 520 being maintained operated over its chain holding circuit as completed over the lower winding of relay 520, contacts 525, 533, 544, C591, contacts 482, 447 and 442 to ground.

Print indication relay 480 at its contacts 483 completes an operating circuit for the print termination relay 450 (−, R450, 483, 409, 442, +), which ground is also extended over C587, contacts 521, C588 and contacts 461 to the switching relays 460 and 470 in series to negative battery which are responsively operated. As more fully shown hereinafter switching relays 460 and 470 are effective at their contacts 466 and 468 to disconnect the minute counting chain 600′ from control by the drive relay 400 (A″); and at contacts 465 and 467 to connect the punch counting chain 700′ for operation by drive relay 400 (A″) as further punches on the tape operate same.

Print termination relay 450 and charge termination relay 460 operate to interrupt at contacts 451 and 463 the holding circuit for the energized minute counting relays (610 and 620 in the present example) to effect the restoration thereof. Print termination relay 450 at its contacts 456 interrupts the holding circuit for the printing relay 825 which restores and at its contacts 827 and 829 interrupts the holding circuit for print indicating relay 480. Print indication relay 480 restores to effect printing of the dash character, registration of another printing operation on the chain and reenergization of relay 32 to move the tape 21 across the analyzer. This is, the relay 480 at its contacts 481 completes the advancing circuit for the character counting chain 500′ to operate the fourth relay 530 in series with the third relay 520, the circuit extending from negative battery over the lower winding of relay 520, the upper winding of relay 530, contacts 523, 511, 502, C590 contacts 481, 447 and 442 to ground; also 483 interrupts the energizing circuit for the print termination relay 450, which is held operated at this time by the aforedescribed hold circuit (−, R450, contacts 452, 402, 471, 409, and 442, +); and at its contacts 485 completes an energizing circuit for the tape advancing relay 32, the circuit extending from ground over contacts 442, 409, 485, 419, 423, 448, 455, 474, C593, contacts 579′, C592, rectifier 412, contacts 498 and conductor 13 to the winding of the tape advancing relay 32 and negative battery; and at its contacts 485 effects the application of ground to the "dash" (—) segment on commutator 810 to effect the printing of a "dash" (—) character on the ticket, the ground being applied over a circuit extending from ground contacts 442, 409, 485, 419, 423, 448, 455, 474, C593, contacts 579′, C592, contacts 499′, C823, the commutator segment marked "dash" (—), and brushes on the arm 807, ring 809 and the print relay 825 to negative battery. The dash character is now printed on the ticket in the manner of previous printing operations.

The print relay 825 operates to effect impression of the character "dash" (—) and at its armature 835 closes contacts 827 and 829 to complete an operating circuit for the print indication relay 480 in the manner heretofore described.

Print indication relay 480 operates and at its contacts 481 interrupts the hold circuit for the character counting chain to effect release of the third relay 520 and at contacts 482 completes the chain holding circuit to hold the fourth counting chain relay 530, (−, lower winding of relay 530, 532, 544, C591, 482, 447 and 442, +).

Thus following registration of the charge (015) on the ticket and reinitiation of the movement of the tape from reel 20 to reel 28, the print indication relay 480, print termination relay 450, print relay 825, termination relay 460 and 470, hold relay 440, start relay 430, recognition relay 420 (D″) and counting chain relays 520 and 530 are in the operated position.

It might be observed that the tape advancing relay 32 is held energized at this time over contacts 829 which bridge contacts 485.

ANALYZATION OF HOURS TENTHS DIGIT

As the tape advances, the last minute punch hole is moved over aperture A to operate associated relay 400 (A″), the operation being without effect in that the equipment effectively counted this pulse by adding "one" to the number of pulses actually counted as the analyzer stopped to print the charge. Thus although only two punches were counted by the chain 600′, an indication of three punches was made by the chain to the charge conductors.

As the third punch now passes over the aperture A the counting chain drive relay 400 operates but since the recognition relay 405 (B″) is still restored the circuit to the minute counting chain 600′ is interrupted at contacts 410 thereon and no relay operation will be effected by the drive relay 400 (A″) in its energization at this time.

As the third hole leaves the aperture A, counting chain drive relay 400 restores in an obvious manner. As the last of the three punches representing the minutes elapsed passes aperture A, the medium space immediately subsequent thereto is positioned over apertures B and C as is evident from Figures 2 and 3. With further movement of the tape the first punches of the calling hour are moved over aperture C. The corresponding space recognition relay 415 (C″) remains in its restored condition, however, in that the space recognition relay 405 (B″) is still in the restored position and the portion of the photocell circuit for operating relays C″ and D″ is disabled. As the tape advances to bring the first hole of the punches representing the hour of the call over aperture B, the energizing circuit for the first space recognition relay 405 (B′ ′) is completed, whereby relay 405 operates and at its contacts 407 connects ground over conductor 398 to the plate of twin triode 380 to enable the circuit for response to the particular condition of the tape over the apertures. Inasmuch as space recognition relay 420 (D′ ′) was in the operated condition when the circuit was previously disabled, and in that the punch holes representing the hour of the call are now over aperture D, space recognition relay 420 (D′ ′) will remain in its operated position. Space recognition relay 415 (C′ ′), however, which was in the restored position when the circuit was disabled will now be energized as a result of the calling hour punches which are above aperture C.

Space recognition relay 405 (B′ ′) is also effective at its contacts 408 to connect ground on contacts 442 over contacts 444 and C13 to maintain the tape advancing relay 32 energized and thereby effect continued operation of the driving mechanism for the tape member; and at its contacts 409 interrupts the holding circuit for the print indication relay 480, the holding circuit for relay 450, as well as a point in the energizing circuit for print relay 825.

Print indication relay 480 restores, and at its contacts 481 completes the advancing circuit for the fourth and fifth character counting chain relays 530 and 540, the circuit extending from negative battery over the lower winding of relay 530, the upper winding of relay 540, contacts 531, 522, 511, 502, conductor 590, contacts 481, 447, and 442 to ground to register the printing operation in which the fourth character was printed on the ticket. The fifth counting chain relay 540 operates and completes an operating circuit for the first cycle counting chain relay 550 to register the completed cycle of the first five relays, the circuit therefor extending from negative battery over the winding of relay 550, contacts 558, 565 and 542 conductor 589 and contacts 447 and 442 to ground.

With the further advancement of the tape, the first calling hour punch is moved over aperture A, the tape now being in the position indicated in Figure 11D.

As the first punch of the tenths digit of the calling hour passes over aperture A, the counting chain drive relay 400 (A") is operated in the manner heretofore described, and at its contacts 403, completes the prepared operating circuit for the first relay 700 of the punch counting chain 700', the circuit extending from negative battery over the winding of relay 700, contacts 714, 724, 733, 744, C679, C688, contacts 465, 410, C672, contacts 771, 761, C671, contacts 403 and 451, 447 and 442 to ground.

As the succeeding punches of the tenths hour digit on the tape pass over aperture A, the associated photocell circuit and the counting chain drive relay 400 (A") operate to register the counted punches on punch counting chain 700'. Thus as the tape advances and the first punch is moved from its position above aperture A to effect the release of the counting chain drive relay 400 (A"), contacts 403 are opened to the original energizing circuit for the first counting chain relay 700, and make-before-break contacts 404 are closed to complete the advancing circuit to the first and second punch counting chain relays 700 and 710 in series, the circuit extending from negative battery over the winding of relay 700, the upper winding of relay 710 contacts 702, C670, contacts 467, 404, 451, 447 and 442 to ground.

As the second punch is positioned above aperture A, drive relay 400 (A") restores and at contacts 404, interrupts the energizing circuit for the first punch counting chain relay 700 to effect the restoration thereof, the second punch counting chain relay 710 being held over the chain holding circuit extending from battery over the lower winding of relay 710, contacts 713, 724, 733, 744, C679, C668, contacts 465, 410, C672, contacts 771, 761, C671, contacts 403, 451, 447 and 442 to ground.

As the tape advances and moves the second hole from its position above aperture A, the counting chain drive relay 400 restores, and at its contacts 404, completes the chain advancing circuit over C670 as described (Table 5a), whereby the second and third counting chain relays 710 and 720 are operated in series, the ground on C670 being extended over contacts 701, 712, the upper winding of relay 720 and the lower winding of relay 710 to negative battery. The manner of advancement of the punch counting chain by drive relay 400 at its contacts 403 and 404 is obvious with consideration of the operation of the first and second relays 700 and 710 of the counting chain and the cited table references. As the tape advances and the second punch of the hours tenths digit is moved from its position above aperture A, the advancing circuit is connected over C670 to effect the series operation of the second and third punch counting chain relays 710 and 720.

As the tape advances and the third hole moves into position above aperture A, counting chain drive relay 400 operates to interrupt the advancing circuit over C670 whereby the second counting chain relay 710 is restored, and to complete the holding circuit over C679 to hold the third counting chain relay 720. As the tape advances and the third punch of the hours tenths digit is moved from its position above aperture A, the counting chain drive relay 400 (A") restores to interrupt the holding circuit extending over conductor 679 and to complete the advancing circuit over C670 to effect the series operation of the third counting chain relay 720 and the fourth counting chain relay 730.

As the tape advances and the fourth punch of the hours tenths digit is moved to a position above aperture A, counting chain drive relay 400 (A") operates to interrupt the advancing circuit extending over C670 to effect the restoration of the third counting chain relay, and to complete the holding circuit over C679 for the fourth punch counting chain relay 730. As the tape advances to move the fourth punch from its position above the aperture A, the counting chain drive relay 400 (A") interrupts the holding circuit for the fourth counting chain relay 730, and completes the advancing circuit over 670 for the punch counting chain 700' to operate relay 730 in series with the fifth punch counting chain relay 740.

As the fifth punch counting chain relay 740 operates, it is effective at its contacts 742 to complete an energizing circuit for the first relay 750 of the cycle counting chain 750', the circuit extending from negative battery over the winding of relay 750, contacts 766, 774, 742, 451, 447 and 442 to ground. The operation of the cycle counting chain relay 750 indicates that the punch counting chain 700' has completed one cycle whereby it has the first five punches of the digit registered thereon.

At the approximate time that the fourth punch is moved from above aperture A, the fifth (and last punch in this example) leaves its position above aperture B (see Figure 11e), whereby the narrow space immediately following the last punch of the hours tenths digit is moved over aperture B and narrow space recognition relay 405 (B") releases in the manner heretofore described to effect release of the tape advancing relay 32 whereby tape advancement is stopped, and to effect the printing of the digit (5 in this example) which is registered on the punch counting chain 700'.

Briefly, as the narrow space is moved by the advancing tape into position above aperture B, the space recognition relay 405 restores and at its contacts 408 interrupts the energizing circuit for the tape advancing relay 32 to terminate the advancement of the tape; and at its contacts 409 completes the energizing circuit over segment five of the commutator 810 to the print relay 825 to effect the printing thereby of the digit 5 upon the ticket as in previous printing operations, the present relay energizing circuit extending from ground over contacts 442, 409, 485, 418, 454, 472, C594, C595, contacts 776, 768, 706, 718, 728, 736, C815, segment "5" of commutator 810, the brushes on arm 807, ring 809 and the winding of print relay 825 to negative battery. As print relay 825 operates to effect the printing of the digit "5" on the ticket, it is also effective at its armature 835 to close contacts 827 and 829 and thereby complete the energizing circuit to the print indication relay 480 in the manner effected during the printing of the charge "015".

Print indication relay 480 operates, and at its contacts 481 interrupts the advancing circuit extending over C590 for the fourth and fifth relays 530 and 540 of the character counting chain 500' (Table 5a), and at its contacts 482 completes the holding circuit over C591 for the fifth relay 540 (Table 5b), and at its contacts 483 completes an energizing circuit for the print termination relay 450 as in the manner of the previous printing operations.

Print termination relay 450 operates and at its contacts 456 interrupts the energizing circuit for the print relay 825, which responsively restores; at its contacts 451 interrupts the holding circuit for the counting chain 700' to restore relays 730 and 740 thereof, the fifth counting chain relay 740 in its restoration effecting the opening of contact 742 and the consequent release of the first cycle counting chain relay 750.

Print relay 825 restores, and at its contacts 827 interrupts the holding circuit for the print indication relay 480 which responsively restores and at its contacts 482 interrupts the holding circuit to the character counting chain 500′ to restore the fifth relay 540. Chain relay 540 restores and at its contacts 541 completes the advancing circuit to the cycle chain 550′ over C589 to energize relays 550 and 555 in series.

Print indication relay 480 restores and at its contacts 485 completes an energizing circuit to the tape advancing relay 32 to once more initiate advancement of the tape member 21, the energizing circuit now extending from negative battery over the winding of tape advancing relay 32, C13, contacts 498, rectifier 413, contacts 453, 418, 485, 409 and 442 to ground.

It will be observed with reference to Figure 11e, that as the last punch of the hours tenths is moved across aperture A, the last punch leaves aperture B and the narrow space on the tape moves above aperture B to terminate the tape movement. At that time the space recognition relay 420 (D″) associated with aperture D is held operated by the punch of the hours tens digit and relay 415 (C″) associated with the aperture C will be held operated by the punches of the hours units digit, relays C″ and D″ remaining in the operated condition during the period that the relay B″ is restored.

ANALYZATION OF HOURS UNITS DIGIT

As the tape now advances to move the narrow space between the hours tenths and units digit from above the aperture B, the last punch of the hour tenths digit is moved over aperture A, to operate the counting chain drive relay 400 without effect in that space recognition relay 405 (B″) is still restored. As the hours units punch leaves aperture C and assumes a position between apertures B and C relay 415 (C″) is held operated as follows. The operation of relay 415 holds ground off lead C396, grid 335 maintaining a negative potential via resistor 388. This maintains the right side of tube 330 non-conducting and the left side conducting. (Incidentally at this point it might be mentioned that a similar circuit is arranged for relay 420 (D″) but is not operative at this time.) As the first punch of the hours units digit is moved above aperture B, the associated space recognition relay 405 (B″) operates to enable the photocell circuit associated with apertures C and D whereby relays C″ and D″ are operated to the positions indicated by the tape punches, and at its contacts 409 interrupts the holding circuit for the print termination relay 450 to effect the restoration thereof.

As the tape advances to move the last (and only) punch of the hours units digit from its position over the aperture B and to move the narrow space immediately following same into registration with the aperture B, the space recognition relay (B″) restores to interrupt the energizing circuit for the tape advancing relay 32, whereby movement of the tape is again stopped, and effects the printing of the hours unit digit (1 in the present example) on the ticket. That is relay 405 at its contacts 409 completes an energizing circuit to print relay 825 extending from ground over contacts 442, 409, 485, 418, 454, 472, C594, C595, contacts 776, 768, 706, 718, 728, 737, 748, conductor 811, segment "1" of the commutator 810, brushes on arm 807, ring 809 and the winding of the print relay 825 to negative battery.

Print relay 825 operates to effect the printing of the digit "1" on the tape as in previous printing operations and at its contacts 829 completes an operating circuit for the print indication relay 480 as in previous printing operations.

Print indication relay 480 operates, and at its contacts 482 completes the operating circuit for the first character counting chain relay 500 (this being the second cycle thereof as indicated by the operated condition of cycle relays 550 and 555), the operating circuit therefor extending from negative battery winding of relay 500, contacts 514, 525, 533, 544, conductor 591, contacts 482, 447 and 442 to ground. (Table 3a.)

Relay 480 in operating closes its contacts 483 to complete the aforedescribed operating circuit to the print termination relay 450, which operates and at its contacts 456 interrupts the energizing circuit for the print relay 825.

Print relay 825 restores and at its contacts 827 interrupts a point in the holding circuit for the print indication relay 480 to effect the restoration thereof.

Print indication relay 480 restores and at its contacts 481 completes the advancing circuit over C590 for the first and second character counting chain relays 500 and 510 (Table 3b) and at its contacts 485 completes the energizing circuit to the tape advancing relay 32 to effect the further advancement of the tape (Table 6b).

ANALYZATION OF HOURS TENS DIGIT

Tape advancing relay 32 operates to effect the forward movement of the tape across the scanning mask 53, the last (and only) punch of the hour units digit being moved over the aperture A to effect operation of the counting chain drive relay 400 (A″) without effect by reason of the restored condition of relay 405 (B″).

As the tape advances, the first (and only) punch of the hours tens digit is moved into position over aperture B to effect the operation of the space recognition relay 405 (B″) in the manner heretofore described.

With the operation of the space recognition relay 405 (B″) responsive to the positioning of the first punch of the hours tens digit thereabove, the contacts 409 are opened to interrupt the holding circuit for the print termination relay 450 to effect the restoration thereof, and contacts 407 are closed to enable the portion of photocell circuit associated with apertures C and D and the relays are controlled to operate in accordance with the nature of the tape thereabove. Inasmuch as the hour tens digit is followed by a medium space (the equivalent of three punches) which space is in turn followed by the day units digit, the space recognition relay 420 (D″) associated with aperture D will be maintained in the operated condition by the punches of the day units digit. The space recognition relay 415 (C″) will, as a result of the position of the medium space thereabove, be operated to the restored condition.

As the tape advancement is continued and the first (and only) punch of the hours tens digit is moved from its position above aperture B, the medium space immediately following the same on the tape is moved above space recognition relay 405 (B″) and the restoration thereof is effected in the manner previously described. Relay C″ is restored and relay D″ is operated at this time.

Space recognition relay 405 restores and at its contacts 408 interrupts the energizing circuit for the tape advancing relay 32 to terminate the operation thereof and the advancement of the tape 21; and at its contacts 409 completes an energizing circuit to print relay 825 which operates to effect the printing of the digit "1" on the ticket, the circuit extending from ground over contacts 442, 409, 485, 419, 423, 448, 456, 475, C594, C595, contacts 776, 768, 706, 718, 728, 737, 748, C811, the brushes on arm 807, ring 809 and the winding of print relay 825 to negative battery.

Print relay 825 operates in the manner heretofore described to effect the printing of the hours tens digit "1" on the ticket, and through its armature 835 effects the closure of contacts 827 and 829 to complete the energizing circuit for the print indication relay 480 in the manner previously described.

Print indication relay 480 operates and at its contacts 481 interrupts the advancing circuit over C590 (Table 3b) for character counting chain relays 500 and 510 to effect the release of relay 500 and at its contacts 482 completes the holding circuit over C591 for the second character counting chain to hold relay 510 (Table 3a).

Print indication relay 480 operates and at its contacts 483 closes the operating circuit to the print termination relay 450 which operates, and at its contacts 454 interrupts the energizing circuit for the print relay 825 to effect the restoration thereof. Print relay 825 restores and at its contacts 829 effects release of the print indication relay 480.

Print indication relay 480 restores and at its contacts 481 completes the advancing circuit for the character counting chain 500' to energize the second relay 510 and the third relay 520 in series.

As print indication relay 480 restores following interruption of the hours tens digit printing circuit by the print termination relay 450, it is effective at its contacts 485 to complete an energizing circuit to the tape advancing relay 32 (Table 6a) and also to control printing of the dash (—) character on the ticket, this operation being effected as the result of the recognition by relays B" and C" of the medium space. The energizing circuit extends from ground over contacts 442, 409, 485, 419, 423, 448, 455, 474, C593, contacts 579', C592, contacts 499', C823, the segment marked dash (—) on commutator 810, brushes on arm 807, ring 809, the winding of the print relay 825 to negative battery.

Print relay 825 operates in the manner heretofore described to effect the printing of the dash (—) character on the ticket and through its armature 835 effects the closure of contacts 827 and 829 to complete an energizing circuit for the print indication relay 480.

Print indication relay 480 operates and at its contacts 485 interrupts the energizing circuit for the tape advancing mechanism just completed; at its contacts 484 extends the ground from its operating circuit to the tape advancing relay 32 to maintain same energized and effect the continued advancement of the tape; at its contacts 481 interrupts the advancing circuit extending over C590 to restore character counting relay 510 and at its contacts 482 completes the chain holding circuit over C591 to hold relay 520.

ANALYZATION OF DAYS UNITS DIGIT

As the tape is now advanced, the medium space passes over the apertures C and B, and the first punch of the days units digit is moved over aperture C without effect (B" long restored).

As the first punch of the days units digit is moved over aperture B, space recognition relay 405 (B") associated therewith is operated in the manner heretofore described, and at its contacts 407 effects the enablement of the portion of the photocell circuit which is associated with apertures C and D to permit the operation thereof to positions corresponding to the punches which are aligned therewith. Inasmuch as the day designation comprises a units and tens digit followed by an arrow space which is in turn followed by the first punches of the month units digit, the punches will be positioned above apertures C and D.

Space recognition relay 405 (B") is also effective at its contacts 409 to interrupt the holding circuit for the print indication relay 480, the print relay 825 and the print termination relay 450 to effect the restoration thereof; and at its contacts 408 extends the operating ground over conductor 13 to tape advancing relay 32 to effect continued tape advancement.

Print indication relay 480 restores and at its contacts 481 completes the advancing circuit over C590 for the character counting chain 500' to operate the third and fourth relays 520 and 530 in series (Table 3b). The character counting chain now indicates that eight characters have been printed on the ticket.

As the advancement of the tape continues and the first punch of the days tens digit is brought into position above the aperture A (and the second punch of the digit above aperture B), counting chain drive relay 400 (A") operates and at its contacts 403 completes the initial energizing circuit over C679 for the first punch counting chain relay 700 (Table 5b).

As the tape advances and the first punch representing the days units digit is moved from its position above aperture A, counting chain drive relay 400 (A") restores and at its contacts 404 completes the advancing circuit over C670 for the first and second punch counting relays 700 and 710 in series (Table 5a).

Approximately at the same time, the second (and last) punch of the days unit digit is moved from its position above aperture B, whereby the narrow space immediately following the days units digit is moved into position above aperture B to effect the restoration of the space recognition relay 405 (B") as previously described.

Space recognition relay 405 restores and is effective at its contacts 408 to interrupt the energizing circuit for the tape advancing relay 32 to terminate advancement of the tape, and at its contacts 409 effects energization of print magnet 825, the circuit extending from ground over contacts 422, contacts 409, 485, 418, 454, 472, conductors 594 and 595, contacts 776, 768, 705, conductor 812, segment 2 on commutator 810, brushes of arm 807, ring 809 to the winding of print relay 825 and negative battery.

Print relay 825 operates as previously described to effect the printing of the digit "2" on the ticket, and to operate its armature 835 to effect the closure of contacts 827 and 829 whereby the operating circuit to the print indication relay 480 is completed as previously set forth.

Print indication relay 480 operates and at its contacts 481 interrupts the advancing circuit over C590 (Table 3b) for character counting chain 500' to effect the restoration of the third character counting relay 520, the fourth counting chain relay being held up over the chain holding circuit which now extends over C591 (Table 3a); and at its contacts 483 completes an energizing circuit to the print termination relay 450. Relay 450 operates and at its contacts 454 interrupts the energizing circuit for the print relay 825, which restores, and at its contacts 829 interrupts the holding circuit for print indication relay 480.

Print indication relay 480 restores and at its contacts 481 completes the advancing circuit over C590 for the character counting chain 500' to operate the fourth and fifth relays 530 and 540 in series (Table 3b); and at its contacts 485 completes the energizing circuit to the tape advancing relay 32 (Table 6b).

The fifth character counting chain relay 540 operates in series with the fourth counting chain relay 530, and at its contacts 541 interrupts the advancing circuit for the cycle counting chain relays 550 and 555, the first cycle counting chain relay 550 restoring; and at its contacts 542 completes the holding circuit for the second cycle counting chain to hold relay 555 operated, the holding circuit extending from negative battery over the lower winding of relay 555, contacts 557, 565, 542, C589, contacts 447 and 442 to ground.

As the tape now advances following printing of the days units digit (2 in the present example) to move the narrow space following the days units digit from its position above the aperture B, the last punch of the days units digit as moved over aperture A to operate same without effect and the first punch of the days tens digit is then moved into position over aperture B to effect the operation of space recognition relay 405 (B") associated therewith.

Space recognition relay 405 operates and at its contacts 407 effects the conditioning of the circuit for the portion of the photocell arrangement which is associated with apertures C and D to permit the movement of the space recognition relays 415 (C") and 420 (D") to positions indicated by the tape portions positioned above apertures C and D. Inasmuch as the tens digit in the present example is comprised of a single punch and is followed immediately thereafter by a medium space, the portions of the tape representing the medium space will be located above the aperture C, and accordingly space recognition relay 415 (C") associated therewith will be restored at this time. The punches in the tape which represent the month unit digit will be positioned over aperture D, and accordingly the space recognition relay 420 (D") associated therewith will be in the operated position. Space recognition relay 405 (B") in its restoration is also effective at its contacts 409 to interrupt the holding circuit for the print termination relay 450 to effect the restoration thereof.

ANALYZATION OF DAY TENS DIGIT

As the tape advances, and the first (and only) punch of the days tens digit is moved from its position above aperture B, the narrow space immediately following is brought into position above aperture B to effect the restoration of space recognition relay 405 (B") and the consequent interruption of the energizing circuit for the tape advancing relay 32 to terminate the movement thereof. Space recognition relay 405 at its contacts 407 disables the portion of the photocell circuit associated with apertures C and D and at its contacts 409 completes the energizing circuit to the print relay 825 to effect the printing of the digit "1," the printing circuit extending from ground over contacts 442, 409, 485, 419, 448, 456, 475, C594 and C595, contacts 776, 768, 706, 718, 728, 737, 748, C811, segment "1" of commutator 810, brushes on arm 807, ring 809 and the winding of print relay 825 to negative battery.

Print relay 825 operates to effect the printing of the digit "1" on the ticket in the manner heretofore described, and at its armature 835 effects the closing of contacts 827 and 829 to complete the operating circuit to the print indication relay 480.

Print indication relay 480 operates and at its contacts 481 interrupts the advancing circuit over C590 for the character counting chain 500' to effect the restoration of the fourth relay 530, at its contacts 482 completes the character counting chain holding circuit for the fifth relay 540; and at its contacts 483 completes the operating circuit to the print termination relay 450, which operates and at its contacts 466 interrupts a point in the energizing circuit for print relay 825. As print relay 825 restores it opens contacts 827 and 829 to effect the release of print indication relay 480.

Print indication relay 480 restores and at its contacts 482 interrupts the holding circuit for the character counting chain to restore the fifth relay 540. Relay 540 restores and at its contacts 541 completes the advancing circuit over C589 for the second and third cycle counting relays 555 and 560, the circuit extending from negative battery over the lower winding of relay 555 and the upper winding of relays 560, contacts 556, 551, 541, conductor 589, contacts 481, 447 and 442 to ground. The third cycle counting chain relay 560 operates, and at its contacts 563 completes an energizing circuit for the fourth cycle counting chain relay 570, the circuit extending from negative battery over the winding of relay 570, contacts 578, 583, 563, conductor 589, contacts 447 and 442 to ground.

The print indication relay 480 is also effective at this time as a result of the detection by the space recognition relays B" and C" of a medium space to print a dash (—) character on the ticket, the energizing circuit extending from ground, contacts 442, 409, 485, 419, 423, 448, 455, 474, C593, 579', C592, 499', C823, "dash" segment of commutator 810, brushes on arm 807, ring 809, the winding of relay 825 to negative battery.

Print relay 825 operates in the manner previously described to effect the printing of the dash (—) character on the ticket, and at its armature 835 effects the closure of contacts 827 and 829 to complete an operating circuit for the print indication relay 480 as in previous printing operations. Print indication relay 480 operates and at its contacts 485 completes an energizing circuit to the tape advancing relay 32 (Table 6a); at contacts 484 extends it over operating ground to the tape advancing relay 32 and at its contacts 482 completes the initial energizing circuit for the character counting chain 500' to initiate a third cycling thereof, the operated condition of the eighth and ninth character counting chain relays indicating that the second cycling of the character counting chain relay has been completed.

ANALYZATION OF MONTH UNITS DIGIT

The tape advancing relay 32 is maintained energized by the operated print indication relay 480 and the tape is moved to advance the last punch of the hours tens digit and apertures A and B without effect (other than a pulsing of the drive relay 400 (A")), the first punch of the month digit is positioned over aperture B to effect the operation of the associated recognition relay 405 (B"). The relay 405 at contacts 407 conditions the photocell circuit to respond to the tape as positioned above apertures C and D. Inasmuch as the second punch of the month unit digit will be positioned above aperture C, and the punches representing the month tens digit will be positioned above aperture D, the space recognition relays 415 (C") and 420 (D") will be energized to operate.

Space recognition relay 405 (B") at its contacts 408 extends operating ground to the tape advancing relay 32 to maintain the continued operation thereof; and at its contacts 409 interrupts the holding circuit for print indication relays 480 and print termination relay 450, to effect the restoration thereof. Print indication relay 480 restores and at its contacts 481 completes the advancing circuit over C590 for the first and second relays 500 and 510 in the character counting chain 500' to effect the operation thereof.

The tape advances and moves the first punch of the month unit digit from its position above aperture B and over aperture A to effect the operation of the counting chain drive relay 400 (A") associated therewith in the manner previously described, the drive relay 400 being effective at its contacts 403 to complete the initial energizing circuit over C679 to the punch counting chain 700' as previously described to effect the operation of the first relay 700 thereof (Table 5b). With the further movement of the tape to move the first punch of the months unit digit from its position above aperture A, the counting chain drive relay 400 (A") restores, and at its contacts 407 completes the advancing circuit over C670 for the first and second punch counting chain relays 700 and 710 (Table 5a).

At the same time, the tape moves the second (and last) punch of the month unit digit from its position above aperture B to effect the restoration of the associated space recognition relay 405 (B"), which relay at its contacts 407 disables the photocell section associated with apertures C and D, and at its contacts 408 interrupts the energizing circuit for the tape advancing relay 32 to thereby temporarily terminate further movement of the tape; and at its contacts 409 completes the printing circuit to the print relay 825 over the circuit prepared by the punch counting chain set. That is, the print relay 825 is operated to effect the printing of the digit "2" on the ticket in the manner heretofore described, the circuit therefor extending from ground over contacts 442, 409, 485, contacts 418, 454, 472, C594, C595, contacts 776, 768, 705, C812, the second segment of commutator 810, brushes on arm 807, ring 809, the winding of print relay 825 to negative battery.

Print relay 825 operates in the manner previously described to effect the printing of digit "2" on the tape and at its armature 835 effects the closure of contacts 827 and 829 to complete the operating circuit for the print indication relay 480.

Relay 480 operates and at its contacts 481 interrupts the holding circuit for the character counting chain relays 500' extending over C591 to effect the restoration of relay 500; and at its contacts 482 completes the holding circuit for character counting chain 500' to hold the second relay 510; and at its contacts 483 completes the energizing circuit for the print termination relay 450 as in previous printing operations.

Relay 450 operates and at its contacts 453 interrupts the energizing circuit for the print relay 825 which restores and at its contacts 827 and 829 interrupts the holding circuit for the print indication relay 480 to effect the restoration thereof. Relay 480 restores and at its contacts 481 completes the advancing circuit over C590 for the character counting chain 500' to energize the second and third relays 510 and 520 thereof in series, and at its contacts 485 completes the energizing circuit to the tape advancing relay 32 to reinitiate the forward advancement of the tape.

As the tape advances, the last punch of the month unit digit is moved over aperture A to effect the operation of the counting chain drive relay 400 without effect as previously explained, and the narrow space immediately subsequent thereto is advanced over counting chain drive relay 400 to effect the restoration thereof. As the first punch of the months tens digit (in this example ten punches) is positioned above aperture B, its associated space recognition relay 405 (B'') is operated and is effective at its contacts 409 to interrupt the holding circuit for print termination relay 450 to effect the restoration thereof, and at its contacts 408 completes a holding circuit for the tape advancing relay 32 to maintain same energized and effect continued movement of the tape. Space recognition relay 405 at its contacts 407 also conditions the portion of the photocell equipment associated with apertures C and D to effect operation of the corresponding space recognition relays 415 (C'') and 420 (D'') into positions indicated by the tape above the corresponding apertures. Inasmuch as the month tens digit is comprised of ten punch holes, it is apparent that the corresponding space recognition relays 415 (C'') and 420 (D'') will be maintained in the operated position.

ANALYZATION OF MONTH TENS DIGIT

As the tape advances, the punches of the months tens digit pass over aperture A, and the counting chain drive relay 400 (A'') is repeatedly operated to effect at its contacts 403 and 404, the advancement of the punch counting chain 700' in accordance with the number of punches in the month tens digit. Briefly, with the operation of relay 400 (A'') responsive to the positioning of the first punch above aperture A, contacts 403 complete the energizing circuit over C679 to the punch counting chain 700' to operate the first relay 700. With movement of the first punch past aperture A the first and second punch counting chain relays 700 and 710 are operated in series over the chain advancing circuit on C670.

As the second punch is positioned above aperture A and drive relay 400 reoperates, it is effective at its contacts 404 to interrupt the advancing circuit on C670 for the counting chain 700' to effect the restoration of the first relay 700, and at its contacts 403 to complete the holding circuit on C679 for the second punch counting relay 710.

As the tape advances and the second punch of the months tens digit is moved from its position above aperture A, the counting chain drive relay 400 restores and at its contacts 404 completes the advancing circuit over C670 to energize the second and third punch counting chain relays 710 and 720 in series. As the tape continues in its movement and the third punch of the digit is moved into position above aperture A, the counting chain drive relay 400 operates and at its contacts 404 interrupts the holding circuit for the punch counting chain 700' to effect the release of the second relay 710, and at its contacts 403 completes the holding circuit for the punch counting chain to hold the third relay 720.

As the third punch is moved from its position above aperture A the counting chain drive relay 400 restores to close contacts 404 and complete the advancing circuit for the counting chain 700' to energize the third and fourth counting chain relays 720 and 730 in series.

With the advancement of the tape to bring the fourth punch of the digit into position above aperture A reoperation of the counting chain drive relay 400 is effected and contacts 404 are opened to interrupt the advancing circuit for the counting chain 700' to effect the restoration of the third counting chain relay 720; and contacts 404 are closed to complete the holding circuit over C679 for the punch counting chain to hold the fourth relay 730. As the fourth punch of the digit is now moved from its position above aperture A the counting chain drive relay 400 at its contacts 404 completes the advancing circuit over C670 to the punch counting chain 700' to operate relays 730 and 740 in series thereto. The fifth punch counting chain relay 740 operates and at its contacts 742 completes an energizing circuit for cycle counting chain relay 750 to indicate that the punch counting chain relays 700 to 730 inclusive have completed one cycle, the circuit extending from negative battery over the winding of relay 750, contacts 766, 774, 742, conductor 674, contacts 451, 447 and 442 to ground.

As the fifth punch of the month tens digit is now brought into position above aperture A to effect the operation of counting chain drive relay 400, and the opening of its contacts 404, the advancing circuit on C670 for the punch counting chain 700' is interrupted to effect the restoration of relay 730, relay 740 being maintained in the operated condition over the chain holding circuit as completed over C679 by contacts 403 on the counting chain drive relay 400 (A'').

As the fifth punch of the month tens digit is moved from its position above aperture A, counting chain drive relay 400 is restored and the chain holding circuit for the fifth counting chain relay 740 is interrupted to effect the restoration thereof. As the fifth relay 740 restores, it is effective at its contacts 741 to complete a series energizing circuit for the first and second cycle counting chain relays 750 and 760, the circuit extending over the winding of relay 750, the upper winding of relay 760, contacts 752, 742, C674 and contacts 451, 447 and 442 to ground.

With the movement of the sixth punch of the months tens digit into position above aperture A, the recycling of the punch counting chain is re-initiated, the operated condition of cycle counting chain relays 750 and 760 indicating that the punch counting chain is in its second cycle. The advancement of the counting chain continues as in the first round, the first counting chain relay 700 being operated with movement of the sixth hole above aperture A, and the second counting chain relay 710 being operated in series therewith with the movement of the sixth hole from its position above aperture A. As the tape advances and the seventh hole is moved into position above aperture A, the first counting chain relay 700 is restored, and the second counting chain relay 710 is held operated. As the seventh punch is moved from its position above aperture A, the third punch counting chain relay 720 is operated in series with the second relay 710.

As the eighth punch of the group is moved above aperture A, the second punch counting chain relay 710 is restored, the third punch counting chain relay 720 being maintained in the operated position. As the eighth punch of the group is moved from its position above aperture A, the fourth punch counting chain relay 730 is operated in series with the third punch counting chain relay 720.

At the approximate time that the eighth punch of the group is moved from its position above aperture A, the tenth punch of the month tens digit is moved from its position above aperture C to effect the restoration of the space recognition relay 415 (C'').

The ninth punch of the group is now moved into position above aperture A and the third counting chain relay 720 is restored, the fourth counting chain 730 being maintained in the operated position. As the ninth punch of the group is moved from its position over aperture A, a series operating circuit is completed for the fourth and fifth punch counting chain relays 730 and 740. The fifth punch counting chain relay 740 operates and at its contacts 741 interrupts the holding circuit for cycle counting chain relays 750 and 760, whereby relay 750 is restored. Punch counting chain relay 740 at its contacts 742 connects the second relay 760 of the cycle counting chain to the aforedescribed holding circuit.

As the tenth and final punch of the month tens digit is moved from its position above aperture B towards aperture A, the medium space which immediately follows the punches which represent the month tens digit is brought into position above aperture B to effect the restoration of its associated space recognition relay 405 (B").

With the restoration of the space recognition relay 405 (B"), the energizing circuit for the tape advancing relay 32 is interrupted to once more terminate the advancement of the tape pending the printing of the information which is registered on the punch counting chain on the ticket member. Space recognition relay 405 (B") at its contacts 407 disables the portion of the photocell circuit associated with apertures C and D (C" being restricted and D" being operated at this time) and at its contacts 409 extends operating ground to complete the energizing circuit to the print relay 825 to effect the printing of the month tens digit zero (0), the operating circuit extending from ground over contacts 442, 409, 484, 419, 423, 448, 456, 475, C594, C595, contacts 776, 767, 704, 716, 726, 734, C820, the segment zero (0) on commutator 810, the brushes on arm 807, ring 809, the winding of print relay 825 and negative battery.

Print relay 825 operates to effect the printing to the digit zero (0) on the ticket in the manner heretofore described, and at its armature 835 effects closure of contacts 827 and 829 to complete the operating circuit for the print indication relay 480 in the manner of previous printing operations.

Print indication relay 480 operates and at its contacts 481 interrupts the holding circuit for the character counting chain 500' to effect the restoration of the second relay 510; at contacts 482 completes the chain holding circuit over C591 to hold the third counting chain relay 520 and at its contacts 483 completes the operating circuit to the print termination relay 450 as in previous operations. Relay 450 operates and at its contacts 456 interrupts the energizing circuit for the print relay 825 to effect the release thereof, and at its contacts 451 opens the energizing circuit for the cycle counting chain relays 750 and 760 and for the fourth and fifth counting chain relays 730 and 740.

Print relay 825 restores, and at its contacts 827 and 829 interrupts the holding circuit for the print indication relay 480 to effect the restoration thereof. Print indication relay 480 restores and at its contacts 481 completes the advancing circuit over C590 to the character counting chain 500' to effect the series operation of the third and fourth character counting chain relays 520 and 530 in the manner previously described; at its contacts 485 completes the printing circuit to print relay 825 to effect the printing of the dash (—) character on the ticket member 851 and at its contacts 485 effects completion of the energizing circuit to the tape advancing relay 32 as in previous dash (—) printing operations.

Print relay 825 effects printing of the dash (—) character on the ticket as heretofore described, and at its armature 835 effects the closure of contacts 827 and 829 to re-complete the operating circuit for print indication relay 480. Relay 480 operates and at its contacts 481 interrupts the holding circuit for the character counting chain to restore relay 520, at its contacts 482 completes the chain holding circuit for the fourth character counting chain relay 530, and at its contacts 484 connects its operating circuit to the tape advancing relay 32 to maintain same energized and thus effect continued movement of the tape 21; at this time the character counting chain 500' indicates that fourteen characters have been printed on the ticket.

CALLED PARTY NUMBER (RING OR PARTY DIGIT)

As the tape member 21 is advanced across the scanning equipment 24, the medium space following the months tens digit is moved across apertures A and B to bring the first punch of the ring (or party) digit of the called number into position above aperture B.

Space recognition relay 405 (B") associated with aperture B operates, and at its contacts 407 applies ground to enable the portion of the photocell circuit associated with apertures C and D to permit the movement of the space recognition relays 415 and 420 to positions corresponding to the tape portions which lie above apertures C and D. In the present example the punch holes of the called number ring and units digits will be in position above apertures C and D and as a result the space recognition relays 415 (C") and 420 (D") respectively will be operated at this time.

Space recognition relay 405 (B") operates and at its contacts 409 interrupt the energizing circuit for the print relay 825 to effect the restoration thereof, and at its contacts 409 interrupts the holding circuit for the print indication relay 480 and the print termination relay 450.

Print indication relay 480 restores and at its contacts 481 completes the advancing circuit to the character counting chain to energize the fourth and fifth relays 530 and 540 thereof in series, the fifth counting chain relay 540 in its operation responsive thereto effecting the opening of contacts 541 and the interruption of the advancing circuit for the cycle counting chain 750' to restore relay 555. The third cycle counting chain relay 560 is maintained energized over the holding circuit for the cycle counting chain which is extended over conductor 589 by contacts 542 on relay 540.

The equipment now counts the number of punches in the called number ring digit (in this example 4), and records such information on the punch counting chain 700', the punch holes effecting in their passage over aperture A the operation of the counting chain drive relay 400 (A") which in turn advances the punch counting chain 700' a corresponding number of steps.

Briefly, as the first hole is positioned above aperture A, the first punch counting chain relay 700 is operated, and with the advancement of the tape to move the first punch from its position above aperture A the second punch counting chain relay 710 is operated in series with the first punch counting chain relay 700. With the movement of the second punch of the digit above aperture A, the first counting chain relay 700 is restored, and the third punch counting chain relay 720 is energized in series with the second punch counting chain relay 710.

As the third punch is moved above aperture A, the second punch counting chain relay 710 is restored and as the third punch is moved from its position above aperture A the third and fourth punch counting chain relays 720 and 730 are energized in series. At the approximate time that the third punch is moved from its position above aperture A, the fourth punch of the digit is moved from its position above aperture B to bring the narrow space following the called number ring digit into position above aperture B, to thereby effect the restoration of the narrow space recognition relay 405 (B") and the termination of the advancement of the tape. The photocell circuit portions associated with apertures C and D are disabled to temporarily prevent operation of the associated space recognition relays 415 and 420 (C") and (D"). Space recognition relay 405 also completes an energizing circuit to the printing relay 825 to effect the registration of the digit four (4) over the circuits prepared by the punch counting chain 700', the energizing circuit for effecting the impression of the numeral 4 upon the ticket extending from ground over contacts 442, 409, 485, 418, 454, 472, C594, C595, contacts 776, 768, 706, 718, 727, C814, the fourth segment on commutator 810, brushes of arm 807, ring 809 and the winding of print relay 825 to negative battery.

Print relay 825 operates to effect the impression of the digit 4 upon the ticket member in the manner heretofore described, and its armature 835 effects the closing of contacts 827 and 829 to complete an energizing circuit for the print indication relay 480 as in previous printing operations. Print indication relay 480 operates and at its contacts 481 interrupts the advancing circuit for the fourth and fifth character counting chain relays to release relay 530, relay 540 being maintained operated over the character counting chain holding circuit as controlled by contacts 482 of relay 480. Print indication relay 480 at its contacts 483 completes an operating circuit for the print termination relay 450.

Relay 450 operates, and at its contacts 454 interrupts the energizing circuit for the print relay 825 to effect the restoration thereof, and at its contacts 451 interrupts the holding circuit for the third and fourth punch counting chain relays 720 and 730 to effect the restoration thereof, whereby the punch counting chain is again in the restored condition awaiting the registration of the punches of a further digit on the tape.

Print relay 825 restores and at its contacts 827 and 829 interrupts the holding circuit for the print indication relay 480 as in previous printing operations, which relay restores and at its contacts 482 interrupts the holding circuit for the character counting chain to restore relay 540, and at its contacts 485 recompletes the energizing circuit to the tape advancing relay 32 to reinitiate movement of the tape 21 whereby the further digits of the calling number may be analyzed. Character counting chain relay 540 in restoring is effective at its contacts 542 to interrupt the holding circuit for the cycle counting chain to restore relay 560, which at its contacts 562 completes an advancing circuit for the fourth and fifth cycle counting chain relays 570 and 575, the circuit extending from negative battery over the winding of relay 570, the upper winding of relay 575, contacts 572, 562, conductor 589, contacts 447 and 442 to ground. The operated condition of the fourth and fifth cycle counting chain relays 570 and 575 indicates that the fourth cycle of the character counting chain relay is being initiated, fifteen characters having been printed on the ticket at this time.

CALLED PARTY NUMBER (UNITS DIGIT)

As the tape is advanced as a result of the energization of the tape advancing relay 32 following printing of the called number ring digit, the subsequent narrow space is moved from its position above aperture B, and the first punch of the called number units digit (in this example digit 3) is moved into position above aperture B whereby the associated space recognition relay 405 (B") is operated to complete a holding circuit for the tape advancing relay 32, and to enable the portion of the photocell circuit associated with apertures C and D. Inasmuch as the punches representing the units digit of the called party number are positioned above apertures C and D, space recognition relays 415 (C") and 420 (D") will be in the operated position. Relay 405 (B") also interrupts the holding circuit for print termination relay 450 to effect the restoration thereof.

As each of the punches of the units digit are moved over aperture A, the equipment operates to count the punches (in the present example 3), and register the punches as counted on the punch counting chain 700' in the manner heretofore described. Briefly, as the first hole is moved into position above aperture A, the first punch counting chain relay 700 is operated and as the first hole is moved from its position above aperture A, the second punch counting chain relay 710 is operated in series therewith. As the second punch is moved over aperture A, the first counting chain relay 700 is restored, and the second punch counting chain relay 710 is maintained operated. As the second punch is moved from its position above aperture A the third punch counting chain relay 720 is operated in series with the second relay 710.

At the approximate time that the second hole is moved from its position above aperture A, the third (and last) punch of the called party units digit is moved from its position above aperture B and the narrow space immediately subsequent thereto on the tape member is advanced into position above aperture B. The narrow space recognition relay 405 (B") is responsively restored to interrupt the energizing circuit for the tape advancing relay 32 and terminate the forward movement of the tape, and also completes the operating circuit to the print relay 825 to effect the printing of the called party units digit (3).

The energizing circuit completed by the space recognition relay 405 in its restoration will extend from ground over contacts 442, 409, conductor 485, contacts 418, 454, 472, C594, C595, contacts 776, 768, 706, 717, C813, segment "three" on commutator 810, brushes on arm 807, ring 809, the winding of relay 825 to negative battery. Print relay 825 operates to effect the registration of digit 3 upon the ticket and, as in previous operations, is effective at armature 835 to close contacts 827 and 829 to complete an operating circuit for print indication relay 480.

Relay 480 operates, and at its contacts 482 completes the operating circuit for the character counting chain to effect the operation of the first relay 500, and at its contacts 483 completes the operating circuit to print termination relay 450. Relay 450 operates and at its contacts 454 interrupts the energizing circuit for the print relay 825 to effect the restoration thereof, and at its contacts 451 interrupts the holding circuit for the operated punch counting chain to restore the operated relays 710 and 720 whereby the chain is now prepared for the registration of further information thereon.

With the restoration of the print relay 825 and the consequent opening of its associated contacts 827 and 829, the energizing circuit for print indication relay 480 is interrupted to effect the restoration thereof, which relay restores and at its contacts 481 completes the advancing circuit to the character counting chain to effect the series operation of the first and second character counting relays 500 and 510. Print indication relay 480 at its contacts 485 once more completes the energizing circuit for the tape advancing relay 32 whereby advancement of the tape across the analyzer unit 24 is again effected.

CALLED PARTY NUMBER (TENS DIGIT)

As the tape advances the narrow space immediately following the called number units digit is removed from its position above aperture B and the first punch of the called number tens digit is moved into position thereabove to effect the operation of the space recognition relay 405 (B"), which relay enables the portion of this photocell circuit associated with apertures C and D, and interrupts the holding circuit for the print termination relay 450 to effect the restoration thereof. The punches of the called number tens and hundreds digits on the tape will be above apertures C and D, and will accordingly maintain space recognition relays 415 (C") and 420 (D") in the operated position.

As the tape advances the punches of the called number tens digit (digit 2) are moved above aperture A, and the counting chain drive relay 400 is operated as before to advance the punch counting chain 700' in accordance with the number of punches encountered. Briefly, as the first punch is moved above aperture A, the first counting chain relay 700 operates and as the first punch is moved from its position above aperture A, the second counting punch relay 710 is operated in series with the first punch counting chain relay 700. At the approximate time that the first punch is moved from its position above aperture A, the second punch of the called party tens digit is moved from its position above aperture B, and the narrow space immediately following same on the tape is moved into position thereover to effect the restoration of space recognition relay 405 and the consequent termination of the advancement of the tape.

Space recognition relay 405 at its contacts 409 once more completes the energizing circuit to the print relay 825 as prepared by the punch counting chain 700', the circuit extending from ground over contacts 442, 409, 485, 418, 454, 472, conductor 594, 595, contacts 776, 768, 705, conductor 812, second segment of commutator 810, brushes on arm 807, ring 809, the winding of print relay 825 to negative battery. Print relay 825 operates to effect the impression of digit 2 upon the ticket in the manner of previous printing operations, and at its contacts 827 and 829 effects the completion of an operating circuit to the print indication relay 480 which operates, and in turn at its contacts 481 interrupts the advancing circuit for the character counting chain to effect the restoration of the first relay 500 thereof, and at its contacts 483 completes an operating circuit to the print termination relay 450.

Print termination relay 450 operates and at its contacts 454 interrupts the energizing circuit to the print relay 825 to effect the restoration thereof, and at its contacts 451 interrupts the holding circuit for the energized relays 700 and 710 of the punch counting chain 700' to effect the restoration thereof, whereby the counting chain is prepared for registration of further information thereon. Print relay 825 restores and as in its previous printing operations opens the energizing circuit for print indication relay 480 to effect the restoration thereof. Relay 480 restores and at its contacts 481 effects the closure of the character counting chain advancing circuit to effect the series operation of the second and third character counting chain relays 510 and 520, and at its contacts 485 reestablishes the energizing circuit to the tape advancing relay 32.

The condition of the character counting chain at this time indicates that the seventeenth character (the called party tens digit) has been printed on the ticket.

CALLED PARTY NUMBER (HUNDRED DIGIT)

As the tape advances to move the narrow space from its position above aperture B to bring the first (and only) punch of the called party hundreds digit thereabove, space recognition relay 405 (B") operates and effects the enablement of the portion of the photocell circuit associated with apertures C and D. Inasmuch as the remaining punches of the called party number are positioned above apertures C and D at this time, the space recognition relays 415 (C") and the 420 (D") will be operated.

Space recognition relay 405 (B") also maintains the circuit to the tape advancing relay 32 energized and interrupts the holding circuit for print termination relay 450 to effect the restoration thereof.

As the first (and only) punch of the called party hundreds digit is moved from its position above aperture B, the narrow space immediately subsequent thereto on the tape is moved into position above aperture B, whereby the space recognition relay 405 (B") is restored to interrupt the energizing circuit for the tape advancing relay 32 to terminate the advancement of the tape 21, and the energizing circuit is completed to the printing equipment to effect the registration of the hundreds digit one (1) upon the ticket member. The energizing circuit for the print relay 825 extends from ground over contacts 442, 409, 485, 418, 454, 472, C594, C595, contacts 776, 768, 706, 718, 728, 737, 748, C811, segment one on commutator 810, the brushes on arm 807, ring 809, and the winding of print relay 825 to negative battery.

Print relay 825 operates to effect the impression of digit one (1) upon the ticket, and in the manner of previous printing operations completes the energizing circuit for the print indication relay 480. Relay 480 operates and at its contacts 481 interrupts the advancing circuit for the character counting chain to effect the restoration of the second relay 510 thereof, at its contacts 482 completes the holding circuit for the third counting chain relay 520, and at its contacts 483 completes an energizing circuit for the print termination relay 450

Print termination relay 450 operates and at its contacts 454 interrupts the energizing circuit to print relay 825 which restores, and at its contacts 827 and 829 interrupts the holding circuit for the print indication relay 480 to restore same, the restoration thereof effecting reclosure of contacts 481 and the advancing circuit to the character counting chain 500' to effect the series operation of the third and four relays 520 and 530 respectively thereof. Relay 480 at its contacts 485 also recompletes the energizing circuit to the tape advancing relay 32 which operates to reinitiate movement of the tape.

The particular condition of the character counting chain at this time indicates the eighteenth character (hundreds digit) has been printed on the ticket.

CALLED PARTY NUMBER (THOUSANDS DIGIT)

As the tape advances to move the narrow space from its position above aperture B, the first punch of the called party thousands digit (in this example digit 8) is moved into position above aperture B to effect the energization of the space recognition relay 405 (B") which operates to enable the portion of the photocell circuit associated with apertures C and D. Inasmuch as the remaining punches of the called party number are positioned above apertures C and D, the space recognition relays 415 (C") and 420 (D") will be in the operated condition at this time. Relay 405 (B") also interrupts the holding circuit for the print termination relay 450 to effect the restoration thereof.

As the tape advances the punches representing the called party thousands digit pass over aperture A and effect the operation of the counting chain drive relay 400 to effect the advancement of the punch counting chain 700' in the manner previously described. Briefly, as the first punch passes above aperture A, the first counting chain relay 700 operates, and as the first punch is removed from its position above aperture A, the second counting chain relay 710 operates in a series with the first relay 700. As the second punch passes over aperture A, the first counting chain relay 700 restores, and as the second punch is removed from its position above aperture A the third counting chain relay 720 operates in series with the second counting chain relay 710. As the third punch is positioned above aperture A, the second counting chain relay 710 is restored, and as the third punch is removed from its position above aperture A, the fourth counting chain relay 730 operates in series with the third relay 720. As the fourth punch passes over aperture A, the third counting chain relay 720 restores, and as the fourth punch is moved from position above aperture A, the fifth counting chain relay 740 operates in series with the fourth counting chain relay 730. Relay 740 completes an operating circuit for the first cycle counting chain relay 750 to indicate one cycle of the chain was effected.

As the fifth punch of the thousands digit is moved over aperture A, the fourth counting chain relay 730 restores, and as the fifth punch is moved from its position above aperture A, the fifth counting chain relay restores to complete an operating circuit for the second cycle counting chain relay 760 in series with the first cycle counting chain relay 750.

As the sixth punch is advanced over aperture A, the punch counting chain 700' initiates its second cycle whereby the first counting chain relay 700 is once more operated. As the sixth punch is moved from its position above aperture A, the second relay 710 of the chain operates in series with the first relay 700.

At this approximate time, the eighth punch representing the thousands digit is moved from its position above aperture C to effect the restoration thereof, it being apparent with reference to Figure 10 that the medium space which follows the called party thousands digit will cover aperture C immediately following the registration of the punches of the called party thousands digit.

As the seventh punch of the called party thousands digit is advanced over aperture A, the first counting chain relay 700 is restored, and as the seventh punch is moved from its position above aperture A, the third counting chain relay 720 operates in series with the second counting chain relay 710.

At this approximate time the eighth and last punch of the called party thousands digit is moved from its position above aperture B, and the medium space immediately following same is moved into position above aperture B to effect the restoration of the space recognition relay 405 (B″), whereby the energizing circuit for the tape advancing relay 32 is interrupted and the advancement of the tape is terminated. Relay 405 in restoring also completes an energizing circuit to the print relay 825 to effect the printing thereby of the digit indicated by the punch counting chain 700′, this being digit "8" in this example as expressed by the energizing circuit extending from ground over contacts 442, 409, 485, 419, contacts 423, 448, 456, 475, conductor 594, 595, contacts 776, 767, 704, 715, conductor 818, the eighth segment of commutator 810, brushes on arm 807, ring 809, the winding of print relay 825 to negative battery. It is noted that as a result of the medium space, relay C″ is restored and the above circuit is provided.

Print relay 825 operates to effect the impression of digit "8" upon the ticket and in the manner of previous printing operations completes an operating circuit to the print indication relay 480, which operates to interrupt the holding circuit for the character counting chain to effect the restoration of its third relay 520, and also completes the energizing circuit to the print termination relay 450.

Print termination relay 450 operates, and at its contacts 456 interrupts the energizing circuit for the print relay 825 to effect the restoration thereof, and at its contacts 451 interrupts the holding circuit for relays 710, 720, 750 and 760 in the punch counting chain 700′ and the cycle counting chain 750′. Print relay 825 restores and at its contacts 827 and 829 interrupts the holding circuit for the print indication relay 480 which restores and at its contacts 481 completes the character chain advancing circuit to effect the series operation of the fourth and fifth counting chain relays 530 and 540 therein. Character counting chain relay 540 operates and at its contacts 542 completes the operating circuit for the first cycle counting chain relay 550, the circuit extending from negative battery over the winding of relay 550, contacts 558, 565, 542, conductor 589, contacts 447 and 442 to ground.

It will be remembered that because of the physical distance between the print wheel and cutting knife, the cutting operation does not occur at the end of the analyzation of a call, but actually occurs between the first digit of the called number and the last digit of the calling number. That is, the fifth counting chain relay 540 at its contacts 545 completes an energizing circuit for the cut relay 830, the circuit extending from negative battery over the winding of relay 830, C802, contacts 545, 534, 559′, 573, 579, C593, contacts 474, 455, 448, 423, 419, 485, 409 and 442 to ground. Cut relay 830 operates to cut the ticket and at its contacts 832 and 834 completes an operating circuit for the print indication relay 480, the circuit extending from negative battery over the winding of relay 480, C803, contacts 834, 832, C805, contacts 409 and 442 to ground. Print indication relay 480 operates, and at its contacts 481 interrupts the advancing circuit for the character counting chain 500′ to effect the restoration of the fourth character counting chain relay 530, and at its contacts 534 interrupts the energizing circuit for the cut relay 830 to effect the restoration thereof.

Cut relay 830 restores and at its contacts 832 and 834 interrupts the energizing circuit for the print indication relay 480, which responsively restores and at its contacts 482 interrupts the holding circuit for the character counting chain to restore relay 540, and at its contacts 485 completes the energizing circuit for the tape advancing relay 32 to effect advancement of the tape 21.

As the fifth character counting chain relay 540 restores, it is effective at its contacts 542 to complete the advancing circuit for the cycle counting chain 550′ associated with the character counting chain 500′, whereby the first and second counting chain relays 550 and 555 are energized in series. Relay 555 operates and at its contacts completes an operating circuit to effect the printing of the dash (—) character on the ticket, extending from ground over the contacts 442, 409, 485, 419, 423, 448, 455, 474, conductor 593, contacts 579, 573, 559, conductor 592, contacts 499′, conductor 823, the segment of commutator 810 marked by a dash (—), the brushes on arm 807, ring 809 and the winding of print relay 825 to negative battery.

Print relay 825 operates to effect the impression of the dash (—) character on the ticket and in the manner of previous printing operations completes an energizing circuit for print indication relay 480, which operates to complete an energizing circuit for the first character counting chain relay 500 and to extend its operating ground to the tape advancing relay 32. The character counting chain 500′ now indicates that twenty characters have been printed upon the ticket.

CALLING PARTY NUMBER (RING DIGIT)

As the tape advances and the remaining portions of the medium space following the last punch of the called party number pass over aperture B, the first punch of the calling number ring digit is brought into position above aperture B. Space recognition relay 405 (B″) operates to enable the portion of the photocell circuit associated with apertures C and D. Inasmuch as the punches representing calling number digits are now positioned over apertures C and D, the relays 415 (C″) and 420 (D″) respectively will be responsively operated.

Space recognition relay 405 (B″) also completes the energizing circuit for the tape advancing relay 32, interrupts the energizing circuit to the print relay 825 to effect the restoration thereof, and interrupts the holding circuit for the print indication relay 480 and the print termination relay 452 to effect the restoration thereof. Print indication relay 480 restores and at its contacts 481 completes the character counting chain advancing circuit to effect the energization of the second character counting chain relay 510 in series with the first relay 500.

As the punches representing the ring digit of the calling party number pass over aperture A, the counting chain drive relay 400 is operated to control advancement of the punch counting chain 700′ in accordance with the number of punches in the digit. Thus, as the first punch is moved above aperture A, the first counting chain relay 700 is operated, and as the first punch is moved from its position above aperture A, the second punch counting chain relay 710 operates in series with the first relay 700.

At this approximate time the second (and last) punch of the calling party ring digit is moved from its position above aperture B, and the narrow space immediately following the punches is moved into position above aperture B to effect the restoration of the narrow space recognition relay 405 (B″). Relay 405 in its restoration interrupts the energizing circuit to the tape advancing relay, effects the termination of the tape advancement, disables the photocell portions associated with apertures C and D, and completes an energizing circuit to the print relay 825, as prepared by the punch counting chain relay 700′, the circuit extending from ground over contacts 442, 409, 485, 418, 454, 472, conductor 594, 595, contacts 776, 768, 705, conductor 812, to the second segment on commutator 810, the brushes on arm 807, ring 809 to the print relay 825 and negative battery.

Print relay 825 operates to effect the printing of digit 2 upon the tape and in the manner of previous printing operations completes an energizing circuit to the print indication relay 480. Relay 480 operates and at its contacts 481 interrupts the advancing circuit for the character counting chain 500' to effect the restoration of the first relay 500 therein, and at its contacts 483 completes the operating circuit to the print termination relay 450.

Print termination relay 450 operates and at its contacts 454 interrupts the operating circuit for the print relay 825, and at its contacts 451 interrupts the holding circuit for the first and second relays 700 and 710 of the punch counting chain 700' to restore the chain for the registration of further incoming information. Print relay 825 restores and at its contacts 827 and 829 interrupts the holding circuit for print indication relay 480. Relay 480 restores and at its contacts 481 recompletes the advancing circuit for character counting chain relay 500' to effect the series operation of the second and third relays 510 and 520 respectively therein; and at its contacts 585 completes the energizing circuit to the tape advancing relay 32 to effect further forward movement of the tape 21.

The energized conditions of the character and cycle counting chain relays indicate that the twenty-first character has been printed on the tape.

CALLING PARTY NUMBER (UNITS DIGIT)

As the tape advances to move the narrow space following the calling number ring digit from its position above aperture B, the first punch of the calling number units digit is moved into position over aperture B to effect the operation of space recognition relay 405, which in turn enables the portion of the photocell circuit associated with apertures C and D. Since the punches representing the calling party digits are positioned thereabove, space recognition relays 415 and 420 (C″ and D″) respectively will be in the energized condition. Relay 405 also interrupts the holding circuit for print termination relay 450 to effect the restoration thereof.

As the tape advances to move the punches representing the calling party units digit across aperture A, the counting chain drive relay 400 (A″) is operated to drive the punch counting chain 700' and effect the registration thereon of the number of punches in the units digit (in the present example 3). Briefly, as the first punch of the calling party units digit is positioned above aperture A, the first counting chain relay 700 operates, and as the first punch is moved from its position above aperture A, the second punch counting chain relay 710 is operated in series therewith. As the second punch of the digit is moved from its position above aperture A, third punch counting relay 720 is operated in series with the second punch counting chain relay 710.

As the third (and last) punch of the calling party units digit is now moved from its position above aperture B, the space recognition relay 405 (B″) is restored to interrupt the energizing circuit for the tape advancing relay 32 to temporarily terminate the advancement thereof, and the energizing circuit to the print relay 825 as prepared by the punch counting chain 700' is now completed. The energizing circuit for the print relay 825 thus prepared extends from ground over contacts 442, 409, 485, 418, 454, 472, C594, C595, contacts 776, 768, 706, 718, C813 to the third segment of the commutator 810, the brushes on arm 807, ring 809 and the winding of print relay 825 to negative battery.

Print relay 825 operates to effect the printing of digit 3 upon the ticket and in the manner of previous printing operations completes an energizing circuit to the print indication relay 480. Relay 480 operates and at its contacts 481 interrupts the advancing circuit for the character counting chain to effect the restoration of the second relay 510, and at its contacts 483 completes an energizing circuit to the print termination relay 450.

Print termination relay 450 operates and at its contacts 454 interrupts the energizing circuit for print relay 825, and at its contacts 451 interrupts the holding circuit for the operated second and third relays 710 and 720 respectively in the punch counting chain 700' to effect the restoration thereof whereby the counting chain is prepared to register any further information which may be transmitted thereto.

Print relay 825 restores and at its contacts 827 and 829 interrupts the holding circuit for print indication relay 480, which restores and at its contacts 481 completes the advancing circuit for the character counting chain to effect the series energization of the third and fourth counting chain relays 520 and 530 respectively. The particular operated condition of the counting chain at this time indicates that the twenty-second character has been printed on the tape.

Print indication relay 480 in its restoration is also effective at its contacts 485 to complete the energizing circuit to the tape advancing relay 32 which energizes responsively thereto to effect forward motion of tape 21.

CALLING PARTY NUMBER (TENS DIGIT)

As the tape advances to remove the narrow space between the units and tens digit of the calling number from its position above aperture B, the first punch of the group representing the calling party tens digit is moved into position above aperture B to effect the energization of space recognition relay 405 (B″) which is in turn effective to enable the portion of the photocell circuit associated with apertures C and D; in that apertures C and D have the remaining punches of the calling party number positioned thereabove the associated space recognition relays 415 and 420 (C″ and D″) will be in the operated condition. Space recognition relay 405 also interrupts the holding circuit for the print termination relay 450 to effect the restoration thereof.

As the tape 21 advances, the punches representing the tens digit of the calling party number (in this example 4) over the scanner 24, counting chain drive relay 400 is operative to control advancement of the punch counting chain 700' in accordance therewith. Briefly, as the first punch is positioned above aperture A, the first counting chain relay 700 operates, and as the first punch is moved from its position above aperture A, the second counting chain relay 710 is operated in series with the first relay 700. As the second punch of the digit is moved above aperture A, the first counting chain relay 700 restores, and as the second punch is moved from its position above aperture A, the third counting chain relay 720 operates in series with second relay 710. As the third punch is positioned over aperture A, the second counting chain relay 710 is restored, and as the third punch is moved from its position above aperture A, the fourth counting chain relay 730 is operated in series with the third relay 720.

At this approximate time the fourth (and the last) punch of the digit is moved from its position over aperture B, whereby the narrow space immediately following the punches of the digit is moved into position over aperture B to effect the restoration of the narrow space recognition relay 405 (B″) which interrupts the energizing circuit for the tape advancing relay 32 to effect the restoration thereof, and thereby terminate temporarily the advancement of the tape.

Space recognition relay 405 also completes the energizing circuit to the print relay 825 as prepared by the punch counting chain 700' to effect the printing of the digit 4 upon the ticket, the circuit extending from ground, contacts 442, 409, 485, 418, 454, 472, C594, C595, contacts 776, 768, 706, 718, 727, C814, segment 4, brushes on arm 807, ring 809, relay 825 to negative battery.

Print relay 825 operates and effects the printing of digit 4 upon the ticket, and at its contacts 827 and 829 completes an energizing circuit to print indication relay 480. Relay 480 energizes and at its contacts 481 interrupts the advancing circuit for the character counting chain 500' to effect the restoration of the third counting chain relay 520; and at its contacts 483, completes an energizing circuit for the print termination relay 450.

Print termination relay 450 operates and at its contacts 454 interrupts the energizing circuit for print relay 825 to effect the restoration thereof, and at its contacts 451 interrupts the holding circuit for the third and fourth relays 720 and 730 of the punch counting chain 700' to effect the restoration of the chain and prepare same for the recordation of further information as received.

As the print relay 825 restores, it is effective at its contacts 827 and 829 to interrupt the energizing circuit for the print indication relay 480. Relay 480 restores and at its contacts 481 recompletes the advancing circuit to the character counting chain 500' to complete an operating circuit for the fifth counting chain relay 540 in series with the fourth counting chain relay 530 thereof. The fifth counting chain relay 540 operates and at its contacts 541 interrupts the holding circuit for the cycle counting chain to effect the release of the first cycle counting chain relay 550. The second cycle counting chain relay 555 is maintained energized over the cycle counting chain holding circuit which is extended over C589.

Print indication relay 480 in its restoration is effective at its contacts 485 to complete the energizing circuit for the tape advancing relay 32 which operates to once again effect advancement of the tape.

At this time the particular ones of the character counting chain relays operated indicate that the twenty-third character has been printed on the ticket.

CALLING PARTY NUMBER (HUNDREDS DIGIT)

As the tape advances the narrow space immediately following the calling party tens digit is moved from its position above aperture B and the first punch of the group representing the calling party hundreds digit (in this example digit 5) is moved into position above aperture B to effect the operation of the associated space recognition relay 405 (B"). The space recognition relay 405 is effective to enable the portion of the photocell circuit which is associated with apertures C and D to effect corresponding operations of the space recognition relays 415 and 420 (C" and D" respectively). Inasmuch as further punches of the calling party number are positioned over apertures C and D at this time, the space recognition relays 415 and 420 (C" and D" respectively) will be in the operated position. Relay 405 at its contacts 409 interrupts the holding circuit for the print termination relay 450 to effect the restoration thereof.

As the tape advances, the punches representing the calling party hundreds digit are moved over aperture A, whereby the counting chain drive relay 400 effects the advancement of the punch counting chain 700' and the registration thereon of the calling party hundreds digit. Briefly, as the first punch is moved over aperture A, counting chain relay 700 operates and as the first aperture is moved from its position above aperture A, the second counting chain relay 710 operates in series with first relay 700. As the second punch is moved above aperture A, the first counting chain relay 700 is released and as the second punch is moved from its position above aperture A, the third counting chain relay 720 operates in series with the second relay 710.

As the third punch moves over aperture A, the second counting chain relay 710 is restored, and as the third punch is moved from its position above aperture A, the fourth counting chain relay 730 is operated in series with the third relay 720. As the fourth punch is now brought into position above aperture A, the third counting chain relay 720 is restored and as the fourth punch is moved from its position above aperture A, the fifth counting chain relay 740 operates in series with the fourth relay 730.

With the operation of the fifth counting chain relay 740 and the closure of contact 742, an operating circuit is completed for the first cycle counting chain relay 750, the circuit extending from negative battery over the winding of relay 750, contacts 766, 774, 742, conductor 674 and contacts 451, 447 and 442 to ground.

At the time that the fourth aperture is being moved from its position above aperture A, the fifth (and last) punch of the calling party hundreds digit is moved from its position above aperture B, whereby the narrow space immediately subsequent thereto on the tape is moved into position over aperture B and the narrow space recognition relay 405 (B") is restored. Relay 405 restores and at its contacts 408 interrupts the energizing circuit for the tape advancing relay 32 to effect the temporary termination of the tape advancement.

Space recognition relay 405 is also effective to complete the energizing circuit to the print relay 825 as prepared by the punch counting chain 700°, the circuit extending from ground over contacts 442, 409, 485, 418, 454, 472, C594, C595, contacts 776, 768, 706, 718, 728, 736, conductor 815 over the fifth segment of the commutator 810, the brushes on arm 807, ring 809 and the winding of print relay 825 to negative battery.

Print relay 825 operates to effect the printing of the digit 5 upon the tape and in the manner of previous printing operations completes an energizing circuit for the print indication relay 480. Relay 480 operates and at its contacts 481 interrupts the advancing circuit for the character counting chain 500' to effect the release of relay 530 thereof; at its contacts 482 completes a holding circuit for the fifth counting chain relay 540 thereof, and at its contacts 483 completes an energizing circuit for the print termination relay 450.

Print termination relay 450 operates and at its contacts 454 interrupts the energizing circuit for the print relay 825, and at its contacts 451 interrupts the holding circuit for the fourth and fifth relays 730 and 740 of the punch counting chain 700', and the first relay 750 of the cycle counting chain 750' to effect the release thereof.

Print relay 825 restores and at its contacts 827 and 829 interrupts the holding circuit for the print indication relay 480 to effect the release thereof. Relay 480 restores and at its contacts 482 interrupts the holding circuit for the fifth counting chain relay 540 to effect the restoration thereof, which relay in restoring is effective at its contacts 541 to complete a series energizing circuit for the second and third cycle counting chain relays 555 and 560. Cycle counting chain relay 560 operates and at its contacts 562 interrupts the series energizing circuit for the fifth and sixth cycle counting chain relays 575 and 580 to effect the release of relay 575, and at its contacts 563 completes a holding circuit for the sixth counting chain relay 580, which circuit extends from negative battery over the lower winding of relay 580, contacts 582, 563, conductor 589, contacts 447 and 442 to ground.

Print indication relay 480 in its restoration is also effective at its contacts 485 to complete the energizing circuit to the tape advancing relay 32 to effect reinitiation of the movement of the tape for analyzing purposes. The operated ones of the character and cycle counting chain relays at this time indicate that the twenty-fourth character has been printed on the ticket.

CALLING PARTY NUMBER (THOUSANDS DIGIT)

As the tape advances, the narrow space immediately following the last punch of the hundreds digit of the calling party number is moved from its position above aperture B, and the first punch of the thousands digit of the calling party number is moved into position above aperture B to effect the operation of the associated relay 405, which relay operates to enable the portion of the photocell circuit which is associated with apertures C and D. In that further punches of the calling party thousands digit are positioned above the apertures C and D, the corresponding space recognition relays 415 and 420 (C″ and D″) are in the operated position.

As the tape advances to move the punches representing the thousands digit of the calling party number across aperture A, the counting chain drive relay 400 is operative to drive the punch counting chain 700′ and register therein the calling party thousands digit. Briefly, as the first punch is moved above aperture A, the punch counting chain relay 700 is operated, and as the first punch is moved from its position above aperture A, the second counting chain relay 710 is operated in series with relay 700. With the advancement of the tape and the consequent movement of the second hole above aperture A, the first counting chain relay 700 is restored, and as the second punch is moved from its position above aperture A, the third counting chain relay 720 operates in series with second relay 710. As the third hole is moved into position above aperture A, the second counting chain relay 710 restores.

Approximately at this time, the sixth (and last) punch of the thousands digit of the calling party's number is removed from its position above aperture D, and the wide space which follows the last punch of the last digit of the calling party's number will cover aperture D to effect the restoration of the space recognition relay 420 (D″).

As the tape continues in its advancement, the third punch of the thousands digit of the calling party's number is moved from its position above aperture A to effect the energization of the fourth counting chain relay 730 in series with the third relay 720. As the fourth punch is moved to a position above aperture A, the third counting chain relay 720 restores, and as the fourth punch is moved from its position above aperture A, the fifth counting chain relay 740 is energized in series with the fourth relay 730. The fifth counting chain relay 740 operates and at its contacts 742 completes an energizing circuit for the first relay 750 of the cycle counting chain 750′, the circuit extending from negative battery over the winding relay 750, contacts 766, 774, 742, conductor 674, contacts 451, 447 and 442 to ground. As the fifth punch is now moved above aperture A, the fourth counting chain relay 730 is restored, and as the fifth punch is moved from its position above aperture A, the fifth counting chain relay 740 is restored to effect at its contacts 741 the completion of the advancing circuit for the cycle counting chain 750′ whereby the first and second relays 750 and 760 thereof are operated in series.

Approximately at this time, the sixth (and final) punch is moved from its position above aperture C and the wide space which follows the last punch of the last digit of the calling party's number is moved thereacross to effect the restoration of the associated space recognition relay 415 (C″). As the sixth (and last) punch of the thousands digit of the calling party's number is moved to a position above aperture B, the associated space recognition relay 405 (B″) is restored.

Space recognition relay 405 in its restoration disables the photocell section associated with apertures C and D, interrupts the energizing circuit for the tape advancing relay 32 to temporarily terminate advancement of the tape and completes the energizing circuit for print relay 825, and completes the operating circuit to control relay 490, the circuit extending from negative battery over the lower winding of relay 490, contacts 495, 449, 424, 419, 485, 409 and 442 to ground. Relay 490 operates and at its contacts 494 completes a self-holding circuit extending over contacts 494 and 442 to ground.

Print relay 825 is operated to print the digit "6," the circuit extending from ground over contacts 442, 409, 471, 496, 448, 456, 475, C594, 595, contacts 776, 768, 706, 718, 728, 737, 747, conductor 816, the sixth segment of commutator 810, the brushes on arm 807, ring 809 and the winding of print relay 825 to negative battery.

Print relay 825 operates to effect the printing of digit six on the tape and in the manner of previous printing operations completes an operating circuit for print indication relay 480. Relay 480 operates and at its contacts 482 completes an energizing circuit to the first character counting chain relay 500 as previously described and at its contacts 483 completes an operating circuit to the print tremination relay 450.

Print termination relay 450 operates and at its contacts 456 interrupts the energizing circuit for print relay 825, and at its contacts 451 interrupts the holding circuit for the cycle counting chain relays 750 and 760 to effect the restoration thereof. Print relay 825 restores and at its contacts 827 and 829 interrupts the holding circuit for the print indication relay 480 to effect the release thereof.

Print indication relay 480 restores and at its contacts 485 completes an operating circuit to the print relay to effect the printing of the first of a group of fifteen star (*) characters on the tape, the circuit extending from ground over contacts 442, 409, 471, 496, 448, 455, 474, C593, contacts 579, 574, C592, contacts 499, 486, conductor 821 to the star (*) segment of the commutator 810, brushes on arm 807, ring 809 to the winding of print relay 825 to negative battery.

Print relay 825 operates and effects the printing of the first star (*) character of the group on the tape in the manner of previous printing operations, and at its contacts 827 and 829 completes an operating circuit for the print indication relay 480. Relay 480 operates and at its contacts 481 interrupts the advancing circuit for the character counting chain relay to effect the restoration of the first relay 500, and at its contacts 486 interrupts the energizing circuit for the print relay 825. Print relay 825 restores and at its contacts 827 and 829 interrupts the energizing circuit for the print indication relay 480 to effect the restoration thereof. Relay 480 restores and at its contacts 481 completes the advancing circuit for the character counting chain 500′ to effect the energization of the second and third counting chain relays 510 and 520 in series; and at its contacts 485 re-completes the energizing circuit for the print relay 825 to effect the printing of a second star (*) on the ticket in the manner just described.

Each time the print relay 825 operates to print a star the print relay contacts 827 and 829 are closed to complete an operating circuit for print indication relay 480, which relay operates to interrupt the energizing circuit to the print relay 825 to restore same. Thus, the circuit prints a set of stars at its own self-stepping rate. The arrangement of contacts 827 and 829 for sequence operating is effective so that the print indication relay 480 does not operate until both of these contacts close and does not release until both contacts open, whereby a full step on the print magnet is insured. Each operation of the print indication relay advances the character counting chain 500′.

Thus, as the print relay 825 operates to print the second star, it is effective at its contacts 827 and 829 to recomplete the energizing circuit for the print indication relay 480, the advancing circuit for the character counting chain 500′ is interrupted thereby to effect the release of the second counting chain relay 510, a holding circuit for the third counting chain relay 520 is completed, and the energizing circuit for the print relay 825 is interrupted to effect the restoration thereof.

As the print relay 825 restores it once more interrupts the energizing circuit for the print indication relay 480 to effect the restoration thereof, which relay in its restoration is effective at its contacts 481 to complete the advancing circuit for the character counting chain 500′ to effect the series energization of the third and fourth relays 520 and 530 thereof, and at its contacts 485, completes the energizing circuit to the print relay 825 to effect the energization thereof and the printing of the third star (*) on the ticket member.

The print relay 825 and the print indication relay 480 pump in this manner to effect the impression of a series of fifteen stars upon the ticket, the character counting chain relays being advanced with the impression of each star on the ticket.

Thus, with the release of print indication relay 480 to effect the printing of the third star, the advancing circuit for the character counting chain relay 500' is completed to effect the operation of the fourth counting chain relay 530 in series with third counting chain relay 520.

As the print indication relay 480 is operated following printing of the third star, the advancing circuit for the counting chain 500' is interrupted and the third relay 520 is restored. As the print relay energizing circuit is interrupted by print indication relay 480, relay 825 restores and at its contacts effects the restoration of the print indication relay 480. Relay 480 restores to complete the energizing circuit to print relay 825 to effect printing of the fourth star and completes the advancing circuit for the counting chain 500', whereby the fifth counting chain relay 540 operates in series with relay 530, and at its contacts 541 interrupts the advancing circuit for the cycle counting chain 550' to effect the restoration of its second relay 555.

With the printing of the fourth star by the print relay 825, an operating circuit is again completed to the print indication relay 480 to effect the operation thereof, which relay in its operation interrupts the advancing circuit for counting chain 500' whereby the fourth counting chain relay 530 is restored. The energizing circuit for the print relay 825 is again interrupted thereby.

As the print relay 825 restores, energizing circuit for print indication relay 480 is interrupted, whereby relay 480 restores to close the circuit to print relay 825 to effect printing of the fifth star. Relay 480 at its contacts 482 interrupts the holding circuit for the character counting chain to restore relay 540, which relay restores to interrupt the holding circuit for the third cycle counting chain relay 560. Relay 560 restores to complete the advancing circuit to the sixth cycle counting chain relay 580 in series with the fifth cycle counting chain relay 575 and effect the energization thereof.

With the printing of the fifth star by print relay 825, the energizing circuit is again completed for print indication relay 480 which operates to complete the initiating circuit for the counting chain 500' to again effect energization of the first relay 500 thereof, and simultaneously interrupts the circuit to print relay 825 to effect the restoration thereof. As the print relay 825 restores it effects interruption of the energizing circuit for print indication relay 480. Relay 480 restores and completes the advancing circuit to the character counting chain to energize relays 500 and 510 in series and simultaneously completes the energizing circuit for print relay 825 to effect the printing of the sixth star.

With operation of the print relay 825, the energizing circuit for print indication relay 480 is again completed to effect the operation thereof, and the consequent opening of the advancing circuit is effected to restore the first character counting chain relay 500. The energizing circuit for print relay 825 is also interrupted and relay 825 restores to again open the energizing circuit for print indication relay 480 to effect the restoration thereof. Relay 480 restores and effects the completion of the operating circuit to print relay 825 to effect the printing of the seventh star and completes the advancing circuit to the character counting chain 500' to effect the series operation of the third relay 520 in series with relay 510.

With the printing of the seventh star by print relay 825, the operating circuit for print indication relay 480 is again completed and with the operation thereof the advancing circuit for the chain is interrupted to effect the restoration of the second counting chain relay 510. The energizing circuit for print relay 825 is also interrupted and as the print relay 825 restores the energizing circuit for the print indication relay 480 is opened to effect the release thereof. Relay 480 restores to complete the advancing circuit to the character counting chain 500' to effect the series energization of the third and fourth counting chain relays 520 and 530 thereof, and to also complete the energizing circuit to the print relay 825 to effect the printing of the eighth star on the ticket.

Print relay 825 operates to complete an energizing circuit to print termination relay 480 which operates to interrupt the advancing circuit for the counting chain 500' and thereby effect the restoration of the third counting chain relay 520. The energizing circuit for print relay 825 is also interrupted and as print relay 825 restores, it interrupts the energizing circuit for print indication relay 480. Relay 480 restores to complete the energizing circuit for print relay 825 to effect the printing of the ninth star thereby. Relay 480 also effects recompletion of the advancing circuit to the character counting chain 500' to effect the operation of the fourth and fifth counting chain relays 530 and 540 in series. Character counting chain relay 540 in operating is effective at its contacts 542 to complete the initiating circuit to the cycle counting chain 550' to effect the operation of the first relay 550 thereof.

With the operation of print relay 825 to effect the printing of the ninth star, an operating circuit is completed to print indication relay 480. Relay 480 operates and at its contacts 481 interrupts the advancing circuit for the character counting chain 500' to effect the restoration of the fourth counting chain relay 530, and also interrupts the energizing circuit to print relay 825 to effect the restoration thereof. As print relay 825 restores, it interrupts the operating circuit for print indication relay 480, which relay restores to recomplete the operating circuit to the print relay 825 to effect the printing of the tenth star.

Relay 480 also opens the holding circuit for the counting chain 500' to effect the restoration of the fifth counting chain relay 540, which relay restores to effect the series energization of the second cycle counting chain relay 555 in series with the first relay 550.

With the operation of the print relay 825 to effect the printing of the tenth star, an operating circuit is again completed to the print indication relay 480. Relay 480 operates to interrupt the energizing circuit for the print relay 825 and to complete the initial energizing circuit to the character counting chain 500' to effect the energization of the first relay 500 thereof. As the print relay 825 restores, the energizing circuit for the print indication relay 480 is interrupted to effect the restoration thereof, which relay in its restoration completes the advancing circuit for the counting chain 500' to effect the series energization of the first and second relays 500 and 510 thereof. As print indication relay 480 restores, it also completes the energizing circuit for the print relay 825 which operates and effects the printing of the eleventh star on the tape and also recompletes the energizing circuit to print indication relay 480.

Print indication relay 480 operates and at its contacts interrupts the energization for the print relay 825 to effect the restoration thereof, and also interrupts the advancing circuit for the counting chain to effect the restoration of the first relay 500 thereof. As the print relay 825 restores, it interrupts the energizing circuit for print indication relay 480 which restores to complete the advancing circuit for the character counting chain 500' whereby the second and third counting chain relays 510 and 520 are operated in series. Relay 480 also completes an energizing circuit to the print relay 825 to effect the printing thereby of the twelfth star on the ticket.

As print relay 825 operates to print the twelfth star, it recompletes the energizing circuit for print indication relay 480. Relay 480 operates to interrupt the energizing circuit for the print relay 825, and to interrupt the advancing circuit for the character counting chain to effect the restoration of the second relay 510 thereof. As the print relay 825 restores, it interrupts the energizing circuit for print indication relay 480. Relay 480 restores to recomplete the advancing circuit to the character counting chain 500' to effect the series energization of the third and fourth relays 520 and 530 thereof and to complete an energizing circuit to the print relay 825 to control same in the printing of the thirteenth star on the ticket.

As the print relay 825 operates to print the thirteenth star, an energizing circuit is completed to the print indication relay 480. Relay 480 operates to interrupt the advancing circuit for the character counting chain 500' to effect the release of the third counting chain relay 520, and to also interrupt the energizing circuit for the print relay 825 to effect the restoration thereof. As the print relay 825 restores it effects interruption of the energizing circuit for the print indication relay 480. Relay 480 restores to recomplete the energizing circuit for the print relay 825 to effect the printing of the fourteenth star on the ticket. Relay 480 also completes the advancing circuit to the character counting chain to effect the series energization of the fourth and fifth counting chain relays 530 and 540 in series, the fifth counting chain 540 interrupting the advancing circuit for the cycle counting chain to effect the restoration of the second cycle counting chain relay 555.

As the print relay 825 operates to print the fourteenth star on the ticket, it completes the energizing circuit for the print indication relay 480. Relay 480 operates to interrupt the advancing circuit for the character counting chain 500' and thus effects the restoration of the fourth relay 530 thereof, and also effects the interruption of the energizing circuit for print relay 825. As print indication relay 825 restores, it completes an energizing circuit for the print indication relay 480. Relay 480 operates to interrupt the holding circuit for the character counting chain 500' to thus effect the restoration of the fifth counting chain relay 540, which in its restoration completes a series energizing circuit for the second and third cycle counting chain relays 555 and 560. As the third cycle counting chain relay 560 operates it interrupts the holding circuit for the fifth cycle counting chain relay 575 to effect the restoration thereof, whereby the relays 555, 560 and 580 are the only relays of the characters counting group in the operated position at this time.

Relay 480 also completes an energizing circuit to print relay 825. Print relay 825 operates to print the fifteenth star on the ticket and to complete an energizing circuit for the print termination relay 480. Relay 480 operates to complete the initial energizing circuit for the character counting chain 500' to operate the first relay 500 thereof and thereby initiate the final cycle thereof.

At this time character counting chain relay 500 and the character cycle counting chain relays 560 and 580 are energized whereby holding ground which has been previously extended to the analyzer hold relay 440 over contacts 442, 447, 462, 492 and the alternative paths extending over contacts 501, 561 or 581, to C585, the winding of the hold relay 440 and negative battery is now interrupted in that each of these three alternative paths is opened with the advancement of the character counting chain to this position. Analyzer hold relay 440 restores and at its contacts 442 interrupts the holding ground for the relays 460, 470, 500, 560, 580 and 490 to effect the restoration thereof.

Analyzer hold relay 440 at its contacts 444 completes an energizing circuit for the tape advancing relay 32, the circuit extending from ground over contacts 435, 841, 46, 444, C13 and winding of relay 32 to negative battery.

As the tape advancing relay is operated, the tape 21 continues in its movement from reel 20 to reel 28 to bring the first punch of the minutes punches of the second call on the tape 21 into position above aperture B to effect the operation thereof and the reenergization of the analyzer in the manner of its operation in analyzing the first call.

INCOMPLETE CALL

The movement of the tape 21 from reel 20 to reel 28 is effected in the manner described, the analyzing equipment examining the punches on the tape to effect the printing of tickets for each of the calls recorded thereon as set forth hereinbefore. It will be apparent with reference to Figure 10 that the information recorded on the tape in the event of an unanswered call will consist of the number of the calling party and the number of the called party alone. Accordingly as the tape proceeds below the scanner equipment 24, the first punch of an incomplete call to pass over the scanner will be the punches of the last digit (ring or party digit) of the called number. Following the passage of the punches representing this digit beneath the scanner equipment, the narrow space immediate subsequent thereto will be positioned over aperture B, and the punches of the second digit of the calling number will be positioned above aperture C, whereby the space recognition relays 405—415 (B" and C") will indicate to the analyzer that a narrow space has been encountered. Space recognition relay 405 (B") restores and at its contacts 409 completes an operating circuit for the relay 490, the circuit extending from negative battery over the winding of relay 490, contacts 495, 473, 454, 418, 485, 409, and 442 to ground.

Control relay 490 operates and at its contacts 491 interrupts the holding circuit for the analyzer hold relay 440 to effect the restoration thereof, and at its contacts 494 locks to ground over contacts 442.

Hold relay 440 restores and at its contacts 444 completes an energizing circuit for the tape advancing relay 32, the circuit extending from ground over contacts 442, 444 and conductor 13, and the winding of relay 32 to negative battery. Tape advancing relay 32 operates and movement of the tape past the analyzer scanning box 24 is effected. As the remaining punches representing the digits of the called number and the calling number pass over the apertures in the mask 53, the photocall equipment will effect the operation of the space recognition relays 400 (A")—420 (D") inclusive, but no printing will be effected on the ticket 851 by reason of the restored condition of the analyzer hold relay 440 and the interruption of the printing circuits at its contacts 448. The printing circuit is further interrupted at this time as a result of the restored condition of relay 470.

As the last punch of the last digit of the calling number passes above the apertures of mask 53 and the wide space following same on the tape is moved over the scanning mask, the space recognition relays 405 (B"), 415 (C") and 420 (D") are restored to recognize the wide space on the tape member whereby the analyzer is notified that the last punch of the incomplete call has passed thereover.

With the resultant restoration of relays 405, 415, and 420 in combination, a restoring circuit is completed from ground over contacts 442, 409, 485, 419, 424, 449 and 493, to effect the restoration of the control relay 490 in an obvious manner. The equipment is now in the condition normally experienced following the completion of the analyzation of a completed call, and accordingly as the first punches of the following call on the tape are passed over the analyzer scanning equipment 24, the operation of the analyzer to record the information indicated thereby is effected in the manner described hereinbefore.

END OF TAPE

As the tape 21 has been completely moved from reel 20 to reel 28, the apertures A, B, C and D will be uncovered and the corresponding space recognition relays 400 (A")—420 (D") inclusive will be operated.

That is, as space recognition relay 405 (B") operates, it enables the portion of the photocell circuit associated with the apertures C and D to permit the operation of relays 415 (C") and 420 (D"), relay 405 (B") at its contacts 408 also connects ground to the analyzer hold relay 440 to effect the operation thereof, the circuit extending from negative battery over the analyzer hold relay 440, conductor 585, contacts 501, C586, contacts 491, contacts 446, 408 and 442 to ground; and at its contacts 409 interrupts the holding circuit for the print termination relay 450 and the print indication relay 480 to effect the restoration thereof.

With relays 400 (A") and 405 (B") in the operated condition, the energizing circuit is complete for the negative battery over the winding of the first minute counting chain relay 600, contacts 615, 623, 634, conductor 667, contacts 466, 410, C672, contacts 771, 761, conductor 671, contacts 403, 451, 447 and 442 to ground.

The first minute punch counting relay 600 operates and at its contacts 601 interrupts the holding circuit for the start relay 430, which relay being slow to release is held operated for a predetermined period thereafter. With the elapse of the predetermined period of time, start relay 430 restores, and at its contacts 431 interrupts the energizing circuit for the photocell lamp 50 and the tape drive motor 51; at its contacts 434 completes an energizing circuit for the print termination relay 450 which extends from negative battery over the winding of relay 450, contacts 434, 841, 46 and 442 to ground; at its contacts 432, completes an energizing circuit for change relays 460 and 470 in series, the circuit extending from negative battery over the windings of relays 470 and 460, contacts 443, 432, 843 and 44 to ground.

Change relays 460 and 470 operate, and relay 460 at its contacts 466 interrupts the holding circuit for the minute counting chain relay 600 to effect the restoration thereof.

With the extinguishment of lamp 50, the photocell equipment effects the restoration of the associated space recognition relays 400–420 (A"–D") inclusive, whereby relays 405, 415 and 420 in their restoration are effective at their contacts 409, 419 and 424 to complete an energizing circuit for the control relay 490, the circuit extending from negative battery over the lower winding of relay 490, contacts 495, 449, 424, 419, 485, 409 and 442 to ground.

Control relay 490 operates and at its contacts 499 completes an operating circuit for print relay 825 to effect the printing of the star (*) character on the tape, the operating circuit extending from negative battery over the winding of relay 825, ring 809, the brushes on arm 807, the segment indicated by the character star (*), conductor 821, contacts 486, 499, conductor 592, contacts 579', C593, contacts 475, 456, 448, 496, 471, 409 and 442 to ground.

The print relay 825 operates to effect the printing of the star (*) character on the ticket in the manner of previous printing operations, and at its armature 835 effects the closure of contacts 827 and 829 to complete the operating circuit for print indication relay 480 as in previous printing operations. Relay 480 operates and at its contacts 481 completes the energizing circuit for the character counting chain to operate the first relay 500 thereof, and at its contacts 486, interrupts a point in the energizing circuit for print relay 825 to effect the restoration thereof.

Print relay 825 restores and at its contacts 827 and 829 interrupts the holding circuit for print indication relay 480 to effect the restoration thereof. Relay 480 restores and at its contacts 481 completes the advancing circuit over C590 to the character counting chain 500' to effect the energization in series of the first and second relays 500 and 510, and at its contacts 486 recompletes the energizing circuit for the print relay 825 to effect the re-operation thereof in the printing of the second star (*).

The print relay 825 operates to effect the printing of the star (*) character on the tape, and at its contacts 827 and 829 completes the energizing circuit for print indication relay 480 to effect the re-energization thereof. The sequence of operation follows the pattern set forth previously herein relative to the printing of the start (*) characters on the ticket following the impression of the billing information on the ticket, the character counting chain 500' and the associated cycle counting chain 550' being advanced by the printing relays 480 and 825 until such time as the restoration of the fifth character counting chain relay 540 is effected and in turn the operation of the third cycle counting chain relay 560 and the restoration of the fifth counting chain relay 575 are accomplished.

Such operation will occur immediately after the printing of the fifteenth star is effected. That is, as print indication relay 480 is operated by the print relay, 825 to complete an energizing circuit for the first character counting chain relay 500, the energizing circuits for the analyzer hold relay 440 which extend over alternative contacts 506, 561 and 581 are all interrupted and the restoration of the analyzer hold relay 440 is effected. With the restoration of the hold relay 440, and the energizing circuits for the termination relays 460 and 470, character counting chain relays 500, 560 and 580, control relay 490, print indication relay 480, print termination relay 450, and print relay 825 are interrupted thereby to effect the restoration thereof.

It is seen therefore that as the tape runs out to uncover the apertures A, B, C and D, a ticket containing nothing but stars is printed allowing the last good ticket to be cut off and dropped into the hopper. The analyzer equipment thereafter shuts down automatically.

OPERATION OF "BLANK" BUTTON

With the analyzer in the idle condition and upon the operation of the blank button 38 (Figure 1), contacts 38a (Figure 4) thereon are closed to complete an energizing circuit for the analyzer hold relay 440 in an obvious manner. With the operation of the hold relay 440, the analyzer equipment responds in the manner set forth above, i. e., as the tape ran out and the apertures A, B, C, and D were uncovered to effect energization of analyzer hold relay 440. The equipment is operated to effect the printing of the fifteen star (*) characters on the ticket as before, and is then automatically brought to rest.

STOP-RUN SWITCH 36

If during a run, the run-stop switch 36 is moved to the stop position to open contacts 44 and 46 and close contacts 45, the printer will finish the particular call which is being analyzed at the time and will then be brought to rest.

More specifically, during the analyzation of any call, start relay 430 and hold relay 440 are in the operated position. As the stop-run switch 36 is thrown to the stop position, the energizing circuit for the start relay is interrupted to effect the release thereof. Hold relay 440 is held operated whereby the call under analyzation will be completed. At the end of the analyzation of the call, the hold relay 440 is automatically restored, and the circuit is brought to rest.

*Analyzer embodiment for use with card puching machine*

According to a second embodiment, the analyzer equipment is operative to control associated equipment in the preparation of records which may be utilized subsequently in various types of control systems. The records may be of any of the various commercially available types, such as the code punching of card members, frequency recording on magnetic tape, etc. One form of card punching equipment which has been utilized with the analyzer is commercially available from the International Business Machine Corporation, and another is available from the Remington Rand Corporation.

As shown in Figure 12, the basic modification consists of extending the print control conductors C811—C821 and C823 to the corresponding card punching members of the machine, i. e. conductor 811 (digit 1) to the control unit for punching digit 1, etc. Conductor 1203 is connected between the print termination members of the machine to control a bridging relay 1200, the machine placing a ground impulse on conductor 1203 with receipt of a print impulse over C811—C821 and C823 and removing same following completion of the printing operation.

The contacts 1201 and 1202 of the bridging relay 1200 are connected across C803, C804 and C805 in the manner of the print contacts 827 and 829 of the first embodiment and effect similar control functions.

Conductor 1205 is connected between the star conductor 821 and the card eject mechanism of the card punching machine. The card eject contacts 1206 of the machine which open when the card is ejected and closed when the new card is in place are connected in a portion of the notching circuit for hold relay 440 as shown.

In operation, as the analyzer is energized, in the manner heretofore described, the minute punches of the first call are passed over the scanning equipment to effect the registration of the punches on the minute counting chain 600'. The medium space which is immediately subsequent thereto on the tape is then moved into position above aperture B and the corresponding space recognition relays 405 (B") and 415 (C") are restored to effect the recognition of a medium space and to complete a ground circuit to the particular one of the conductors 811—820 which is associated with the third digit of the charge for the analyzed call. The corresponding register member on the associated IBM machine is operated thereby to effectively register on the card the proper code for the "cents" digit of the charge. With the punching of the code thereon, ground is returned over conductor 1203 from the associated card punching equipment to complete an energizing circuit for the bridging relay 1200 which operates, and at its contacts 1201 and 1202 effects completion of an energizing circuit for the print indication relay 480, the circuit extending from battery over the winding of relay 480, conductor 803, contacts 1201, 1202, conductor 805, contacts 409 and 442 to ground.

Print indication relay 480 operates, and at its contacts 483 completes the energizing circuit to print termination relay 450 as in the previous embodiment, relay 450 operating to open the contacts 456 and thereby remove ground from the particular one of the control conductors 811—820 which was energized to record the "cents" digit of the charge.

Bridging relay 1200 is held by ground received over conductor 1203 from the associated card punching contacts and is released at a later period independent of the removal of the ground from the control conductors 811—820 extending to the equipment.

As the ground is removed by the associated card punching machine, bridging relay 1200 restores and at its contacts 1201 and 1202 interrupts the holding circuit for print indication relay 480, which restores and at its contacts 483 interrupts the holding circuit for print termination relay 450.

As print termination relay 450 restores, it is effective at its contacts 456 to effect the application of ground to the control conductor which represents the digit of the "dimes" charge as determined by the operated condition of the minutes counting chain 600'. The associated card punch machine is energized thereby to register the "dimes" charge digit on the card.

With the punching of the card by the machine, ground is again impressed thereby over conductor 1203 to effect the operation of the bridging relay 1200, which operates and completes an operating circuit for the print indication relay 480. Relay 480 operates to complete an energizing circuit for print termination relay 450 which operates to interrupt the ground circuit which is being applied over the chosen control conductor to the punch machine. As the printing of the dimes charge is completed, the card punch machine removes the ground from C1203 to effect the restoration of the bridge relay 1200, and the consequent restoring of print indication relay 480. Relay 450 restores and at its contacts 456 completes the charging circuit over the appropriate one of the control conductors C811—820 to the associated card punching machine to effect the printing of the "dollars" digit of the charge.

With the operation of the machine to print the dollars digit of the charge, a pulse is again applied by the machine over C1203 to the bridging relay 1200 to effect the operation thereof whereby the print indication relay 480 and the print termination relay 450 operate in sequence to interrupt the operating ground extending over the control conductor to the card punching machine.

With the printing of the "dollars" digit by the card punching machine, the ground on conductor 1203 is removed thereby to effect the restoration of bridge control relay 1200 which in turn effects restoration of the print indication relay 480.

It will be apparent from the description of the analyzer in the first embodiment that with the operation of the print indication relay 480 during the period that the cents, dimes and dollars digits are printed, the character counting chain relay 500' will be advanced to the position where its third and fourth relays 520 and 530 are operated in series, and accordingly the energizing circuit will be completed for the switching relays 460 and 470. Thus, as the print indication relay 480 restores following printing of the "dollars" digit, the print termination relay 450 will be maintained energized over a circuit extending from negative battery over the winding of relay 450, contacts 452, 402, 471, 409 and 442 to ground. The relay is also maintained operated following passage of the last minute punch over the scanning slot, the circuit extending over contacts 452, 402, 464, 447 and 442 to ground.

Print termination relay 450 in its operation is effective at its contacts 455 to complete an operating circuit for the bridge control relay 1200, the circuit extending from negative battery over winding of relay 1200, conductor 823, contacts 499', conductor 592, contacts 579', conductor 593, contacts 474, 455, 448, 423, 419, 485, 409 and 442 to ground.

The bridge control relay 1200 operates and at its contacts 1201 and 1202 effects operation of the print indication relay 480, which in its operation completes a holding circuit for the print termination relay 450.

As the tape advances and the first punch of the hours "tenths" digit is moved into position above aperture B of the scanning slot, the corresponding space recognition relay 405 (B") restores, and at its contacts 409 interrupts the holding circuit for the print indication relay 480 and the print termination relay 450 to effect the restoration thereof. Relay 450 restores and effects interruption of the ground on the dash (—) conductor 593, whereby the energizing circuit for the bridge control relay 1200 is interrupted and the relay restores.

The punches representing the hours tenths digit on the tape pass over the scanning mask and the equipment is operated as in the first embodiment to register the number of punches in the digit upon the punch counting chain 700'. As the last punch of the hours tenths digit is removed from its position above aperture B, the corresponding space recognition relay 400 (B") is restored to complete the normal print lead conductor 594 and the printing circuit as prepared by the punch counting chain 700' to the appropriate one of the printing conductors 811—820.

With the completion of the energizing circuit to the card punching machine, the appropriate hours tenths digit is punched on the card, and ground is returned by the machine over conductor 1203 to effect the operation of the bridge control relay 1200, which in turn effects the operation of print indication relay 480 followed by the operation of print termination relay 450.

Print termination relay 450 operates to interrupt the energizing circuit which extends over the appropriate control conductor to the card punching equipment. With termination of the printing operation thereby, the card punching equipment removes ground from conductor 1203 to effect the restoration of bridge control relay 1200, which in turn effects the restoration of the print indication relay 480.

Print termination relay 450 is maintained operated over contacts 409 of the restored space recognition relay 405 and is retained in that condition until such time as the first punch of the following digit (at this time the hours units digit) passes over aperture B to effect the operation thereof.

The aforedescribed operations wherein bridge termination relay 1200 operates to energize print indication relay 480 which in turn energizes print termination relay 450, which operates and in its turn effects the restoration of print indication relay 480 and the holding of print termination relay 450 until the first punch of the subsequent digit on the tape passes over aperture B are standard whenever a narrow space is encountered between successive digits.

Whenever a medium space is encountered between digits, print indication relay 480 will effect operation of the print termination relay 450 which operates and restores print indication relay 480 to effect the operation of bridge termination relay 1200 via the dash (—) conductor 593. Bridge control relay 1290 in its operation effects reoperation of print indication relay 480, which in turn operates print termination relay 450, the relays 450 and 480 being maintained operated until the first punch of the subsequent digit on the tape passes over aperture B to effect the operation thereof. Such operation of the relays 450, 480 and 1200 is effected each time that a medium space is encountered following the analyzation of a set of digit punches and the printing of the digit.

The tape advances over the scanning mask 24 whereby the information which is registered on the tape is analyzed and the analyzer is operated to control the operation of the card punching equipment over the conductors 811—821 and 823 in the manner described.

Following the printing of the last digit of the called party number and the consequent operation of the print indication relay 480 and the print termination relay 450, the print control circuit extending over the appropriate control conductors to the card punch equipment is interrupted to effect the restoration of print indication relay 480. Relay 480 restores and the character counting chain 500' is advanced, the chain at this point being advanced to the stage where the fourth and fifth relays 530 and 540 of the character counting chain 500' are operated in series. The fifth counting chain relay 540 operates and at its contacts 542 effects the completion of a circuit to the first cycle counting chain relay 550, and at its contacts 545 completes the operating circuit to the "cut" conductor 802 as in the first embodiment, whereby an operating circuit is completed to the bridge control relay 1200.

Bridge control relay 1200 operates to complete the energizing circuit for the print indication relay 480 which in turn effects the restoration of the fourth character counting chain relay 530 to interrupt the application of the energizing circuit over the "cut" conductor 802, which extends to the control bridge relay 1200. Relay 1200 restores to interrupt the energizing circuit for print indication relay 480 which in its restoration effects the release of the fifth counting chain relay 540, which in turn completes an energizing circuit for the second cycle counting chain relay 555. Relay 555 operates and effects the application of ground to the dash (—) conductor 593 to effect the reoperation of control bridge relay 1200. Relay 1200 operates and in turn completes an operating circuit for the first character counting chain relay 500. As the first punch of the first digit of the calling number is brought into position above aperture A, the restoration of the print indication relay 480 and print termination relay 450 is effected, and the ground application circuit for the printing equipment is opened to effect the restoration of the bridge control relay 1200.

As the complete information of a call has been analyzed and the wide space appearing on the tape thereafter is encountered, the analyzer equipment operates as in the first embodiment to effect the application of ground to the star conductor 821, which conductor is connected to the card ejecting equipment of the interconnected card punching machine over conductor 1205 to cause the equipment to eject the card therefrom.

As previously noted, a set of card eject contacts 1206 are connected between points A and B on Figure 12, which contacts are controlled by the associated card punching machine to open as the punch card is ejected from the machine. Thus, as the card is now ejected and the contacts 1206 are opened, the hold relay 440 for the analyzer is restored along with the switching relays 460, 470 and the character counting chain relays 500 and 510. Analyzer hold relay 440 restores to complete an energizing circuit for the upper winding of control relay 490 which is in opposition to the lower winding thereof, whereby the release of relay 490 is effected. As switching relay 470 restores the holding circuit for print termination relay 450 is interrupted to restore same.

With the card eject contacts 1206 in the open condition, the restoration of the analyzer hold relay 440 does not effect the operation of the tape clutch mechanism as in the first embodiment, whereby further advancement of the tape 21 is now placed under the control of the card punching machine. That is, as a new card is positioned in the associated card punching machine for recordation of the next call on the tape and the contacts 1206 are closed responsive thereto, a circuit is completed for the tape advancing relay 32 and the readvancement of the tape is effected.

With the advancement of the tape to bring the first minute punch of the following call into position above aperture B, the space recognition relay 405 (B") is operated to control reenergization of the analyzer hold relay 440 and the space recognition relays 415 and 420, whereby the analyzer equipment is now conditioned to analyze the following call on the tape and effect the operation of the card punching machine in the registration of the data on a card which is individual thereto.

As the tape runs out following analyzation of the last call thereon, the slots are uncovered to effect the operation of the space recognition relays 400 (A")—420 (D") and the analyzer hold relay 440 in the manner of the first embodiment. The first minute punch relay 600 is held operated to interrupt the energizing circuit for the start relay 430, which restores to complete an operating circuit for the print termination relay 450, to stop the tape motor 51, to extinguish the lamp 50, and to effect the restoration of space recognition relays 400 (A") to 420 (D"), print termination relay 450, switching relays 460 and 470. Switching relay 470 in restoring interrupts the holding circuit for the first minute punch counting relay 600 to restore same. As the space recognition relays 405 (B"), 415 (C") and 420 (D") have restored, an operating circuit is completed to the lower winding of control relay 490 to effect the operation thereof, whereby ground is applied over the star lead 821, and conductor 1205 to the card eject mechanism associated with the card punching machine. The card punching machine operates to eject the card and simultaneously effect opening of the card eject contacts whereby hold relay 440 is restored to in turn interrupt the holding circuits for print termination relay 450, switch relays 460 and 470 and control relay 490, to effect the restoration thereof.

The disclosure of this second embodiment for use with card punching equipment is, of course, more general in nature, it being apparent that the arrangement lends itself to further detailed modification for use with most commercial card punching equipment.

There is set forth hereat a set of tables which teach in detail the various circuits completed with the detection of different digit and space values by the scanning means in either of the illustrated embodiments.

TABLE 1 a.—Minutes counting chain start and holding circuits: C667, 466, 410, C672, 771, 761, C671, 403, 463, 447, 442, + b.—Minutes counting chain advancing circuit: C665, 404, 463, 447, 442, +

TABLE 2

Control conductor printing circuits

DIGIT "1"

Number of holes: 1
Relays operated: none
Printing circuit: +, normal printing lead, C594, C595, 776, 768, 706, 718, 728, 737, 748, C811

DIGIT "2"

Number of holes: 2
Relays operated: 700, 710
Printing circuit: +, normal printing lead, C594, C595, 776, 768, 705, 812

DIGIT "3"

Number of holes: 3
Relays operated: 710, 720
Printing circuit: +, normal printing lead, C594, C595, 776, 768, 706, 717, C813

DIGIT "4"

Number of holes: 4
Relays operated: 730
Printing circuit: +, normal printing lead, C594, C595, 776, 768, 706, 718, 727, C814

DIGIT "5"

Number of holes: 5
Relays operated: 740, 750
Printing circuit: +, normal printing lead, C594, C595, 776, 768, 706, 718, 728, 736, C815

DIGIT "6"

Number of holes: 6
Relays operated: 760
Printing circuit: +, normal printing lead, C594, C595, 776, 767, 704, 716, 726, 735, 746, C816

DIGIT "7"

Number of holes: 7
Relays operated: 700, 710, 750, 760
Printing circuit: +, normal printing lead, C594, C595, 776, 767, 703, C817

DIGIT "8"

Number of holes: 8
Relays operated: 710, 720, 750, 760
Printing circuit: +, normal printing lead, C594, C595, 776, 767, 704, 715, C818

DIGIT "9"

Number of holes: 9
Relays operated: 720, 730, 750, 760
Printing circuit: +, normal printing lead, C594, C595, 776, 767, 704, 716, 725, C819

DIGIT "0"

Number of holes: 10
Relays operated: 730, 740, 760
Printing circuit: +, normal printing lead, C594, C595, 776, 767, 704, 716, 726, 734, 820

TABLE 3

Character counting chain a.—Initiating circuit and holding circuit: C591, 482, 447, 442, + b.—Advancing circuit: C590, 481, 447, 442, +

TABLE 4

Operation of print indication relay 480 by print relay 825: negative, 480, C803, 829, 827, C805, 409, 442, ground

TABLE 5

Punch chain 700' a.—Advancing circuit: C670, 467, 404, 451, 447, 442, + b.—Initial energizing and holding circuit: C679, C668, 465, 410, C672, 771, 761, C671, 403, 451, 447, 442, +

TABLE 6

Energizing circuit for tape advancing relay 32 as completed by print indication relay 480 following each printing operation:

a.—Medium space: (Space recognition relay 415 down) +, 442, 409, 485, 419, 423, 448, 455, 474, C593, 579, C592, rectifier 412, 498, C13, 32, negative.

b.—Narrow space: (Space recognition relay 415 operated) +, 442, 409, 485, 418, 453, rectifier 413, 498, C13, 32, negative.

TABLE 7

Charge circuit: Medium space (relays 405 and 415 down, 420 operated, 470 restored)

Ground: 442, 409, 485, 419, 423, 448, 456, 476, C669 to the charge lead prepared by the minutes counting chain and character counting chain relays as shown in Table 13.

TABLE 8

Dash (—): printing circuit—medium space: (Relays 405 and 415 restored, 420 operated, 470 operated)

Ground: 442, 409, 485, 419, 423, 448, 455, 474, C593, C579', C592, 499', C823, Segment marked dash on commutator 810, brushes on 807, ring 809 and winding of print relay 825.

TABLE 9

Normal print circuit (narrow space): (Relay 405 restored, 415 and 420 operated, 450 restored and 470 operated)

Ground: 442, 409, 485, 418, 454, 472, C594 to the circuits prepared by the punch counting chain.

TABLE 10

Normal print circuit (medium space): (Relays 405 and 415 restored, 420 and 470 operated)

Ground: 442, 409, 485, 419, 423, 448, 456, 475, C594 to the segments as controlled by the operated relays of the punch counting chain. See Table 2.

TABLE 11

Normal print circuit (after control relay 490 operates): (Relays 405, 415, 420 restored, 470 and 490 operated)

Wide space—ground: 442, 409, 485, 419, 424, 449, 495, R490 and negative battery.

442, 409, 471, 496, 448, 456, 475, C594 to normal print lead.

TABLE 12

Star circuit (relays 405, 415, 420 restored, relays 470 and 490 operated) 442, 409, 471, 496, 448, 455, 474, C593 contacts 526–579' in various combinations, C592, 499, 486, C821, commutator segment "Star," brushes on arm 807, ring 809, R825 to negative battery.

TABLE 13.—CHARGE PRINTING

It should be kept in mind that for one minute none of the minute counting chain relays 600–640 inclusive are operated; for two minutes relays 600 and 610 are operated; for three minutes relays 610 and 620 are operated; for four minutes only relays 620, 630, 640 are operated; for five minutes only relay 640 and 600 are operated; etc.

Also that before "cents charge" printing character counting relays 500 and 510 are restored; before "dimes charge" relays 510 and 520 are both operated; and before dollars charge relay 500 is restored and relay 510 is operated.

*1 minute (with minute charge switch 650 in down position)*

Charges: 000
Cents: Ground, contacts 442, 409, 485, 419, 423, 448, 456, 476, C669, 605, 617, 625, 647, 652, C681, C820, Segment 0
Dimes: Same to C820, Segment 0
Dollars: Same to C820, Segment 0

*1 minute (with minute charge switch in side position)*

Charges: 015
Cents:
  + on C669, 605, 617, 625, 647, 651, 645, C680
  507, 518, C597, C815, Segment 5
Dimes: (500 and 510 operated)—
  506, C594, C595, 776, 768, 706, 718, 728, 737, 748, C811, Segment 1
Dollars: (510 operated)—
  507, 517, C596, 784, C820, Segment 0

*2 minutes (with minute charge switch in either position)*

Charges: 015
Cents:
  (Relays 600 and 610 operated) Ground on C669, 604, 645, C680
  507, 518, C597, C815, Segment 5
Dimes: (500 and 510 operated)—
  506, C594, C595, 776, 768, 706, 718, 728, 737, 748, C811, Segment 1
Dollars: (510 operated)—
  507, 517, C596, 784, C820, Segment 0

*3 minutes (with minute charge switch in either position)*

Charges: 015
Cents:
  (Relays 610 and 620 operated) Ground on C669, 605, 616, C680
  507, 518, C597, C815, Segment 5
Dimes: (500 and 510 operated)—
  506, C594, C595, 776, 768, 706, 718, 728, 737, 748, C811, Segment 1
Dollars: (510 operated)—
  507, 517, C596, 784, C820, Segment 0

*4 minutes (with minute charge switch in either position)*

Charges: 015
Cents:
  (620, 630 and 640 operated) + 605, 617, 624, C680
  507, 518, C597, C815, Segment 5
Dimes: (500 and 510 operated)—
  506, C594, C595, 776, 768, 706, 718, 728, 737, 748, C811, Segment 1
Dollars: (510 operated)—
  507, 517, C596, 784, C820, Segment 0

*5 minutes (with minute charge switch in either position)*

Charges: 020
Cents:
  (640 and 700 operated) + 605, 617, 625, 646, 644, C678
  505, 516, C681, C820, Segment 0
Dimes: (500 and 510 operated)—
  504, C595, 776, 768, 705, C812, Segment 2
Dollars: (510 operated)—
  505, 515, C596, 784, C820, Segment 0

*6 minutes (it will be assumed from here on that min. chg. switch 650 may be in either position)*

Charges: 020
Cents:
  (600, 610, 640 and 700 operated) +C669, 604, 644, C678
  505, 516, C681, C820, Segment 0
Dimes: (500 and 510 operated)—
  504, C595, 776, 768, 705, C812, Segment 2
Dollars: (510 operated)—
  505, 515, C596, 784, C820, Segment 0

*7 minutes*

Charges: 025
Cents:
  (610, 620, 640 and 700 operated) +, C669, 605, 616, C680
  507, 518, C597, C815, Segment 5
Dimes: (500 and 510 operated)—
  506, C594, C595, 776, 768, 705, C812, Segment 2
Dollars: (510 operated)—
  507, 517, C596, 784, C820, Segment 0

*8 minutes*

Charges: 025
Cents:
  (620, 630, 700 and 710 operated) +, C669, 605, 617, 624, C680
  507, 518, C597, C815, Segment 5
Dimes: (500 and 510 operated)—
  506, C594, C595, 776, 768, 705, C812, Segment 2
Dollars: (510 operated)—
  507, 517, C596, C820, Segment 0

*9 minutes*

Charges: 030
Cents:
  (710, and 640 operated) +, C669, 605, 617, 625, 646, 644, C678
  505, 516, C681, C820, Segment 0
Dimes: (500 and 510 operated)—
  504, C595, 776, 768, 706, 717, C813, Segment 3
Dollars: (510 operated)—
  505, 515, C596, 784, C820, Segment 0

*10 minutes*

Charges: 030
Cents:
  (600, 610, 710 and 640 operated) +, C669, 604, 644, C678
  505, 516, C681, C820, Segment 0
Dimes: (500 and 510 operated)—
  504, C595, 776, 768, 706, 717, C813, Segment 3
Dollars: (510 operated)—
  505, 515, C596, 784, C820, Segment 0

*11 minutes*

Charges: 035
Cents:
  (610, 620, 710 and 640 operated) +, C669, 605, 616, C680
  507, 518, C597, C815, Segment 5
Dimes: (500 and 510 operated)—
  506, C595, 776, 768, 706, 717, C813, Segment 3
Dollars: (510 operated)—
  505, 517, C596, C820, Segment 0

*13 minutes*

Charges: 040
Cents:
  (720 and 640 operated) +, C669, 605, 617, 625, 646, 644, C678
  505, 516, C681, C820. Segment 0
Dimes: (500 and 510 operated)—
  504, C595, 776, 768, 706, 718, 727, C814, Segment 4

Dollars: (510 operated)—
    505, 515, C596, 784, C820, Segment 0

*17 minutes*
Charges: 050
Cents:
    (730 and 640 operated) +, C669, 605, 617, 625, 646, 644, C678
    505, 516, C681, C820, Segment 0
Dimes: (500 and 510 operated)—
    504, C595, 776, 768, 706, 718, 728, 736, C815, Segment 5
Dollars: (510 operated)—

*21 minutes*
Charge: 060
Cents:
    (740, 750 and 640 operated) +, C669, 605, 617, 625, 646, 644, C678
    505, 516, C681, C820, Segment 0
Dimes: (500 and 510 operated)—
    504, C595, 776, 768, 706, 718, 728, 737, 747, C816, Segment 6
Dollars: (510 operated) —
    505, 515, C596, 784, C820, Segment 0

*24 minutes*
Charge: 065
Cents:
    (620, 630, 750, 760 and 640 operated) +, C669, 605, 617, 624, C680
    507, 518, C597, C815, Segment 5
Dimes: (500 and 510 operated)—
    506, C595, 776, 767, 704, 716, 726, 735, 746, C816, Segment 6
Dollars: (510 operated)—
    507, 517, C596, 784, C820, Segment 0

*25 minutes*
Charge: 070
Cents:
    (700, 750, 760, 640 operated) +, C669, 604, 644, C678
    505, 516, C681, C820, Segment 0
Dimes: (500 and 510 operated)—
    504, C595, 775, 767, 703, C817, Segment 7
Dollars: (510 operated)—
    505, 515, C596, 784, C820, Segment 0

*29 minutes*
Charge: 080
Cents:
    (710, 750, 760, 640 operated) +, C669, 605, 617, 625, 646, 644, C678
    505, 516, C681, C820, Segment 0
Dimes: (500 and 510 operated)—
    504, C595, 775, 767, 704, 715, C818, Segment 8
Dollars: (510 operated)—
    505, 515, C596, 784, C820, Segment 0

*33 minutes*
Charge: 090
Cents:
    (720, 750, 760, 640 operated) +, C669, 605, 617, 625, 646, 644, C678
    505, 516, C681, C820, Segment 0
Dimes: (500 and 510 operated)—
    504, C595, 775, 767, 704, 716, 725, C819, Segment 9
Dollars: (510 operated)—
    505, 515, C596, 784, C820, Segment 0

*37 minutes*
Charge: 100
Cents:
    (730, 750, 760, 640 and 780 operated) +, C669, 605, 617, 625, 646, 644, C678
    505, 516, C681, C820, Segment 0

Dimes: (500 and 510 operated)—
    504, C595, 775, 767, 704, 716, 726, 734, C820, Segment 0
Dollars: (510 operated)—
    505, 515, C596, 783, C811, Segment 1

*41 minutes*
Charge: 110
Cents: (740, 760, 640, 780 operated)—
    505, 516, C681, C820, Segment 0
Dimes: (500 and 510 operated)—
    504, C595, 775, 761, 704, 716, 726, 735, 745, C811, Segment 1
Dollars: (510 operated)—
    505, 515, C596, 783, C811, Segment 1

*45 minutes*
Charge: 120
Cents: (700, 760, 770, 640 and 780 operated)—
    505, 516, C681, C820, Segment 0
Dimes: (500 and 510 operated)—
    504, C595, 775, 705, C812, Segment 2
Dollars: (510 operated)—
    505, 515, C596, 783, C811, Segment 1

*49 minutes*
Charge: 130
Cents: (710, 760, 770, 640 and 780 operated)—
    505, 516, C681, C820, Segment 0
Dimes: (500 and 510 operated)—
    504, C595, 775, 706, 717, C813, Segment 3
Dollars: (510 operated)—
    505, 515, C596, 783, C811, Segment 1

*53 minutes*
Charge: 140
Cents:
    (720, 760, 770, 640, and 780 operated)+, C669, 605, 617, 625, 646, 644, C678
    505, 516, C681, C820, Segment 0
Dimes: (500 and 510 operated)—
    504, C595, 775, 706, 718, 727, C814, Segment 4
Dollars: (510 operated)—
    505, 515, C596, 783, C811, Segment 1

*57 minutes*
Charge: 150
Cents:
    (730, 760, 770, 640, and 780 operated)+, C669, 605, 617, 625, 646, 644, C678
    505, 516, C681, C820, Segment 0
Dimes: (500 and 510 operated)—
    504, C595, 775, 706, 718, 728, 736, C815, Segment 5
Dollars: (510 operated)—
    505, 515, C596, 783, C811, Segment 1

*60 minutes*
Charge: 155
Cents:
    (620, 630, 730, 740, 770, 640 and 780 (operated)+, C669, 605, 617, 624, C680
    507, 518, C597, C815, Segment 5
Dimes: (500 and 510 operated)—
    506, C595, 775, 706, 718, 728, 736, C815, Segment 5
Dollars: (510 operated)—
    507, 517, C596, 783, C811, Segment 1

CONCLUSION

There has been set forth hereinbefore a novel analyzer unit which makes possible the provision of automatic recording equipment in small and medium type exchanges on a practical basis. That is, the analyzer which senses in a reliable and accurate manner the tandem punches on a tape record utilizes a minimum amount of equipment and is comparatively economical in cost. The use of such unit with the simplex recorder of the copending application thus provides a completely automatic toll ticketing arrangement which is within the finances of exchanges of limited income.

The novel nature of the individual components of the analyzer and their manner of interconnection is such as to insure the provision of accurate, rapid and reliable scanning. The novel space recognition means of the scanner which operates practically simultaneously with the punch counting means to determine the physical measurements of the tape independent of the speed of the tape across the scanner is only one example of the accuracy inherent in the novel structure. The circuitry which connects the printer of the final record for sequential operation so that scanning is terminated with the omission of a printing operation, and the manner in which the counting equipment is utilized with space detection means to determine digital positions on the final tape insure further accuracy in the printing of the second record.

The manner in which a minimum number of units are used in each counting register, and the manner in which certain of the counting chains are utilized both individually and as overflow units to supplement the capacity of others of the chains, are novel features which are believed to be definite advancements in the art.

In addition to the economy and the reliability of the arrangement, it is obvious from the foregoing specification that the analyzer is extremely flexible in its adaptability, two examples having been given herein as to the manner in which it can be used to control associated units such as conventional printing mechanism or commercial card punching equipment. Other uses and embodiments of the arrangement are of course obvious therefrom.

These and other features of the invention which are believed to be new are set forth in the accompanying claims. What is claimed is:

1. In an analyzer unit for sensing an information-bearing representation registered on record media and controlling associated equipment to record same, a scanner unit for sensing the representation on the record media, transmitting means operatively controlled by said scanner means to transmit the representation to the associated equipment for recording purposes prior to the sensing by the scanner of the complete representation on the tape, and compensating means in said analyzer operative to supplement the information sensed in the partial sensing of the representation prior to its transmission to the recorder equipment to cause same to correspond to the complete representation on the tape.

2. In an analyzer unit for sensing information-bearing representations registered on record media and controlling associated equipment to record same, a scanner unit for sensing each of the representations on the record media, transmitting means operatively controlled by said scanner means to transmit the information sensed thereby to the associated equipment for recording purposes, means operative with the sensing of each representation to initiate transmission of the information of representation prior to the complete sensing by the scanner of the corresponding representation on the tape, compensating means in said analyzer for supplementing the information of each such partial sensing of each representation prior to its transmission to the associated recorded equipment to cause same to conform to the corresponding representation on the tape, and means operative to disable said scanner to prevent operation thereof as the unsensed portion of each representation is advanced through the scanner with reoperation thereof.

3. In an analyzer unit for sensing each of a plurality of information bearing representations registered on record media and controlling associated equipment to record same each representation being comprised of one or more indicia, a scanner unit for sensing the indicia of each representation on the record media, register means operatively controlled by said scanner to accumulate the information conveyed by the indicia of each representation as sensed by said scanner, transmitting control means operatively controlled by said scanner responsive to sensing of only a portion of the indicia of each representation to transmit the information of that representation to the associated equipment for recording and compensating means associated with said analyzer for supplementing the information obtained from the partial sensing of each representation prior to its transmission to the recorder equipment to cause same to correspond to the information conveyed by the representation on the tape.

4. An analyzer unit for sensing each of a plurality of information bearing representations, each of which representations is comprised of at least one indicia registered on record media, and including means for controlling associated equipment to record same; a scanner unit for sensing the indicia of each of the representations on the record media, register means operatively controlled by said scanner to accumulate the information conveyed by the indicia of each representation as sensed by said scanner, control means for controlling said scanner to sense only a portion of the indicia of each representation as moved thereby and to transmit the information of each representation to the associated equipment for recording purposes prior to sensing by the scanner of all of the indicia constituting the corresponding representation on the tape, compensating means in said analyzer for supplementing the information provided by the partial sensing of each representation prior to its transmission to the recorder equipment to cause same to correspond to the information conveyed by the representation on the tape, and terminating means for clearing the register means and reinitiating the scanning operation following recording of each representation.

5. In an analyzer unit for sensing each of a plurality of representations registered on record media and controlling associated equipment to record same, each of which representation is comprised of a set of indicia, a scanner unit for sensing the indicia of each on the record media, transmitting means operatively controlled by said scanner to transmit the information conveyed by the indicia of each representation to the associated equipment for recording purposes responsive to the sensing by the scanner of only a portion of the indicia for the corresponding representation on the tape, translation means for translating predetermined ones of the partial sensings into a given code prior to transmission thereof to the associated equipment, and compensating means in said analyzer operative to supplement the partial sensing of each representation prior to its transmission to the recorder equipment to cause same to correspond to the information conveyed by the representations on the tape.

6. An analyzer unit for sensing groups of digital representations registered on record media and controlling associated equipment to record same, each digital representation being comprised of a set of indicia scanning means for analyzing the digit representations of each group in the ascending order of the digital representations therein, transmitting means operatively controlled by said scanner to transmit each digital representation of a group to the associated equipment for recording purposes prior to the complete sensing by the scanner of the corresponding representation on the tape, and compensating means in said analyzer operative to supplement the information of each such partial sensing of a representation prior to its transmission to the recorder equipment to cause same to correspond to the representation on the tape media.

7. In an analyzer for analyzing sets of information recorded on record media, each set being comprised of groups of digital representations, a scanner unit for examining the digital representations of each group, transmitting means operatively controlled by said scanner to transmit each digital representation to the associated equipment for recording recognition means operative with said scanner in its sensing operation to recognize the last digit of a group and the last group of a set, and including means operative to signal said associated equipment to effect a given control operation indicative of the detection of the last digit in the group and a different control signal indicative of the detection of the last group in the set.

8. In an analyzer unit for analyzing sets of information recorded on record media and controlling associated equipment to record same, each set being comprised of digital representations, each group and each set being separated by spaces of predetermined and different widths, a scanner unit for examining the digital representations on said record including means for recognizing said different widths to identify the last digit of a group and the last group of a set and means for identifying same to said associated equipment, and transmitting means operatively controlled by said scanner for arresting scanning operation with the detection of a space and transmitting the previous digital representation scanned thereby to the associated equipment.

9. In an analyzer unit for examining digital information represented by perforations on a tape media, the value of each digit being represented by a corresponding number of perforations, and for controlling associated equipment to record the digits represented by said perforations, a scanner unit including means for counting the number of perforations of each digit registered on the tape, transmitting means operatively controlled by said scanner means to transmit the value of each digit to the associated equipment for recording purposes responsive to the counting by said scanner of a number of the perforations of the corresponding digit less than the whole, and compensating means in said analyzer operative to supplement the punches counted with a predetermined number to cause the digit value transmitted to the associated equipment to correspond to the digit value registered on the tape.

10. In an analyzer for sensing each of a number of sets of representations recorded on a sensible record, each set being comprised of a number of groups of representations, the members of each group being separated from each other by a space of a first width, the groups of the set being separated from each other by a space of a second width, and the sets being separated from each other by a space of a third width, scanning means including a first unit for sensing the sensible representations on the tape, and a second unit for sensing the different spacings on the tape, and transmitting means operatively controlled with recognition of each space to temporarily arrest operation of the scanner and to transmit the information indicated by the representation preceding the space on the tape to the associated equipment for recording purposes.

11. In an analyzer for sensing each of a number of sets of representations recorded on a sensible record, each set being comprised of a number of groups of digital representations, the digits, groups and sets being separated from one another by spaces of different widths, scanning means including a first unit for sensing the tape representations, and a second unit for sensing the spacing on the tape between said representations, said first and second units being positioned relative to each other to examine said tape simultaneously and being connected to register recognition of the tape spaces on said analyzer prior to the complete sensing of the preceding information on the tape, and transmitting means operatively controlled with recognition of each space to arrest scanner operation and to transmit the information conveyed by the representations preceding same on the tape to associated equipment for recording purposes.

12. In an analyzer for sensing each of a number of sets of representations recorded on a sensible record, each set being comprised of a number of groups of representations, the sets, groups and individual members of each group being separated from each other by spaces of different values, scanning means including a first unit for sensing the tape representations and a second unit for sensing the spaces between the representations on the tape, associated recording means for registering the information detected by said sensing means, and transmitter means controlled with recognition of each space to temporarily arrest operation of the scanner and to transmit information concerning the nature of the space encountered and the group member representation preceding same on the tape to said associated equipment for recording purposes.

13. In an analyzer unit for analyzing sets of information representations on a sensible record, each set being comprised of groups of information, each set, each group and each member of a group being separated by different space designations, a scanner unit including information sensing means for sensing the information recorded on the record, and space recognition means for detecting the nature of said space intervals, and transmitting means operative with the sensing thereof to transmit the information conveyed by each member of a group to associated equipment with the sensing thereof and to indicate to said associated equipment the nature of the space following each representation.

14. An analyzer as set forth in claim 13 in which said analyzer includes means for positioning said space recognition means relative to said information sensing means to identify the sets prior to complete sensing of the preceding member on the tape by said information sensing means.

15. An analyzer unit for analyzing sets of information recorded on tape media, each set being comprised of a number of groups of information arranged in a given order, the members of each group being separated by given spaces of a first given length, the groups being separated from each other by spaced intervals of a second given length, and the sets being separated from each other by intervals of a third given length, a scanner unit including information sensing means for sensing the information on the tape media, and space recognition means for detecting the different length spaces on said tape media, said space recognition means being positioned to detect the nature of each space on said tape prior to the complete sensing of the information preceding same on said tape, and transmission means operatively controlled by said space recognition means responsive to sensing thereby to any one of said spaces to arrest operation of said scanner means and to transmit the information previously detected by said information sensing means to associated equipment for recording purposes, and signal means controlled by said space recognition means for controlling said transmission means to transmit indications of the nature of the spaces detected prior to the reinitiation of movement of said tape media.

16. In an analyzer unit for analyzing information recorded on tape media as a number of single character representations aligned in tandem relation along said tape media, the sets of information being comprised of a number of groups of members, the groups and sets being separated by spaces of predetermined and different lengths, scanning means for sensing the information recorded on the tape and for sensing the width of the spaces and the presence thereof on the tape as said tape media is moved thereacross, a mask associated with said scanner means having a series of apertures arranged in tandem, said apertures being of decreasing width in the direction of travel of the tape across said scanner, an electronic means including a first control set operative with passage of said representations over a predetermined one of said apertures to generate impulses representative of the information detected thereby, and a second control set operative with the passage of certain of said spaces across the others of said apertures to effect generation of a signal corresponding to the particular length which is on the tape and its position thereon.

17. An analyzer as set forth in claim 16 which includes transmitting means operative with the passage of a space over a predetermined one of said apertures to arrest movement of the tape, transmit an indication of the information recorded on said tape prior to the space detected, and to transmit the signal indicating the width of the space and its position on the tape prior to reinitiation of the tape movement.

18. In an analyzer unit for analyzing sets of information recorded as a number of single character representations aligned in tandem relation along a tape media, the sets of information being comprised of a number of groups of members, the groups and sets being separated by spaces of predetermined and different lengths, scanning means for sensing information recorded on the tape, and the lengths of the spaces and their positions on the tape as the tape medium is moved thereacross, a mask associated with said scanner means having a series of apertures arranged in tandem, said apertures being of decreasing width in the direction of travel of the tape across said scanner means, electronic means including a first control set operative with passage of representations over a predetermined one of said apertures to generate signals representative of the value of the digit for transmission to associated equipment, and a second control set for generating a signal with the positioning of a space above a second predetermined one of said apertures to arrest movement of the tape and operative with the apertures other than said first predetermined aperture to indicate the particular width of the space positioned above the mask, and transmitting means controlled by said second aperture to transmit to said associated recording equipment an indication of the length of the space and the value of the digit preceding same on the tape prior to reinitiation of movement of the tape.

19. An analyzer as set forth in claim 18 in which said mask includes four apertures, and in which the first aperture is connected to said first control set to effect the counting of the number of representations thereon, and the second, third and fourth apertures on said mask measure the length of the spaces, said analyzer including space indicating means operated with detection of a space by said second aperture only to indicate an interdigital space, a second space indicating means operative with detection of a space by said second and third apertures only to indicate an intergroup space, and a third space indication means operative responsive to positioning of a space above said second, third and fourth apertures to indicate a space between sets.

20. In an analyzer for sensing digital information recorded on a tape member as a series of perforations in tandem relation, the digits of a group being separated by a space of a first length, the groups of a set being separated by a space of a second length, and the successive sets of information being separated by a space of a third length, scanning means for sensing the information recorded on the tape and the lengths of the spaces and their presence on the tape as said tape media is moved thereacross, a mask associated with said scanner means having a series of apertures arranged in tandem, said apertures being of decreasing width in the direction of travel of the tape across said scanner, electronic control means including a photocell and a control relay associated with each aperture, and means connecting same to effect energization of the associated relay with passage of a perforation over the corresponding aperture and to restore same with positioning of a space above its corresponding aperture, and signalling means controlled by the control set associated with one of said apertures to indicate the number of perforations which pass thereabove for recording on associated equipment and controlled by the control sets associated with the others of said apertures to indicate to said associated equipment the length of the spaces detected thereby.

21. An analyzer as set forth in claim 20 in which said aperture for said first control set is of a width sufficient to effect the repeated operation and restoration of its associated relay with the passage of a group of perforations representing a digit across the scanner, and said other apertures are of a width which maintains their associated relays operated during the passage of a group of perforations representing a digit across the scanner.

22. In an analyzer for sensing sets of digital information recorded on tape members as a series of perforations in tandem relation, the groups of a set being separated by a space of a first length, the digits of a group being separated by a space of a second length, and the members of the digit being separated by a space of a third length, scanning means having a series of apertures arranged in tandem for sensing the information recorded on the tape, the lengths of the spaces, and their positions on the tape as said tape media is moved thereacross; an electronic control set including a photocell and a control relay for each of said apertures, and means connecting same to effect energization of the associated relay with passage of a perforation over the corresponding aperture and to restore same with positioning of a space above its corresponding aperture, signalling means controlled by one of said apertures and its associated control set to indicate the number of perforations in each digit scanned thereby, and controlled by the other apertures and control sets to indicate to said associated equipment the length of the spaces detected thereby, and circuit control means associated with said second control set operative during the period of a passage of a space thereabove to prevent response of said other control sets to said perforations which are scanned thereby during such period.

23. In an analyzer unit for analyzing sets of information registered on record media, each set being comprised of groups of information, the groups being separated by spaces of given values at predetermined points in said set, a scanner unit for sensing the information on the tape media, for detecting the space intervals between said groups of information, and for detecting their position on the tape as it is moved thereover, transmitting means operatively controlled by said scanner means to transmit the information and spacing data to the associated equipment for recording purposes, and control means operated by said space recognition means responsive to the detection of a space of a value at one of said predetermined points other than the given value for a space at said point, to disable said scanner for the period that the remaining portion of the set having such variance is passed over said scanner means.

24. In an analyzer unit for sensing sets of representations registered on record media and controlling associated equipment to record same, a scanner unit for sensing the representations on the record media, transmitting means operatively controlled by said scanner means to transmit each representation to the associated equipment for recording purposes, drive means for effecting passage of the tape across said scanner means, energizing means for initiating operation of said drive means, means for interrupting the energizing circuit for said analyzer equipment, and hold means in said analyzer automatically operative to maintain said analyzer equipment and said drive means energized following operation of said interrupting means for a period which permits completion of the analyzation of the set under examination at the time of said interruption, and means associated with said scanning means to disable said hold means as said set has been scanned.

25. In an analyzer unit for sensing representations registered on record media as a series of perforations separated by spaces of predetermined and different lengths and controlling associated equipment to record same, a scanner unit for sensing the representations on the record media as moved thereacross including information sensing means for sensing the perforations in the tape and space recognition means for detecting the spaces between the perforations, transmitting means operatively controlled by said scanner means to transmit each representation of the perforations and the length of the spaces to the associated equipment, and scanner terminating means controlled by said space recognition means to automatically terminate operation of said analyzer with the absence of tape above said scanner unit.

26. In an analyzer unit for analyzing sets of information representations on a sensible record comprising a series of perforations, the groups of a set and digits of a group being separated from each other by spaces of various lengths, a scanner unit including information sensing means for sensing the information indicated by said punches on said record and space recognition means for detecting the nature of said space intervals, counting chain means controlled by said scanner to count the number of perforations detected by said scanner with the movement of the tape thereover, transmitting means for transmitting an identification signal to associated equipment indicative of each member detected by said scanner and a signal indicative of each space interval detected thereby, and counting chain means for counting each of said signals transmitted to said associated equipment in the scanning of each set.

27. In an analyzer unit for analyzing sets of information representations on a sensible record comprising a series of perforations, each set comprising a series of perforations which are separated from each other by spaces of various lengths to divide the representations into sets, groups and digits of a group, and in which said spaces appear at predetermined points in each of said sets, a scanner unit including information sensing means for sensing the information indicated by said perforations on said record and space recognition means for detecting the nature of said space intervals, counting chain means controlled by said scanner to count the number of perforations detected by said scanner with the movement of the tape thereover, transmitting means for transmitting an identification signal to said associated equipment indicative of the number of perforations in each digit counted by said chain means, a second counting chain means for counting each of said signals transmitted to said associated equipment, and means controlled by said space recognition means and said second counting chain means for controlling said transmitting means to transmit signals indicative of the spaces detected on said record by said space recognition means.

28. In an analyzer unit for sensing sets of digital representations appearing on a sensible record and controlling associated equipment to record same, each set being comprised of groups of one or more digits, a scanner unit for sensing the representations on a record media, a first register means for registering only the digital representations of a particular group of each set as sensed by said scanner including means operative to translate the said representations as sensed into a cost code, a second register means for registering the other representations of each set as sensed by said scanner, and transmitting means controlled by said scanner following each sensing operation to control the particular register effective at the time to transmit an indication of the registered representations thereon to associated equipment for recording purposes.

29. In an analyzer unit for sensing sets of digital representations appearing on a sensible record and controlling associated equipment to record same, each set being comprised of groups of one or more digits, scanner unit for sensing the representations on the record media, a first register means for registering the representations of a particular group of each set as sensed by said scanner and for translating the representations into a cost code, a second register means for registering the remaining groups of each set as sensed by said scanner, switching means for connecting said second register means with said first register means to register said particular group responsive to the detection of a representation on said record which is in excess of the capacity of said first register, and transmitting means controlled by said scanner following each sensing operation to control the one of the registers which is effective at the time to transmit an indication of the register representation to associated equipment for recording purposes.

30. In an analyzer unit for sensing sets of digital representations appearing on a sensible record and controlling associated equipment to record same, each set being comprised of groups of one or more digits, a scanner unit for sensing the representations on a record media, a first register means for registering the digital representation of a particular group of each set as sensed by said scanner and operative to translate the representation as sensed into a second code, a second register means for registering the value of each digit of the remaining groups as sensed by said scanner, transmitting means controlled by said scanner following sensing of each digital representation to control the particular register effective at the time to transmit an indication of the registered representation to associated equipment for recording purposes, and a third register for counting the number of representations transmitted to said associated equipment as registered on said first and second register means.

31. In an analyzer unit for sensing sets of digital representations appearing on a sensible record and controlling associated equipment to record same, each set being comprised of groups of one or more digits, the groups and sets being separated from each other by spaces of predetermined and different values, scanner means including digit recognition means for sensing the digital representations on the record media as scanned and space recognition means for recognizing the value of the spaces on the tape as scanned, a first register means for registering the digital representation of a particular group of each set as sensed by said scanner and for converting the representation into a second code, a second register means for registering the digital representations of each of the other groups as sensed by said scanner, transmitting means controlled by said scanner following sensing of each digital representation to transmit an indication of the representation to associated equipment for recording purposes, and a third register means operative with said space recognition means to control said transmitter to transmit to said associated equipment a signal indicating the value of the space following the preceding digit on the record.

32. In an analyzer unit for sensing sets of digital representations appearing on a sensible record and controlling associated equipment to record each set on an individual record the groups of each set being comprised of one or more digits, the groups and sets being separated from each other by spaces of predetermined and different values, scanner means including digit recognition means for sensing the digital representation on the record media as scanned, and space recognition means for recognizing the value of the spaces on the tape as scanned, a first register means for registering the representations of a particular group of each set as sensed by said scanner and for converting the representations into a second code, a second register means for registering each digital representation as sensed by said scanner, transmitting means controlled by said scanner following sensing of each digital representation to transmit an indication of the representation to associated equipment for recording purposes, and a third register means for counting the signals transmitted by said transmitter means and being operative with said space recognition means to control said transmitter to transmit a signal indicating the value of the space following the preceding digit on the tape to said associated equipment, and signalling means controlled by said third register to transmit a signal responsive to the transmission of a predetermined number of counted signals to remove the record from the associated equipment.

33. In an analyzer unit for sensing sets of digital representations appearing on a sensible record and providing a second record thereof, each set being comprised of groups of one or more digits, the groups and sets being separated from each other by spaces of predetermined and different values, scanner means including digit recognition means for sensing the digital representation on the record media as scanned and space recognition means for recognizing the values of the spaces on the tape as scanned, a first register means for registering the digital representation of a particular group of each set as sensed by said scanner for translating the representations into a second code, a second register means for registering the value of each digit as sensed by said scanner, transmitting means controlled by said scanner following sensing of each digital representation to provide an indication of such representation, a third register means operative with said space recognition means to control said transmitter to provide a signal indicating the value of the space following the preceding digit on the tape to said associated equipment, and record control means for effecting positioning of the digits on the second record in accordance with the signals received from said transmitting means.

34. An arrangement as set forth in claim 33 in which the digits of each group are separated by a narrow space, the groups of each set are separated by a medium space and the various sets are separated from each other by a wide space, and in which said space recognition means and said third register means in combination include control means for effecting operation of said print means to provide a first spacing on said second record responsive to detection of a medium space and to provide a second and different spacing responsive to the detection of a wide space.

35. In an analyzer unit for sensing sets of digital representations appearing on a sensible record and providing a second record thereof, each set being comprised of groups of one or more digits, the groups and sets being separated from each other by spaces of predetermined and different values, scanner means including digit recognition means for sensing the digital representation on the record media as scanned and space recognition means for recognizing the values of the spaces on the tape as scanned, a first register means for registering the digital representation of a particular group of each set as sensed by said scanner for converting the representation into a second code, a second register means for registering the value of each digit as sensed by said scanner, transmitting means controlled by said scanner following sensing of each digital representation to provide an indication of such representation, a third register means operative with said space recognition means to control said transmitter to provide a signal indicating the value of the space following the preceding digit on the tape to said associated equipment, record control means including printing means for recording the digits on a second record in accordance with the signals received from said transmitting means, and sequence determining means associated with said record control means to terminate operation of the analyzer with failure of the printing means to operate.

36. Relay counting chain means for counting a total of a.b.c. members including a first counting chain comprising "a" relay members connected to advance one relay member with receipt of each number and to recycle responsive to advancement thereof to its last member, a second cycle counting chain comprising "b" relay members connected to advance one member with each advancement of the first counting chain relay to its last member and to recycle with advancement of itself to its last member, and a third relay counting chain connected to advance one step with each operation of the last member of said second relay counting chain, whereby a total count of a.b.c. members may be effected with $a+b+c$ relay members.

37. In an analyzer unit for sensing a tape member having a series of perforations representing the data concerning a series of telephone calls, each call as set forth on the tape including groups of perforations indicative of the calling number, called number, date and time of day, and the duration of the call in minutes, a scanner unit for counting the perforations on the tape representing each digit of the data as passed thereover, transmitting means operatively controlled by said scanner means to transmit the value of each digit scanned prior to the complete counting of the punch representations of the digit on the tape, and compensating means in said analyzer operative to supplement each partial digital count prior to its transmission to the recorder equipment to cause same to correspond to the value of the corresponding digit on the tape.

38. In an analyzer unit for sensing a tape upon which is recorded information concerning telephone calls extended over an exchange, the information being recorded in the form of perforations wherein the perforations are separated by predetermined and different spaces to establish division between perforations of a digit, digits of a group, groups of a call, and between the different calls, scanner means including a first unit for sensing the number of perforations in each digit, and a second unit operative to sense the various spacings on the tape following the last punch of each digit, a first counting chain register controlled by said first unit to count the number of perforations in a particular digit on said tape, a second counting chain register for counting the perforations representing the other digits on said tape, and transmitting means for transmitting the value of the digit on the effective one of the registers and the nature of the space following such representation to the associated equipment.

39. An analyzer unit as set forth in claim 38 in which the duration of a call is expressed by a digit comprised of a corresponding number of perforations and which includes switching means to connect said first register chain to count the number of perforations in such digit and conversion means controlled by said first register chain to convert the number of minutes into a corresponding charge for the call.

40. An analyzer as set forth in claim 38 in which the duration of the call is expressed as a number of perforations corresponding to the number of minutes of the call, and which includes switching means for connecting said first register means to count the number of perforations in the digit, a second switching means for connecting said second counting chain means to said first counting chain responsive to the detection of a minute digit of a value in excess of the capacity of said first register, and charging means controlled at times by said first register and at other times by said first and second register in combination to compute the charge for the call in accordance with the number of minutes thereof, said transmitting means being operative to transmit said charge as computed to the associated equipment.

41. In an analyzer unit for sensing a tape upon which is recorded information concerning telephone calls in the form of a series of perforations, the perforations being separated by predetermined and different spaces to establish a division between the digits of a group, groups of a call, and between the different calls on the tape, certain of said perforations representing the number of minutes of the call, scanner means including a perforation detecting unit for sensing the number of perforations in each digit and a space recognition unit for sensing the various spacings on the tape following the last perforation of each digit, a first counting chain register controlled by said perforation detecting unit to count the number of minute perforations on the tape for each call, a second counting chain register for counting the perforations representing the other digital information on said tape, code converting means for translating the number of minute perforations to a charge for the call in accordance with a predetermined scale, said code converting means being controlled at times by said first counting chain, and at other times by said first and second counting chain; a third counting chain operative with said space recognition unit to determine the position of the spaces between said groups, printer means operative to print an individual ticket for each one of the calls on said tape, and transmitting means for transmitting the digital information as registered on each of said chains to said printer means to effect the printing thereof on the ticket.

42. An arrangement as set forth in claim 41 in which said third register means and said space recognition means include means for providing a signal to said printer unit with the sensing of a space between groups by said scanner, and in which said printer means includes a print unit for printing a dash (—) between the digit groups on said ticket in response thereto.

43. An arrangement as set forth in claim 41 in which said third register means and said space recognition means include means for providing a signal to said printer unit with the sensing of a space between calls by said scanner and in which said printer means include a print unit for printing a star, and means associated with said printer controlled with receipt of said signal to print a predetermined number of stars sufficient to provide a toll ticket of a given standard length.

44. An arrangement as set forth in claim 41 in which the data for each call is printed on a roll of tape and the individual tickets are cut therefrom subsequent to printing and which includes a cutter means, controlled by said third register means and said space recognition means to cut a ticket from the tape roll responsive to the counting of a predetermined number of signal transmissions to said printer unit.

45. An arrangement as set forth in claim 41 in which only the calling number and called party number are registered in said tape in the event of incomplete calls, and in which the minute perforations followed by a group designation space are detected first by said scanner means in the event of a completed call, and control means operative responsive to the detection of the absence of a group space following the scanning of the first set of perforations for a call on the tape to identify such call as an incomplete call, and to disable the analyzer for the period that the remaining portion of the incomplete call passes over the scanner unit.

46. The method of transferring digital data recorded on a tape as a series of perforations separated by spaces of different values to a record medium, which consists in sensing and counting the perforations of each digit in turn, detecting the value of the space following the perforations of each digit on the tape, terminating the sensing operation prior to the complete sensing of all of the perforations representing the digit, supplementing the number of perforations counted with a predetermined number to provide an outgoing digit which is equivalent to that on the tape, and recording on the record the value of the space indicated and the digit as supplemented prior to initiation of a further sensing operation.

47. Scanning apparatus for use with associated recording equipment in sensing intelligence registered on a media in the form of markings and variable spacings between markings, comprising means for counting the markings on the media, means for selectively detecting and recognizing said variable spaces between markings, and means for transmitting the marking and spacing information detected by said first and second means to said associated equipment.

48. A scanning arrangement for use with associated equipment operative to sense intelligence registered on a media in the form of sets of markings and spacings in a predetermined sequence, means operative to scan the media as operated in a reverse order from the manner in which the intelligence was recorded thereon, means for counting the markings, means for selectively recognizing said variable spacings between markings, and means operative responsive to detection of a variance in the space sequence from the predetermined sequence to provide a control signal to the associated equipment which is indicative thereof.

49. The method of transferring to a record media digital data which is recorded on a tape as a series of indicia impressed on said tape separated by spaces of different values, which comprises the steps of sensing and counting the indicia of each digit, detecting the value of the space following the indicia of each digit on said tape, and transmitting signals to associated recording equipment indicating the digit and space values detected.

References Cited in the file of this patent

UNITED STATES PATENTS

| | | |
|---|---|---|
| 2,513,112 | Shepherd | June 27, 1950 |
| 2,519,184 | Grosdoff | Aug. 15, 1950 |
| 2,600,817 | Victoreen | June 17, 1952 |